United States Patent
Stiehl et al.

(10) Patent No.: US 8,909,370 B2
(45) Date of Patent: Dec. 9, 2014

(54) INTERACTIVE SYSTEMS EMPLOYING ROBOTIC COMPANIONS

(75) Inventors: Walter Dan Stiehl, Somerville, MA (US); Cynthia Breazeal, Cambridge, MA (US); Jun Ki Lee, Cambridge, MA (US); Allan Z Maymin, Cos Cob, CT (US); Heather Knight, Lexington, MA (US); Robert L. Toscano, Chula Vista, CA (US); Iris M. Cheung, Rochester, MN (US)

(73) Assignee: Massachusetts Institute of Technology, Cambridge, MA (US)

( * ) Notice: Subject to any disclaimer, the term of this patent is extended or adjusted under 35 U.S.C. 154(b) by 1354 days.

(21) Appl. No.: 12/117,389

(22) Filed: May 8, 2008

(65) Prior Publication Data

US 2009/0055019 A1    Feb. 26, 2009

Related U.S. Application Data

(60) Provisional application No. 60/928,487, filed on May 8, 2007.

(51) Int. Cl.
| | |
|---|---|
| *G06F 19/00* | (2011.01) |
| *B25J 13/00* | (2006.01) |
| *G06N 3/00* | (2006.01) |
| *B25J 13/08* | (2006.01) |
| *B25J 9/16* | (2006.01) |

(52) U.S. Cl.
CPC ............. *B25J 13/00* (2013.01); *A63H 2200/00* (2013.01); *G06N 3/008* (2013.01); *B25J 13/081* (2013.01); *B25J 9/1671* (2013.01)
USPC ......................................... 700/245; 700/264

(58) Field of Classification Search
USPC ................................................. 700/245–264
See application file for complete search history.

(56) References Cited

U.S. PATENT DOCUMENTS

| | | | | |
|---|---|---|---|---|
| 4,951,510 A | * | 8/1990 | Holm-Kennedy et al. | 73/862.041 |
| 5,083,466 A | * | 1/1992 | Holm-Kennedy et al. | 73/862.041 |

(Continued)

OTHER PUBLICATIONS

Lumelsky et al., Sensitive skin, Jun. 2001, IEEE sensors Journal, vol. 1. No. 1.*

(Continued)

*Primary Examiner* — Bhavesh V Amin
(74) *Attorney, Agent, or Firm* — Stephen R. Otis

(57) ABSTRACT

An interactive system for interacting with a sentient being. The system includes a robotic companion of which the sentient being may be a user and an entity which employs the robot as a participant in an activity involving the user. The robotic companion responds to inputs from an environment that includes the user during the activity. The robotic companion is capable of social and affective behavior either under control of the entity or in response to the environment. The entity may provide an interface by which an operator may control the robotic companion. Example applications for the interactive system include as a system for communicating with patients that have difficulties communicating verbally, a system for teaching remotely-located students or students with communication difficulties, a system for facilitating social interaction between a remotely-located relative and a child, and systems in which the user and the robot interact with an entity such as a smart book. Also disclosed are control interfaces for the robotic companion, techniques for rendering the robotic companion sensitive to touch and responding to those touches, and techniques for providing quiet, back-drivable motion to components of the robotic companion.

20 Claims, 37 Drawing Sheets

(56) References Cited

U.S. PATENT DOCUMENTS

| | | | |
|---|---|---|---|
| 5,095,762 A * | 3/1992 | Holm-Kennedy et al. | 73/862.041 |
| 5,101,669 A * | 4/1992 | Holm-Kennedy et al. | 73/862.626 |
| 5,544,649 A * | 8/1996 | David et al. | 600/301 |
| 5,831,408 A * | 11/1998 | Jacobus et al. | 318/568.11 |
| 5,987,726 A * | 11/1999 | Akeel | 29/407.08 |
| 6,175,772 B1 | 1/2001 | Kamiya et al. | |
| 6,535,793 B2 * | 3/2003 | Allard | 700/259 |
| 6,629,242 B2 * | 9/2003 | Kamiya et al. | 713/100 |
| 6,684,127 B2 * | 1/2004 | Fujita et al. | 700/245 |
| 6,845,297 B2 * | 1/2005 | Allard | 700/259 |
| 7,348,746 B2 * | 3/2008 | Ogawa et al. | 318/568.12 |
| 7,720,572 B2 * | 5/2010 | Ziegler et al. | 700/245 |
| 7,778,731 B2 * | 8/2010 | Ogawa et al. | 700/245 |
| 7,813,836 B2 * | 10/2010 | Wang et al. | 700/245 |
| 7,835,926 B1 * | 11/2010 | Naidoo et al. | 705/3 |
| 7,912,733 B2 * | 3/2011 | Clements et al. | 705/2 |
| 2001/0013764 A1 * | 8/2001 | Blumenkranz et al. | 318/568.11 |
| 2002/0103576 A1 * | 8/2002 | Takamura et al. | 700/245 |
| 2002/0120362 A1 * | 8/2002 | Lathan et al. | 700/245 |
| 2002/0198626 A1 * | 12/2002 | Imai et al. | 700/245 |
| 2003/0004611 A1 * | 1/2003 | McKinney et al. | 700/258 |
| 2004/0034449 A1 * | 2/2004 | Yokono et al. | 700/245 |
| 2004/0186623 A1 * | 9/2004 | Dooley et al. | 700/245 |
| 2005/0104964 A1 * | 5/2005 | Bovyrin et al. | 348/155 |
| 2005/0154265 A1 * | 7/2005 | Miro et al. | 600/300 |
| 2005/0192676 A1 * | 9/2005 | Sears et al. | 623/24 |
| 2005/0197739 A1 * | 9/2005 | Noda et al. | 700/245 |
| 2005/0216121 A1 * | 9/2005 | Sawada et al. | 700/245 |
| 2006/0184273 A1 | 8/2006 | Sawada et al. | |
| 2007/0150107 A1 * | 6/2007 | Ogawa et al. | 700/245 |

OTHER PUBLICATIONS

Miller et al., Motion capture from inertial sensing for untethered humanoid teleoperation, 2004, IEEE Humanoids 2004.*

Koichi Koganezawa, Back drivable and inherently safe mechanisms for artificial finger.* http://www.ieee-ccnc.org/2006/conf_program/demos/index. htmlisting (webpage as of Nov. 12, 2012) Webpage lists demonstrations in Jan. 2006 at Consumer Communications & Networking Conference 2006 (CCNC2006), Las Vegas, Nevada, USA, (including a demonstration of W. Stiehl, J. Lieberman, C. Breazeal, L. Basel, H. Knight, L. Lalla, "The Huggable: A Therapeutic Robotic Companion for Relational, Affective Touch").

J. Lieberman, C. Breazeal, L. Basel, R. Cooper, H. Knight, L. Lalla, A. Maymin, The Huggable: A Therapeutic Robotic Companion for Relational, Affective Touch, 3rd IEEE Consumer Communications & Networking Conference, 2006 (CCNC2006), Jan. 8-10, 2006, Las Vegas, NV, USA. vol. 2, pp. 1290-1291.

Stiehl, W. D., Lieberman, J., Breazeal, C., Basel, L., Lalla, L., & Wolf, M. (Aug. 2005). Design of a therapeutic robotic companion for relational, affective touch. Proceedings of Fourteenth IEEE Workshop on Robot and Human Interactive Communication (Ro-Man-05), Nashville, TN, 2005, pp. 408-415.

W. Stiehl, C. Breazeal, Affective Touch for Robotic Companions, ACII'05 Proceedings of the First international conference on Affective Computing and Intelligent Interaction, pp. 747-754, Springer-Verlag Berlin, Heidelberg 2005.

* cited by examiner

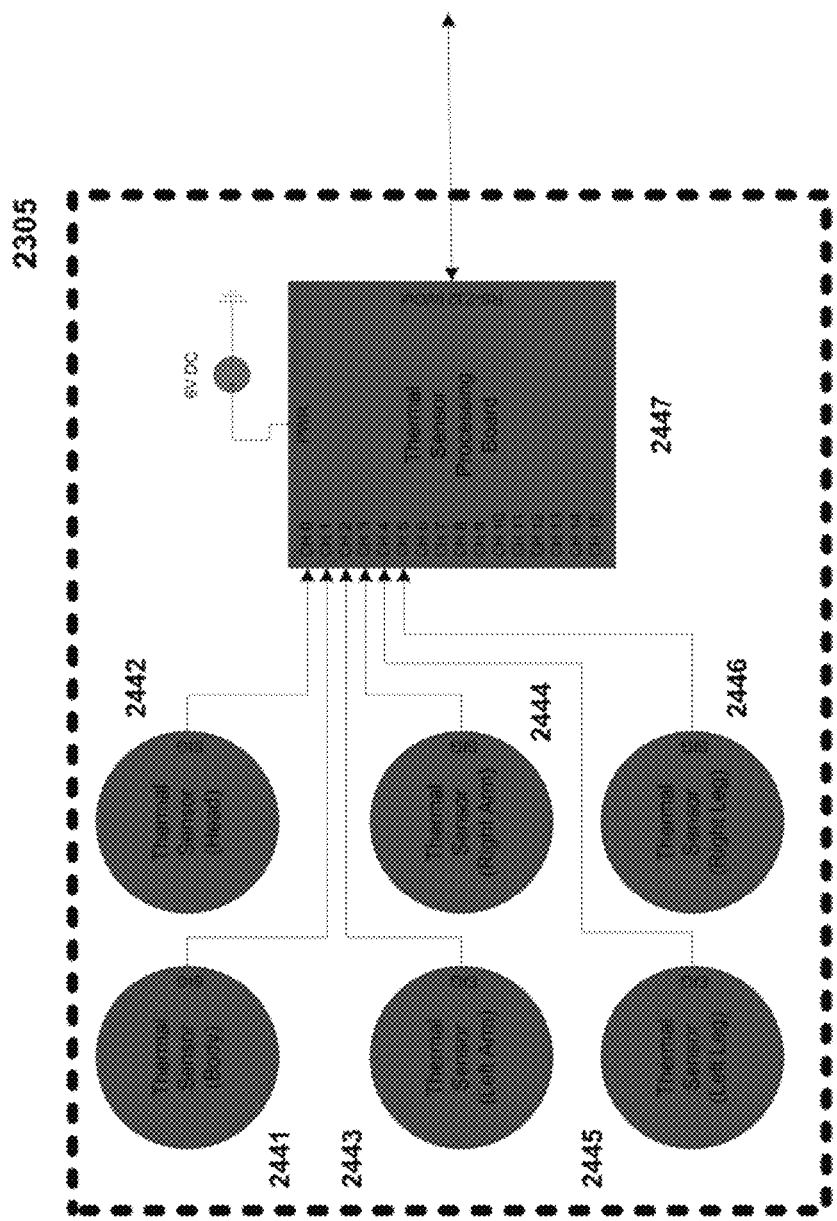

INTERACTIVE SYSTEMS EMPLOYING ROBOTIC COMPANIONS

CROSS-REFERENCE TO RELATED APPLICATIONS

This patent application claims priority from U.S. Provisional Patent Application 60/928,487, Walter Dan Stiehl, et al, Robotic Companion, filed May 8, 2007. That provisional patent application is incorporated in the present patent application by reference for all purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The techniques disclosed herein relate generally and broadly to autonomous robotic devices, and to robotic devices for Human Robot Interaction (HRI) and/or communication.

2. Description of Related Art

Robot Companions

Related art to the disclosed techniques can be found the following areas:
  fields which involve interaction between robotic or robot-like devices and humans, such as the fields of robot companions, robot assistive or communicative devices in patient care or robotic and robot-like educational devices, and robot pets.
  fields which involve sensing devices employed with robots and devices for imparting motion to robots.

In discussing human-robotic interaction, the human may be referred to as the user of the robot, the user in this case being the human who interacts with the robot as a companion or analogously to a human interacting with an animal companion. A human who is controlling or directing a robot that is interacting with a user, is referred to as the operator of the robot, or as the puppeteer of the robot.

Robots that act or react under their own control are acting autonomously. Robots that are directed by an external entity such as an operator or a separate control computer are not acting autonomously.

Human-robotic Interaction

Robotic technologies are entering our everyday lives not only as tools and appliances but as daily companions. In healthcare, robots such as the Paro described by Shibita et al in "Mental Commit Robot and its Application to Therapy of Children," in *International Conference on Advanced Intelligent Mechatronics*, Como, Italy, 2001, pp. 1053-1058, and the NeCoRo from Omron Corporation, www.necoro.com and referenced in Libin and Libin, "Person-Robot Interactions From the Robopsychologists' Point of View: The Robotic Psychology and Robotherapy Approach", Proceedings of the IEEE Vol 92 (11): pp. 1-15, 2004, are designed to function as simple robotic pet surrogates in hospitals and nursing homes in cases in which companion animals are not available.

Other similar robots are Robota by Billard et al, "Building Robota, a Mini-Humanoid Robot for the Rehabilitation of Children with Autism," *RESNA Assistive Technology Journal* (In Press), 2006, the Keepon by Kozima et al, "Designing and Observing Human-Robot Interactions for the Study of Social Development and its Disorders," in *IEEE Symposium on Computational Intelligence in Robotics and Automation*, Espoo, Finland, 2005, and investigations by Scassellati, "How social robots will help us to diagnose, treat, and understand autism," in $12^{th}$ *International Symposium of Robotics Research (ISRR)*, 2005, have explored the use of robots to interact with autistic children.

Further, the robot Pearl described in "Pearl: A Mobile Robotic Assistant for the Elderly," in *AAAI Workshop on Automation as Eldercare,* 2002 by Pollack et al has been developed as a mobile robot platform for use in nursing homes, while the work of Mataric reported in "Socially Assistive Robotics," *IEEE Intelligent Systems*, pp. 81-83, 2006 has explored using socially assistive robots that combine human-robot interaction with assistive robotics.

One common thread which runs through these robots and others like them is that the experience that the human has through interacting with the robot is an important aspect of the overall design. These robots may have expressive faces, be outfitted with various sensors, or feature software behavior systems that all contribute to the overall interaction and encourage continued use while limiting boredom. In order for the robots to provide a therapeutic benefit, the human must be encouraged to interact continually with the robot.

However, existing art in these areas is generally limited in the behaviors that can be exhibited by the robots, and the types or details of sensor input data to which the robot has access. The mechanical and physical design of existing robotic art results in "robotic" motion, appearance, or texture that detracts from the ability for the robot to engage in convincing social interaction with a human.

It is also known that there are many positive benefits of companion animal therapy in terms of lowering stress, reducing heart and respiratory rate, and showing positive changes in hormonal levels, as well as mood elevation and social facilitation. The use of animals for this form of therapy is often seen as the best solution. There are practical limitations in the existing forms of this therapy; for example, these companion animals are not readily available in some healthcare and education facilities due to fears of bites, allergies, or disease. Additionally, when this form of therapy is offered it is generally as a regulated experience. An animal therapist must always be present, so sessions must occur as a scheduled activity once or twice a week, with sessions only lasting a few hours.

As an alternative to companion animal therapy, a new form of therapy, robot companion therapy or robot therapy, has emerged. Here robotic companions take the place of animals. Studies have been conducted using Sony's AIBO by Tamura et al in "Is an Entertainment Robot Useful in the Care of Elderly People with Severe Dementia?," The *Journals of Gerontology*, vol. 59A, pp. 83-85, 2004; the Paro by Kidd et al in "A Sociable Robot to Encourage Social Interaction among the Elderly," in *International Conference on Robotics and Automation* (ICRA2006), 2006; and the NeCoRo by Libin and Cohen-Mansfield in "Therapeutic robocat for nursing home residents with dementia: preliminary inquiry," *Am J Alzheimers Dis Other Demen.*, vol. 19, pp. 111-6, 2004. All of these studies show promise for this new form of therapy, specifically with improving people's mood and increasing social interaction. However, even with these results there is still much room for improvement in the designs of such robotic companions.

Robotic Sensors and Motion Devices

Existing art is also known for robotic sensors. For example, Lumelsky et al in "Sensitive Skin," *IEEE Sensors Journal*, vol. 1, pp. 41-51, 2001, describe a "sensitive skin." They describe such a sensory system as consisting of a large variety of sensors with processing capabilities that cover the entire surface of the robot. Recently there have been other implementations of "sensitive skin." One such system uses surface covers for protection and better control as described by Iwata and Sugano in "Whole-body Covering Tactile Interface for Human Robot Coordination," presented at International Conference on Robotics and Automation, Washington, D.C., 2002. Another "sensitive skin" is focused on the detection of temperature and pressure in a single flexible skin, Omeya et al in "A large-area, flexible pressure sensor matrix with organic field-effect transistors for artificial skin applications," *Proceedings of the National Academy of Science USA*, vol. 101, pp. 9966-9970, 2004. Other researchers have focused on the processing capabilities of such skins. A review of these approaches by Paradiso et al can be found in "Sensate Media—Multimodal Electronic Skins as Dense Sensor Networks," *BT Technology Journal*, vol. 22, 2004.

In these prior art references, the goals for these skin designs were primarily to keep the robot from damaging itself or the people around it, or to sense the physical properties of objects. This is distinct from "affective touch" sensing, affective touch being defined as touch which either displays or evokes emotions or an apparent emotional response by haptic means, such as a comforting touch on the shoulder. This is also distinct from sensing of "sociable touch" or "social touch" and social communication, social touch being defined as touch and touch-gestures that communicate a particular social aspect or information, for example, a congratulatory pat on the shoulder that communicates approval and as such is a type of social reward. The realm of social or affective touch has been largely ignored or only weakly addressed in the prior art of "sensitive skin" and robotic design, and is addressed by the techniques disclosed here. In the prior art, most robotic systems feature only a small number of discrete tactile sensors, if any, and thus are not capable of distinguishing fully the wide variety of affective, social, or other higher order forms of touch.

Limitations of Other Systems, Advantages Over Prior Art

As can be readily appreciated, the existing art is subject to numerous and diverse limitations that are overcome by the techniques disclosed herein. The limitations include many which detract, often to a substantial degree, from the social or other interaction between the robot and the human, or from the ability of the human to make use of a robot-like device in a convenient or natural fashion.

Limitations Relating to a User's Perception of a Companion Robot

The Appearance of a Companion Robot

To encourage social interaction between a human and a robot, the robot should not have a robot-like appearance, as is the case in most existing robots. A robot-like appearance, as is typical of the current art, is inexpressive, cold, and unemotional. The robot's appearance should be such that it looks comfortable, and encourages the human to treat the robot in a social fashion.

The Feel of a Companion Robot

The feel of a companion robot when a user touches it is as important to the interactions between the user and the robot as is the robot's appearance. A robotic companion should be as pleasant to touch as is an animal pet, and should have a similar feel with touched to an animal pet. Existing robots generally have a hard, metallic, or other type of surface that does not encourage tactile interaction by the user, or do not feel realistic.

The Motion of a Companion Robot

A related aspect is that as the robot moves it should be quiet, without the noisy gear sounds typical of the prior art found in many existing robotic platforms. These sounds distract from the "illusion of life" and impede the interaction.

Further, the robot as it moves should not be a danger to the user. For example, the amount of output force by the motors should be limited, and if possible, the robot motion actuators or motors should be back drivable or use sensors to detect potentially dangerous situations, and the robot should include a control system or employ equivalent techniques to avoid or remediate these dangers.

Additionally, the robot should have some way of conveying its internal state through expressive motion and sounds, and this should be clear and understood to the user interacting with it. Companion animals have very clear behaviors expressed through their facial expression, body posture, and sounds. The robotic companion should feature an ability to convey behavior in a similar fashion. Existing robots however, even with many degrees of freedom, do not generally have even a mechanical design that facilitates expressive action. For example, ear and head movement among other degrees of freedom could be used to demonstrate a large range of expression, but such movement is not included in most examples of the existing art, or is limited.

Limitations Relating to Autonomous Robotic Behavior

Autonomous robotic behavior is a sequence of actions taken by the robot in response its environment or events in its environment, without the behavior being controlled or initiated by a separate entity, such as a human operator: the sequence of operations may further vary autonomously. This is distinct from non-autonomous behavior, which is defined as actions controlled directly by a separate entity, such as human operator or puppeteer. This is further distinguished from semi-autonomous behavior, which is defined as a sequence of actions taken by the robot that are initiated by a command or input from a separate entity, but then carried out autonomously.

Visual communication and interaction, as well as audible communication and interaction, are also important in companion animal therapy, both from the human observing and responding to the animal, and the animal observing and responding to the human. These interactions include such simple interactions as the human looking at the animal and the animal "autonomously" looking back, it can be through touch such as petting or scratching the animal with the animal exhibiting a visual and/or audible response, it can also be through sound such as calling the animal's name or talking to it, holding the animal in a cuddling position, or the animal responding with gestures such as wagging the tail or by vocalizations such as purring. Autonomous behaviors in prior art for robotic companions have been limited, allowing only for simple interactions such as following a colored ball from visual sensing, responding to specific spoken words, or generating a yelping sound if the robot is struck, and generally do not combine senses and responses. Prior art in some circumstances supports autonomous behavior for such mechanical manipulations as the grasping of objects, but includes autonomous behavior neither for affective or social interaction, nor in response to affective or social touch.

Some of the types of tactile interactions known in animal companion therapy include hugging the animal, rocking it like a baby, petting it, tickling it, and carrying it, and the animal responding by purring, snuggling, wagging the tail, or coming close to the human. Thus, not only is it important for a robotic companion to feel pleasant to the touch, but the robot should also be capable of detecting a wide range of tactile interactions. This capability requires a dense network of tactile sensors and appropriate processing: this sort of capability is not generally found in the existing art, or is very limited.

Additionally, the use of multiple modalities of sensing, such as force in combination with temperature and other somatic sensing, more closely resembles the types of sensors in the skin of a real animal and can improve the distinction of various different types of affective touch. Multiple modalities of sensing, such as in the form of a "sensitive skin", are rare in the existing art, if found at all.

Further, the "sensitive skin" of a robot should be full body. If a user were to touch the robot somewhere on its body, and the robot failed to respond, the failure to respond would instantly break the illusion that the robot was alive in the same fashion an animal companion. This illusion of life helps to improve the overall interaction, and the lack of a full body skin, as is the generally the case in the relevant prior art, detracts from the illusion of life and thus limits the usability of these robots as companion robots.

Sensing orientation in space is also important. This is not limited to the orientation of the robot but rather also includes the spatial relationship between the user and the robot, and potentially to objects in the environment. Both aspects of orientation are needed for relational interactions between the robot and the user, for example, when an animal turns to look at a human as the human is petting it or when the human calls its name, or the animal responds to being held in different orientations. Inertial measurement sensors, tilt switches, or other sensors such as could be used to allow the robot to know its own orientation, are generally absent in the existing art, or are used only in a limited fashion and the robots are unable to respond to affective interactions in a general fashion.

Array microphones, cameras, and other similar types of sensing can provide a robot with a sense of location of the user with respect to the robot. Such capabilities are found in prior art systems, if at all, only in a limited fashion.

Limitations on the Prior Art Use of Robotic Companions

One aspect in which robotic companions can be different from companion animals is their ability to collect and share data. In health care, education, and other settings, such a capability could be greatly beneficial, but such robotic capabilities are not generally found in the prior art. Prior art robotic companions do not relay potentially harmful situations encountered by a user to the user's caregivers. The prior art robotic companions are thus unable to function as an active member or as an autonomous device in a health care or educational team, and not just as a medical sensor or as a toy.

Existing robotic companions also of limited usefulness in rural health or home health.

Returning to the aspects of techniques concerning "sensitive skin", Human Robot Interaction (HRI) applications pose a specific set of challenges in the design of robotic "sensitive skins." Unlike the prior art of robotic manipulation in which a robot arm or manipulator must only deal with objects, in HRI applications the robot must be able to interact with both people and objects. This human interaction includes a realm of social touch, such as greeting with a handshake, and affective touch, such as petting a robotic companion. Social touch is not well-addressed in the prior art, in part because the robotic designs of the prior art feel to the user like a constructed machine.

A capability lacking in the prior art is that the "sensitive skin" be able to distinguish interaction with a user from interaction with an object. A robotic companion should be able to distinguish if it is sitting on someone's lap or a tabletop.

The skin itself must convey the "illusion of life" through full body coverage of sensors, such that it can respond to touch on any part its body, just as an animal can respond to touch on any part of the animal's body. No matter how lifelike a robot moves, if it is touched and does not respond to the touch, this illusion of life is instantly broken. Any such failure to respond can be frustrating to the user and affect the interaction. Closely related to this full body challenge for a "sensitive skin" is the fact that the skin itself must be designed to cover the complex geometry of the surface of a robot.

How the skin feels to a user touching the robot is equally important. It should feel pleasant to touch and not distract from the interaction. For example, if the robot is designed to look like a realistic or fantasy animal, it should not feel hard or excessively soft, it should have the feel of a realistic animal. Existing robotic designs do not have skins that give this feel when touched.

Further, the "sensitive skin" must be able to detect a wide variety of social or affective touch interactions, such as handshakes, petting, tickling, slapping, or tapping, among others. Prior art is generally unable to detect affective or social touch interactions, being limited in the spatial resolution of the sensors, limited in the completeness of sensor coverage in all areas of the skin, limited in sensitivity of the sensors, or otherwise limited.

It is thus an object of the techniques disclosed in the following to provide improved robotic companions which overcome these and other limitations of prior art robotic companions.

BRIEF SUMMARY OF THE INVENTION

In one aspect of the techniques, the improved robotic companion is a component of an interactive system for interacting with a sentient being. The sentient being is a user of a robot that belongs to the interactive system. The interactive system further includes an entity which employs the robot as a participant in an activity involving the user of the robot. During the activity, the robot responds to inputs received from the user and from the entity. The robot receives inputs from the user through user interaction with the robot and the user interaction may include direct manipulation of the robot.

The robot may respond to inputs from the user in ways that the user understands to be affective or social and there may be varying degrees to which the robot is controlled by user inputs and by inputs from the entity. The robot may provide information about the activity in which it and the user are participating to the entity and the entity may use the information in employing the robot in the activity. The entity may also use the information to evaluate the user.

The entity may operate during the activity without human intervention or may be controlled at least in part by a human operator during the activity. The operator employs an operator interface to determine how the robot is participating in the activity and may also use the operator interface to control the robot. Features of the operator interface may include the following:

When the robot includes a video system, the operator interface may include a panorama produced by the video system and a detailed view of a location of interest.

When the robot includes a motion measurement system, the operator interface may include representations of the robot's motion and/or orientation.

The operator interface may include a list of robot behaviors from which the operator can select.

The operator interface may permit the operator to determine a degree to which the robot is controlled by the inputs received from the user through user interaction or by the inputs received from the entity.

Embodiments of the operator interface may include a GUI, an operator interface that is wearable by the operator, or may include an operator robot that is directly manipulated by the operator.

The operator interface may be located remotely from the robot and the user.

Uses of the interactive system include:

Care giving, where the sentient being receiving care has restricted capabilities for communication with the care giver. The sentient being is the user of the robot and the care giver controls the entity. The manner in which the sentient being interacts with the robot gives the care giver insight into the condition of the sentient being and the user of the robot benefits from affective interaction with the robot. Examples of such care giving are care giving for young children, people suffering from dementia, or orphaned animals.

Remote interaction with a remotely-located person, where the user of the robot has a relationship with a remotely located person such as a teacher or a relative and the remotely located person controls the robot. Examples of such interactions are interactions of relatives with remotely-located children or interactions of teachers with remotely-located special needs children.

Systems in which the entity is an object such as a smart book or a computer game and the robot and the user of the robot participate in an activity that involves the smart book or computer game.

Another aspect of the techniques is the improved robotic companion itself. The robotic companion is characterized by its usefulness in communicating between a human operator of the robot and a user of the robot. The robotic companion is further characterized by its ability to respond to inputs from the user in ways that are taken to be affective and/or social by the user.

Still another aspect of the techniques is the graphical user interface that the operator uses to control the robotic companion.

A further aspect of the techniques is techniques for rendering an object sensitive to touch. One system for so doing includes a first set of sensors that sense pressure at points on the object, a second set of sensors that sense proximity to the object at second points on the object, and a third set of sensors that sense temperatures a third points on the object, and a processor that uses inputs from the sensors to determine a kind of touch that is being applied to the object. A simpler system for so doing employs an air bladder, a pressure sensor that is responsive to changes in pressure of the air in the air bladder and a processor that receives a pressure indication from the pressure sensor and provides a pressure signal to apparatus that is external to the object. This latter system may be used in a robot that is employed by a user of the robot who is having pain to indicate the location and intensity of the pain.

A still further aspect of the techniques is techniques for moving a component of an object and permitting the component also to be moved by a user of the object. Apparatus for so doing includes a source of rotary motion for moving the component, a friction-driven first reduction stage for reducing the speed of the rotary motion, and a non-slipping second reduction stage that is coupled to the component. The second reduction stage further reduces the speed of the rotary motion and provides a high-torque response to movement of the component by the user. The apparatus may further include a controller that provides a motion control input to the source of rotary motion and a motion measuring device coupled to the component for measuring motion of the component, the controller receiving a measurement of the amount of motion indicated by the motion measuring device.

Other objects and advantages will be apparent to those skilled in the arts to which the invention pertains upon perusal of the following Detailed Description and drawings, wherein:

BRIEF DESCRIPTION OF THE SEVERAL VIEWS OF THE DRAWINGS

In all drawings and figures for which dimensions are given, the dimensions are shown in inches.

FIG. 24E is an illustration showing details of the diagram of FIG. 23 for a third part of the input portion of the Huggable system.

DETAILED DESCRIPTION OF THE INVENTION

Figure 1:
FIG. 1 is an illustration of the completed assembly of a cross section of the lower arm region of the Huggable.

Embodiments of certain of the terms used in the claims appear in the Detailed Description as follows. The list is not intended to be exhaustive and the embodiments are to be understood as being descriptive rather than limiting.

interactive system for interacting with a sentient being: embodied in the Huggable System and in smart books and games employing the Huggable robot.

robot: embodied in the Huggable robot or puppet.

entity which employs the robot: embodied in a smart book or game or an entity that has an operator interface for an operator who is different from the sentient being.

human operator: embodied in the Operator and in the puppeteer.

operator interface: embodied in the remote puppeteer workstation and the Operator User Interface.

Overview of the Huggable system

The following overview descriptions provides an introduction to some aspects of the techniques of the Huggable as a prelude to the more detailed description, but this overview is not intended to define nor delineate the scope of the invention.

A presently-preferred embodiment of a robotic companion as disclosed in the following Detailed Description is intended for exploratory use in a broad variety of settings and/or applications. As can be readily understood, these include but are not limited to healthcare, education, psychological support, medical diagnosis, patient monitoring, remote communication, teleoperation, entertainment, electronic games, facilitating communication with users such as child who is in a stressful state or situation such as testifying in court, play therapy, familial and other social contact, security, and childcare.

As can be immediately appreciated, many applications may not require the full presently-preferred embodiment, and a practitioner may freely employ some aspects of the techniques or the presently-preferred embodiment while omitting others, or may employ certain aspects in conjunction with other technology or design, according to the needs or circumstances of the particular application.

Summary of Detailed Description

The Detailed Description provides implementation details of a first presently-preferred embodiment of a robotic companion called a "Huggable." The Huggable is a new type of robotic companion featuring a novel combination of a full-body multi-modal sensitive skin, inertial measurement unit, microphones, vision cameras, quiet back-drivable actuators, a speaker, passive potentiometers at joints for joint angle position sensing, internal temperature sensors, internal or external power sources, position sensors such as GPS, interfaces such as Bluetooth, and an embedded PC with an 802.11g wireless communication interface. This robotic platform is designed with an emphasis on communication. Thus the Huggable can function as a fully autonomous robot or as a component of a "Huggable system", in which the Huggable function as a semiautonomous robot with some external control, a fully controlled tele-operated puppet, or in a spectrum of degrees of autonomous and tele-operated or remote operation. In a healthcare setting, the Huggable system is able to gather behavioral data such as how often the user pets the Huggable in a day, or other forms of interaction data Note that in the techniques employed here, the remote operator may be but need not be at a great distance from the Huggable robot and the user. A remote operator may even be present in the same room, but behind a partition, screen, or curtain such that the operator cannot see the robot directly, or cannot see the user directly, or may simply choose to use the remote operator interface.

Also, in settings such as nursing care, live audio and video can be shared with the nursing staff, and emergency situations such as a loud noise or the patient's cries of pain can be detected and shared with the nursing staff. In an education setting, the Huggable can be remotely teleoperated by a language expert in a different location to teach language learning through the Huggable, engage in play education, or to engage in various forms of distance learning. Finally, the web-page implementation of control of the Huggable allows for a grandparent to play with a grandchild, or a parent on a business trip with a child, even though they may be physically distant from one another.

The Huggable has a full body sensitive skin, and the ability to gather and share behavioral data from the interactions with the nursing staff, teachers, or other people. The Huggable is capable of many forms of social and affective interaction with a user, as the Huggable is capable of being a fully autonomous robot, semi-autonomous with some human control, and fully remote-controlled teleoperated puppet. The Huggable is designed as a platform and allows much room for expansion to add new devices to communicate with the Huggable, such as medical devices, to improve the healthcare benefits with the staff.

A particular aspect of the techniques disclosed here is the integration of autonomous and remote-controlled operation along a continuous spectrum, with various degrees of autonomous and remote-controlled operation combined in one system.

Special features of the techniques disclosed include the robot's specific design, which combines sensor systems with quiet back-drivable actuators, which enable the device to perform affective and social interactions as required for healthcare, education, and social applications and which enable the Huggable to function in multiple modes: as a fully autonomous robot, as a semiautonomous robot, and as a teleoperated robot, all through the same clean control interface. In addition, the Huggable has the ability to use its sensory system to gather behavioral and interaction data about the Huggable's user in the course of the user's interaction with the Huggable and then to share this data with the nursing staff.

Specific examples of social interaction between the Huggable and the user that are possible with the Huggable include the following:

The Huggable can communicate social approval by a nodding gesture, by patting the user approvingly on the shoulder, or by making body or arm gestures that communicate excitement. Encouragement can be communicated socially by tone of voice, by sound effects, or by patting stroking the user reassuringly on the arm. Social interaction between the user and the Huggable can be detected via the Huggable's ability to provide live video images from its camera eyes to a separate entity such as a remote operator, or by the Huggable's automatic classification of the type of touch that the Huggable receives from its user. For example, the Huggable can detect that the user has patted the Huggable on its shoulder. Further, the Huggable can direct the user's attention to a particular object by pointing or gesturing for the user towards the object. Additionally, if the user suddenly speaks loudly, this communicates to the Huggable or to the operator of the Huggable that there is an immediate need for attention.

A second form of the presently-preferred embodiment is referred to as the "Smart Book Huggable". This second form is based upon the "Reading with Rover" program in which dogs are brought into libraries for children to read to them. The Smart Book Huggable Technology features two components—a smart book and a Huggable robot, embodied perhaps as a soft robotic toy. As the child reads the story to the soft robotic toy, the specific Book ID and the page number that the child is currently reading from are sent to the toy. The toy then prompts the child with feedback based upon where they are in the story. This feedback is open-ended such as "This is my favorite part", gestures of excitement, or other emotional expressions. The feedback may further be based on images of the pages of the book which the Huggable robot provides to the Huggable system.

Currently, much technology exists in which a toy reads to the child, thus the child is not an active reader but is rather a passive listener. The Smart Book Huggable technology flips this interaction so the child is the reader and the robot is there to provide feedback to encourage the joy of reading. While smart book technology currently exists it has yet to be paired with a robotic companion.

The Smart Book Huggable employs a special interaction paradigm of a child reading to a robotic toy. The specific technology of the smart book enables communication with the robotic companion and with the child.

A third form of the presently-preferred embodiment is referred to as the "Huggable Squeeze Doll," a special type of sensor device for use in hospitals and nursing homes as a call device when a patient is in pain. The device is a Huggable robot, embodied as a soft doll in a humanoid form factor (arms, legs, body, and head) with a series of soft, easily squeezed, air bladder sensors in each body region. This device registers a squeeze in a specified body region and then transmits this information to the nursing staff to help locate the body region of a patient who is pain. These data can then be recorded for later analysis and charting of a patient's progression through a therapy.

Current medical devices for communication are primarily push button intercom systems. However, this does not work well when the patient cannot verbalize where they feel pain. Additionally, it is up to the staff to record and tend to where the patient feels pain, and if the patient has difficulty verbalizing, it is a very time consuming process to identify the location of pain. While single air bladder squeeze bulbs exist for use in some communication devices (such as those to alert the doctors during an fMRI) the use of multiple such sensors in a humanoid doll form is unique, and the application of such a device to indicate the location of pain is unique. Also, unlike switches and other sensors used in current toy technologies, air bladders allow for a multi-level of squeeze indication for both healthy and patients without much force. Finally, the ability to share and record these data with the staff can help automate some tasks of healthcare and provide care when there is a shortage of nursing staff.

Huggable Subsystems

In the presently-preferred embodiment, the Huggable features a full-body sensitive skin, a speaker for audio output, microphones for audio input, and video cameras for video input, as well as silent back-drivable actuator mechanisms, an inertial measurement unit (IMU) as described by Morris in S. J. Morris, "A Shoe-Integrated Sensor System for Wireless Gait Analysis and Real-Time Therapeutic Feedback," in *Health Sciences and Technology Sc.D. Thesis* Cambridge: MIT, 2004, and an embedded PC with wireless communication capabilities for implementation of Huggable behaviors, patient monitoring, and data collection. Additionally, the video and audio inputs allow for further multi-modal interactions. Various subsystems in the presently-preferred embodiment will now be set forth.

Details of the Huggable's Physical Appearance

In the presently-preferred embodiment, the Huggable's form is based upon an anthropomorphized fantasy animal—the Teddy Bear. Because the Huggable is not based on a real animal, there is room for freedom of design of behaviors. There are no preconceived notions of how the teddy bear should behave. The form factor of the Teddy Bear appeals to a wide range of users from the elderly to small children and encourages interaction. Also, the choice of a Teddy Bear alleviates any concerns about replacing living cats, dogs, etc. with robots. Additionally, the Teddy Bear is a universal symbol of comfort across many different cultures and countries. The specific stuffed Teddy Bear form was chosen for the presently-preferred embodiment from commercially available Teddy Bear forms. This form is approximately 18 inches tall and thus an appropriate size for the types of interactions in many applications, and has soft fur which is very pleasant to touch.

Alternatively, other form designs may be chosen in keeping with this presently-preferred embodiment, for reasons of cultural reference, psychological considerations for a client or patient population, the desire to use a well known character form or property and bring it to a new level of interaction using Huggable technologies, or other factors.

Overview of Synthetic Skin

In the presently-preferred embodiment, it is desirable that the Huggable feel soft and "fleshy" like a living creature, not hard like a traditional robot. A silicone skin provides this soft feel. Silicone skins are well known in the art, as they have been used in other robotic platforms, prosthetics, and the animatronics of the special effects industry. As is well known, silicone rubber can be formulated to be as soft as human skin and pigmented to have a very realistic look. References to this known art include Hara and Kobayashi, "State of the art in component technology for an animated face robot: its component technology development for interactive communication with humans," *Advanced Robotics*, vol. 11, pp. 585-604, 1997; Breazeal et al, "Interactive Robot Theatre," *Communications of the ACM*, vol. 46, pp. 76-85, 2003; and McLaughlin, *Silicone Art: Materials, Methods & Techniques for Coloring, Painting, and Finishing Silicone Rubber Version 1.1*, 1.1 ed. Sherman Oaks, Calif.: McLaughlin Productions Publishing, 1999.

In addition, the silicone skin serves a functional purpose. The skin helps to distribute the forces applied to the top surface across multiple sensors. The skin also protects the sensors from damage. The skin formulation is chosen to have a high elongation and tensile strength that make it appropriate for robotic applications, especially in areas of high movement.

FIG. 1 shows the completed assembly of a cross section 101 of the lower arm region of the Huggable robot, as an example of the construction. The fur arm sleeve 103 is then placed over the silicone rubber 105. A series of snaps in the soft fur exterior, not shown in FIG. 1, allow for easy removal for cleaning and sterilization, which is very important for use in a health care environment where the Huggable robot could be passed among various people.

Movements and Mechanical Design

In the presently-preferred embodiment, it is desired that interactions with the Huggable are similar to the ways people interact with lap animals (such as rabbits, cats, and small dogs). Thus, the motion design of the presently-preferred embodiment Huggable is focused on expression and orientation and not locomotion: means and designs for robotic locomotion and manipulation are well known in the art, and may be readily included in an alternative implementation of the presently-preferred embodiment. In the implementation of the presently-preferred embodiment set forth here, the design includes a 3-degree-of-freedom (DOF) neck, 1-DOF ear mechanism, and a 2-DOF shoulder mechanism. These neck and shoulder mechanisms allow for responses to touch such as orienting towards touch, nuzzling, hugging and combining these DOFs with ear motions. The ear mechanisms are used in part for expression of the robot's affective state. Additional degrees-of-freedom may also be employed to expand the expressive range of the robot.

The motion design for the two arms is such that their motions are decoupled, thus allowing each arm to rotate and move in and out independently of one another, for a total of 4-DOF. This allows for a much larger range of expression and interaction. The motor driver board employed has a limit of 8 channels, entailing a trade-off that in order to gain extra movement in the arms and neck, we some sacrifice of movement in the face is accepted.

Other motions are coupled or not coupled, as a matter of design choice.

One concern with the use of robotics with an elderly population or small children is the risk of injury. Robots have motors and moving parts that could potentially hurt an individual. In many prior-art robotics applications, geared motors are used. These motors usually are not back-drivable and rely upon a control system to prevent injury to the user or damage to the robot. In addition, these motors have backlash in the gear train and are often noisy.

Accordingly, in the presently-preferred embodiment, actuators are employed which are back-drivable and silent, or nearly so. Any actuators that meet these criteria and other readily apparent design criteria such as safety may be used. One example is actuators similar to voice coil actuators developed at M.I.T. and described by McBean and Breazeal in "Voice Coil Actuators for Human-Robot Interaction," in *IEEE/RSJ International Conference on Intelligent Robots and Systems* (IROS04), Sendai, Japan, 2004. This technology allows for smooth, life-like motion, without backlash.

Figure 2A:
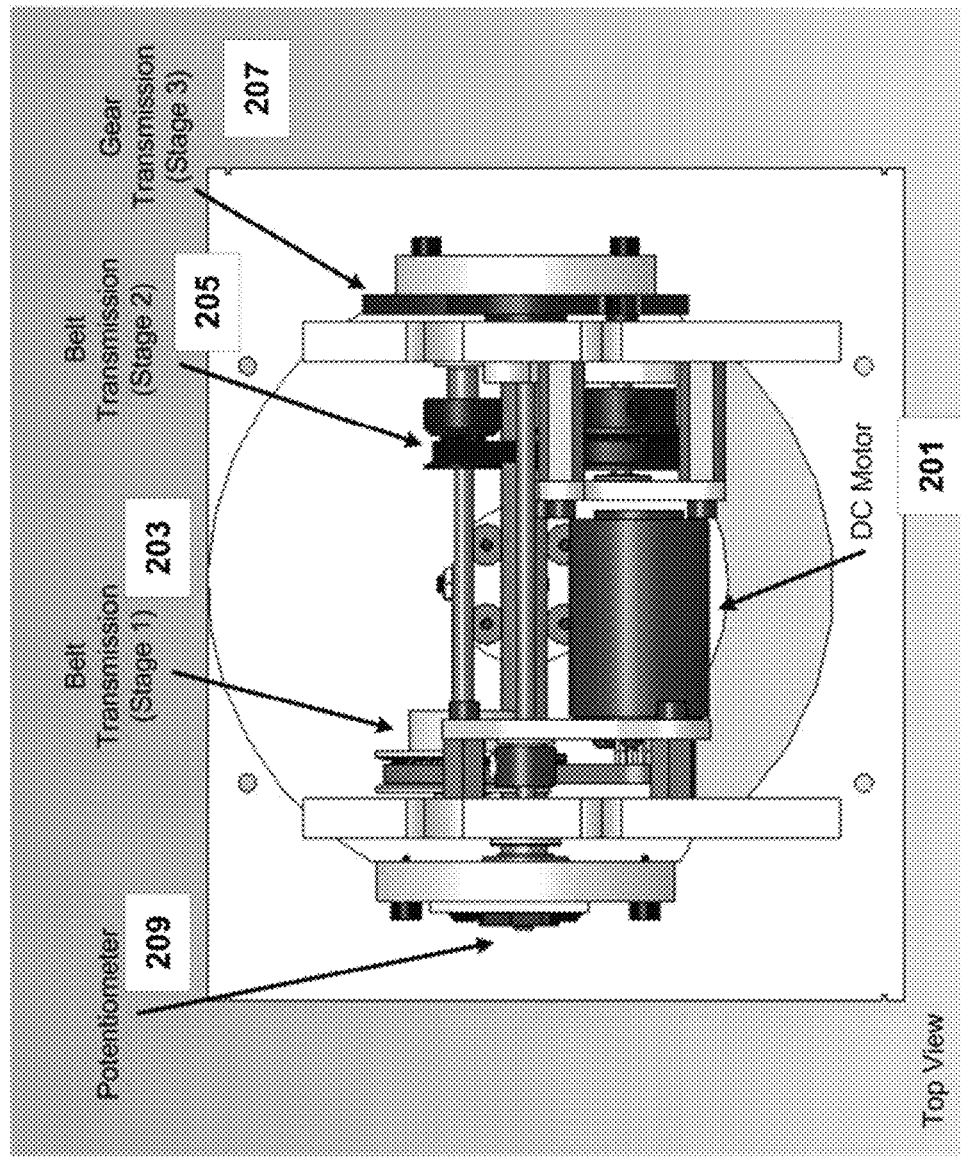
FIG. 2A is an illustration of the Neck Nod-motion joint and motion actuator for the Huggable robot, shown in a top view.
Figure 2B:
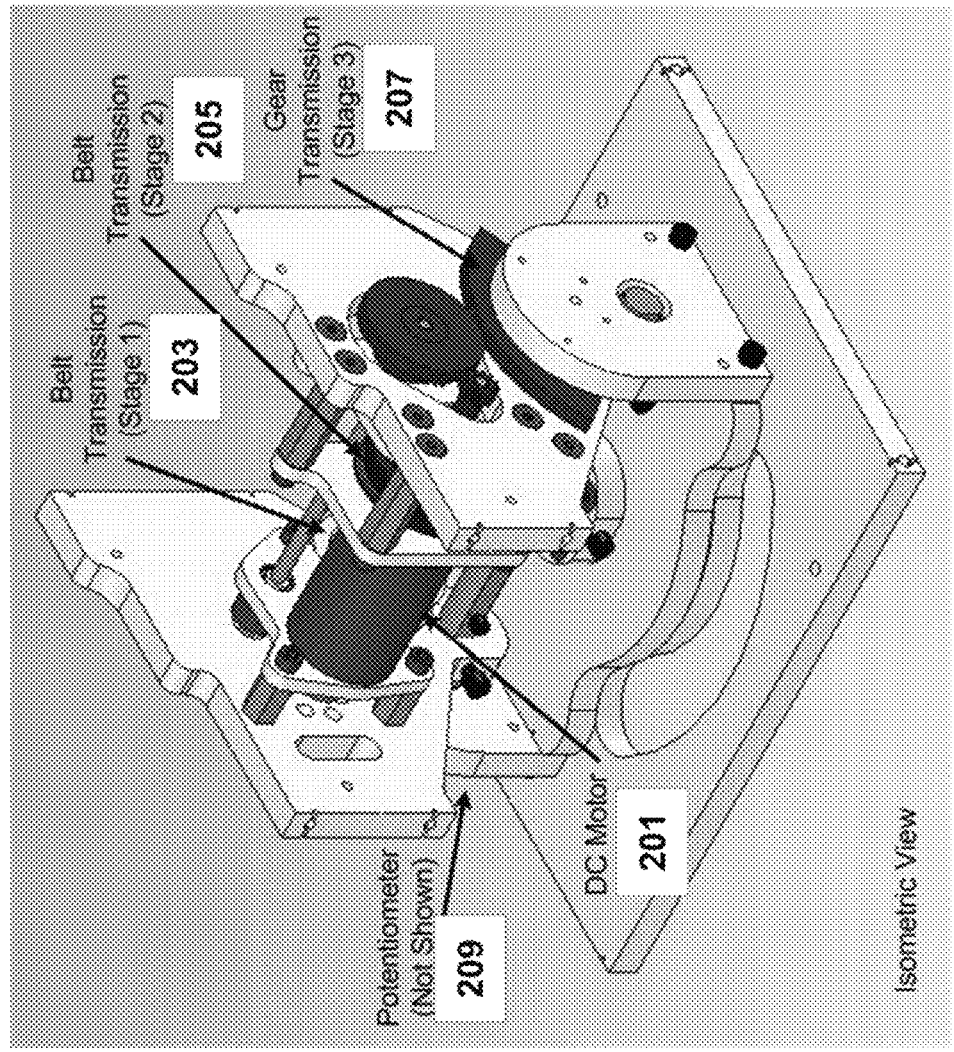
FIG. 2B is an illustration of the Neck Nod-motion joint and motion actuator for the Huggable robot, shown in an isometric view.
Figure 2C:
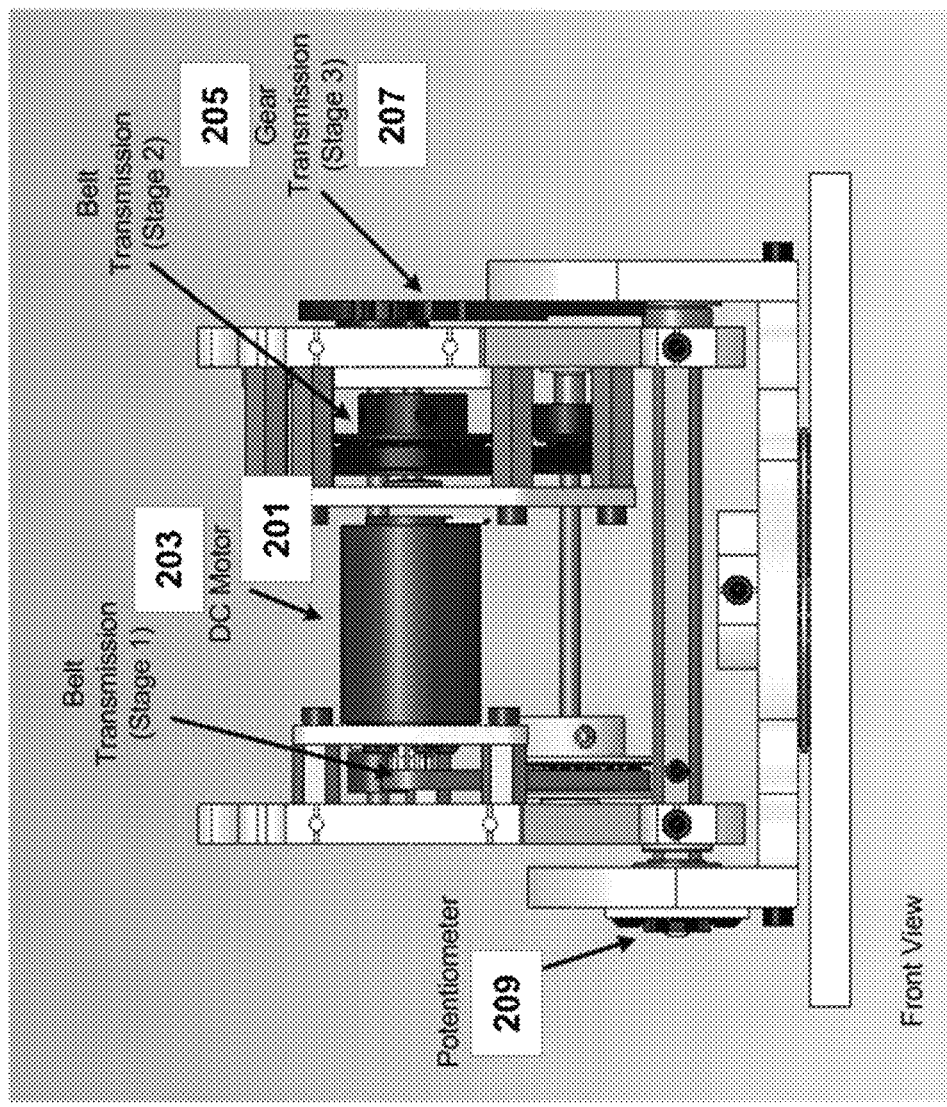
FIG. 2C is an illustration of the Neck Nod-motion joint and motion actuator for the Huggable robot, shown in a front view.

Other actuator designs may be chosen due to considerations such as commercial availability, cost, or size and power constraints. The design used in the preferred embodiment is illustrated in FIG. 2A, FIG. 2B, and FIG. 2C. The design is based on DC motors with belt drives with low gear ratios. The figures show the design as it is employed in the Neck Nodmotion Sub-assembly. Actuators made according to the design are back-drivable, quiet, and smooth, with the added benefit of using stock parts.

FIG. 2A shows a top view, FIG. 2B shows an isometric view, and FIG. 2C shows a front view of the Neck Nodmotion subassembly and the hybrid belt/gear transmission design. This mechanism design is repeated in the other seven degrees of freedom using different ratios at each stage for the appropriate output torque and speed. As noted, this design ensures that the drive mechanisms produce smooth motion with minimal backlash, while keeping the robot backdrivable, and very quiet. This design also requires minimal power to promote longer battery life. Traditional gear transmissions as known in the art have the problems of backlash, noise, and problems with backdrivability in large gear ratios, but they allow for large transmission ratios in a compact form factor. Belt transmissions are quiet, have minimal backlash, and are backdrivable, but these mechanisms are much larger than gear transmissions. The hybrid belt/gear transmission design employed combines the best features of each type of transmission into one.

In this design a DC motor 201 without an attached gearbox with an encoder is used as the actuator for that degree of freedom. This motor is connected to a belt transmission 203 in the first stage. The output of stage 1 is connected to a second belt transmission 205 for stage 2. Finally, the output of stage 2 is connected to a gear transmission 207. A potentiometer 209, coupled directly to the output stage of the actuator, is used for position sensing. Because the potentiometer is on the final output stage by means of an accurate coupling, the potentiometer always measures the true and accurate position of the mechanical part (in this case the neck and head), both when the part has been moved by the actuator alone and when the position of the part has been change manually by the user or the actual position of the part has been affected by an obstruction or other element in the robot's environment. Other types of sensors may be used instead of potentiometers as a matter of design choice, such as optical shaft encoders or various types of mechanical encoders.

This hybrid system has close to a 100:1 total gear train split roughly 9:1 for the belt transmission and 10:1 for the gear transmission. In FIGS. 2A, 2B, and 2C, the stage 1 belt transmission is 3:1 and the stage 2 belt transmission is 3:1 for a total 9:1 final transmission across the two belt stages. The use of the belt transmission first allows for quiet actuation without backlash. The motor output shaft spins with low torque and high speed. If a prior-art gearbox were to be used here, the high-speed motion of the gears would result in a loud audible noise. By reducing the speed at the end of the belt transmission stage by a factor of 9, the output shaft of the stage 2 transmission moves much more slowly and thus the attached gear stage runs more quietly. The large gear transmission in the single stage 3 allows for easy backdrivability.

Mechanical Construction

In the presently-preferred embodiment, the mechanical construction and the skin of the Huggable consists of a series of regions—the arms, the legs, the head, and body. The body contains an embedded PC, somatic processing sensory circuit boards, the inertial measurement unit, additional sensor processing circuit boards, and the motor driver circuit boards.

The Huggable robot is designed to be held in one's arms, thus, it is important minimize the overall weight. The mechanical structure is made of lightweight, strong materials such as plastics and fiberglass. The sensor circuit boards and actuators are mounted to this structure. The use of metal inside the robot is minimized, so as not to interfere with electric field sensing set forth below as part of the implementation of the sense of touch or force in the "sensitive skin".

Power is supplied to the Huggable via a tether, or alternatively an implementation may instead use an internal battery.

Construction of the Head

Figure 15:
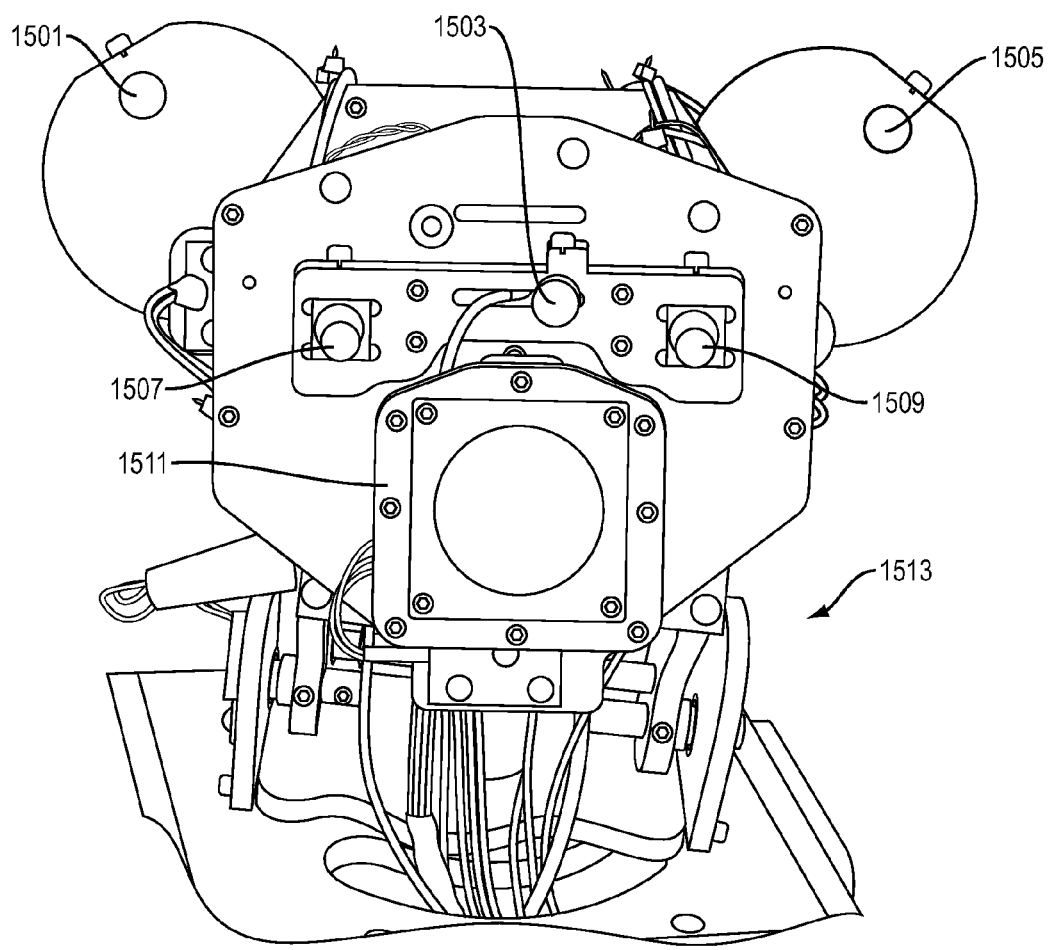
FIG. 15 is an illustration of the location of vision sensors and other components in the head of the Huggable robot.

FIG. 15 shows the construction of the head below the outer layer of sensitive circuit boards, silicone rubber, and fur. The head contains microphones 1501, 1503, and 1505 for audio input: the use of multiple microphones in an array at appropriate locations on the Huggable's body make it possible for the Huggable to localize the source of a sound with respect to the Huggable. Two small video cameras, one color and one black-and-white, are shown at 1507 and 1509. A speaker 1511 is included for audio output. The Neck Nod-motion mechanism, which is also illustrated in FIG. 2A, FIG. 2B, and FIG. 2C, can be seen at 1513.

Sensors

Touch Sensors and the Sensitive Skin

Much of the interaction between humans and animals is based on touch. Skin receptors cover the entire surface of an animal and can detect a wide variety of stimuli such as temperature or pressure. The animal is then able to infer the affective content of the tactile interaction by processing the outputs of these receptors.

In a similar way, the Huggable features a "Sensitive Skin." This full body coverage of sensors is based upon the organization of the somatosensory system in of humans and animals, as described by Kandel et al in *Principles of Neuroscience, 4th Edition*, 4th ed. New York: McGraw-Hill Health Professions Division, 2000. Unlike other robotic companions known in the prior art, the Huggable is designed to respond to affective or social touches from the Huggable's user with affect or social behavior of its own.

The somatic receptors in human skin are divided into four modalities—touch, pain, temperature, and kinesthetic information. Within each of these modalities is a set of receptors that encode one specific region. Our human somatic sense of the world around us is encoded by these receptors. These receptor outputs are then combined together in higher cortical structures of the somatosensory cortex to form our perception of touch.

The presently-preferred embodiment follows the approach known as the "Somatic Alphabet Approach" for the design of robotic sensitive skins, as described by Stiehl in "Tactile Perception in Robots: From the Somatic Alphabet to the Realization of a Fully 'Sensitive Skin'," in *MIT Mechanical Engineering Bachelor's Thesis* Cambridge: MIT, 2003, p. 174, and by Stiehl et al in "A 'Somatic Alphabet' Approach to 'Sensitive Skin'," in *International Conference on Robotics and Antomation*, New Orleans, La., 2004. In this approach, each sensor is treated as a "letter" of an alphabet. These "letters" are combined through population coding to form the higher cortical processing, or "words." Finally these "words" can be combined with other senses, such as vision, to create "sentences." This approach is based upon the current understanding of the somatosensory system in humans and animals.

Analogously, the preferred implementation of the Huggable features four modalities of somatic information—pain, temperature, touch, and kinesthetic information. For touch, both electric field (Motorola/Freescale Semiconductor 33794 electric field sensing integrated circuit) and force sensors (Quantum Tunneling Composites (QTC) obtained from Peratech) are used. Temperature is sensed using thermistors and IC temperature sensors. For kinesthetic information, potentiometers are used at the joints and linkages of the mechanical construction. These potentiometers are a component of the actuators that implement the active degrees of freedom disclosed in the presently-preferred embodiment, as well as in points of motion in each leg for which motion is passive. In the presently-preferred embodiment, these passive points of motion are ankle rotation, hip in/out, and hip up/down. Further, pain is treated as an extreme sensor signal for any one of these stimuli.

The combined use of pressure, temperature, and electric field sensors allows for a wide variety of interactions to be sensed. The electric field sensors are tuned to detect the proximity of a human hand to within 1 inch from the surface of the electrode. As is readily understood, these proximity sensors produce a signal level which indicates the closeness of proximity up to and including actual contact at very light force. Thus very light touches, such as gentle brushing of the surface or the skin covering the surface can be detected. The force sensors alone would not detect these interactions. Such a sensor is especially useful for populations, such as the elderly and small children, who may not have the strength to activate the force sensors.

The combination of the three sensor types allows for interactions with a user to be distinguished from interactions with an object. This distinction is useful for the classification of affective or social touch. For example, only an interaction with a user will invoke the Huggable's response to tickling. The electric field sensors are tuned for contact with a user, who provides a ground path for the signal. Similarly, the presence of body heat sensed by the temperature sensors is an indicator of contact with a user.

The combination sensor types in the sensor skin, at fine resolution in full-body coverage, allows the Huggable to distinguish both local and body-wide touch gestures by the user as well as recognizing the affect or mood of how the user's gesture is expressed. The Huggable can thus distinguish and recognize social touch for the emotional content communicated by the gesture. In the body-wide scale, the regional distribution of the touch enables the Huggable to recognize social gestures such as tickle, head pat, and hug. The control software determines whether these local and body-wide gestures are angry, friendly, or timid, or whether, given the force or timing pattern of the touch gesture, the gestures are appropriate or inappropriate. Gesture recognition and behavioral/affective classification can be used to infer the cognitive or emotional state of the user, such as a child. This information can be presented to the operator, or in the case of autonomous and semi-autonomous behavior, used by the control software to drive the behavior system of the robot itself, as matter of the "emotional state" of the robot. The sequences of touch gestures by the user are further compiled in the recognition of touch interaction modes and emotional moods of the user, and influence the robot's attention and response.

Figure 3:
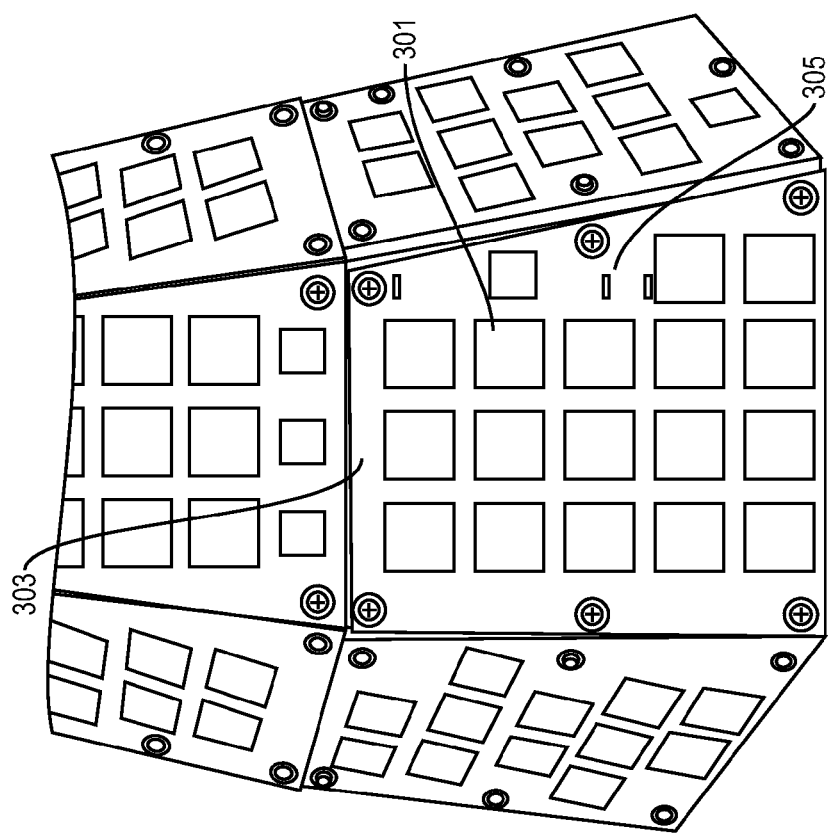
FIG. 3 is an illustration of the sensitive skin on the body section of the Huggable robot.
Figure 4:
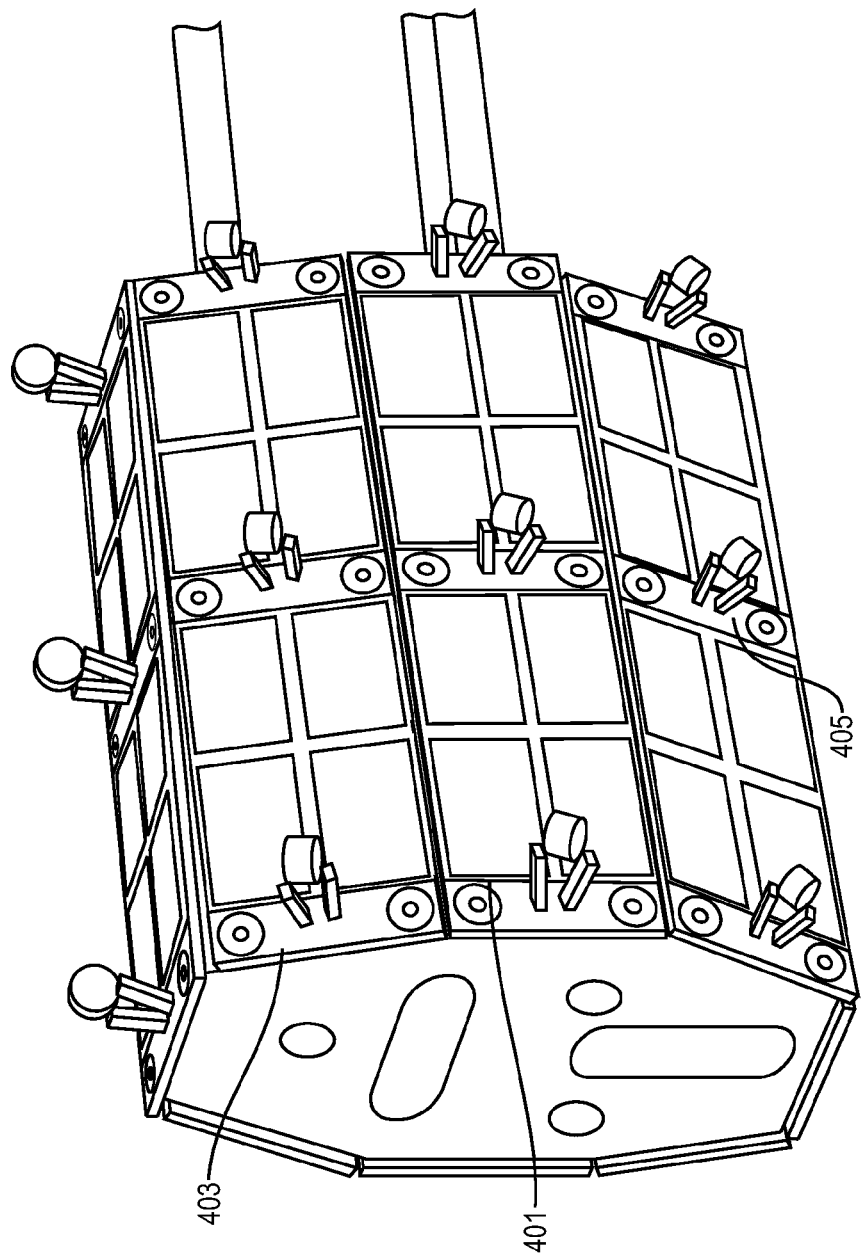
FIG. 4 is an illustration of the sensitive skin on an arm section of the Huggable robot.

FIG. 3 and FIG. 4 show two sections of this sensitive skin. The body section shown in FIG. 3 is divided into four separate regions—left side, right side, back, and bottom. The lower arm section shown in FIG. 4 is one of five separate divisions of the arm—upper arm, middle arm, elbow, lower arm, and paw. Each section of the sensitive skin consists of a set of sensor circuit boards—8 in the lower arm section, and 6 in the left side body section. These sensor circuit boards are mounted to plastic understructure (not shown) for support. The size and number of sensors within each body region is dictated by the geometry of the robot.

Each sensor circuit board has three kinds of sensors. The white squares 301 on the circuit boards 303 in FIG. 3 and similar white rectangles 401 on the circuit boards 403 in FIG. 4 are the QTC sensors. The metallic discs 405 in FIG. 4 suspended above the surface of sensor circuit boards in the lower arm section are the thermistors. In the presently-preferred embodiment, the thermistors used are surface mount and soldered to the surface of the sensor circuit boards as shown in the body section. Equivalent constructions on these and other aspects are readily apparent.

Figure 10:
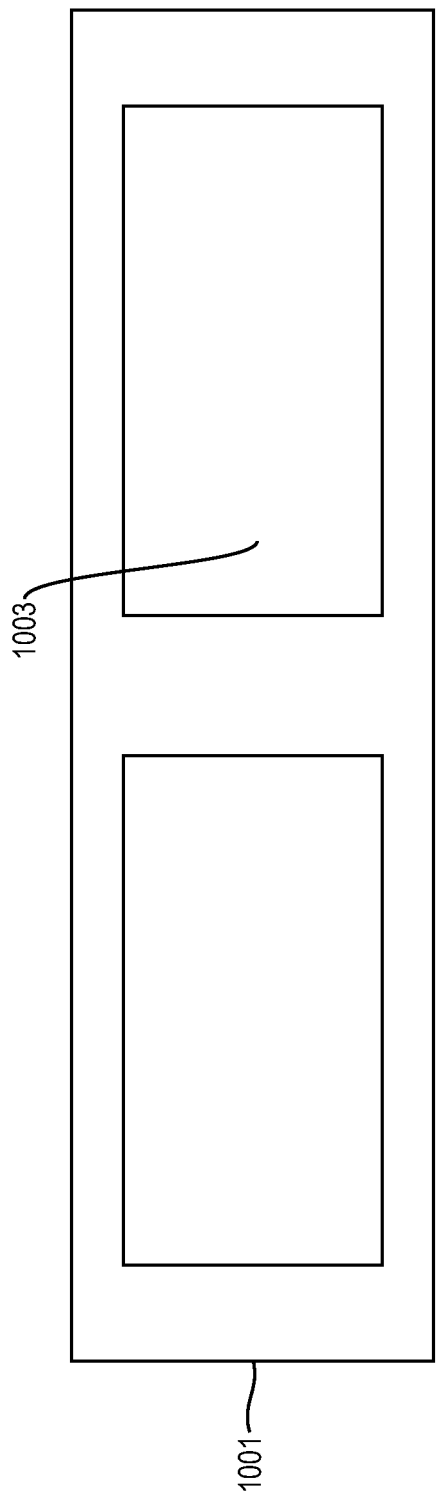
FIG. 10 is an illustration of the sensor circuit boards and shielding.

Additionally, the copper electrodes used for electric field sensing are an internal layer of the circuit board (not shown). For small circuit boards, such as in the lower arm section, the electrodes of four circuit boards are combined together to form one electric field sensor. In larger circuit boards, such as those in the left side of the body, the electrode in one sensor circuit board is used as one electric field sensor. Copper shielding is mounted to the bottom side of each sensor circuit board to reduce interference and improve the electric field sensor signal. The sensor circuit boards 1001 and shielding 1003 are shown in FIG. 10.

The presently-preferred embodiment is designed not only to have multi-modal sensing, 5 but also to have a fine spatial resolution of sensors. For applications that are concerned with detecting human tactile interaction, the sensors are sized to detect a single fingertip: different sizes of sensors may be employed for other spatial resolutions, and other types of sensors may be used equivalently. As shown in FIG. 3, one single sensor circuit board 303 in the left side body region has 18 QTC sensors 301, 3 temperature sensors 10 305 and one electric field sensor (not shown). One sensor circuit board 405 in the lower arm section has 8 QTC sensors, 3 temperature sensors 405, and one electric field sensor (not shown) shared among three other circuit boards. Thus, the Huggable's full-body sensitive skin as laid out for this embodiment has approximately 1500 sensors in total.

Vision Sensors

Figure 5:
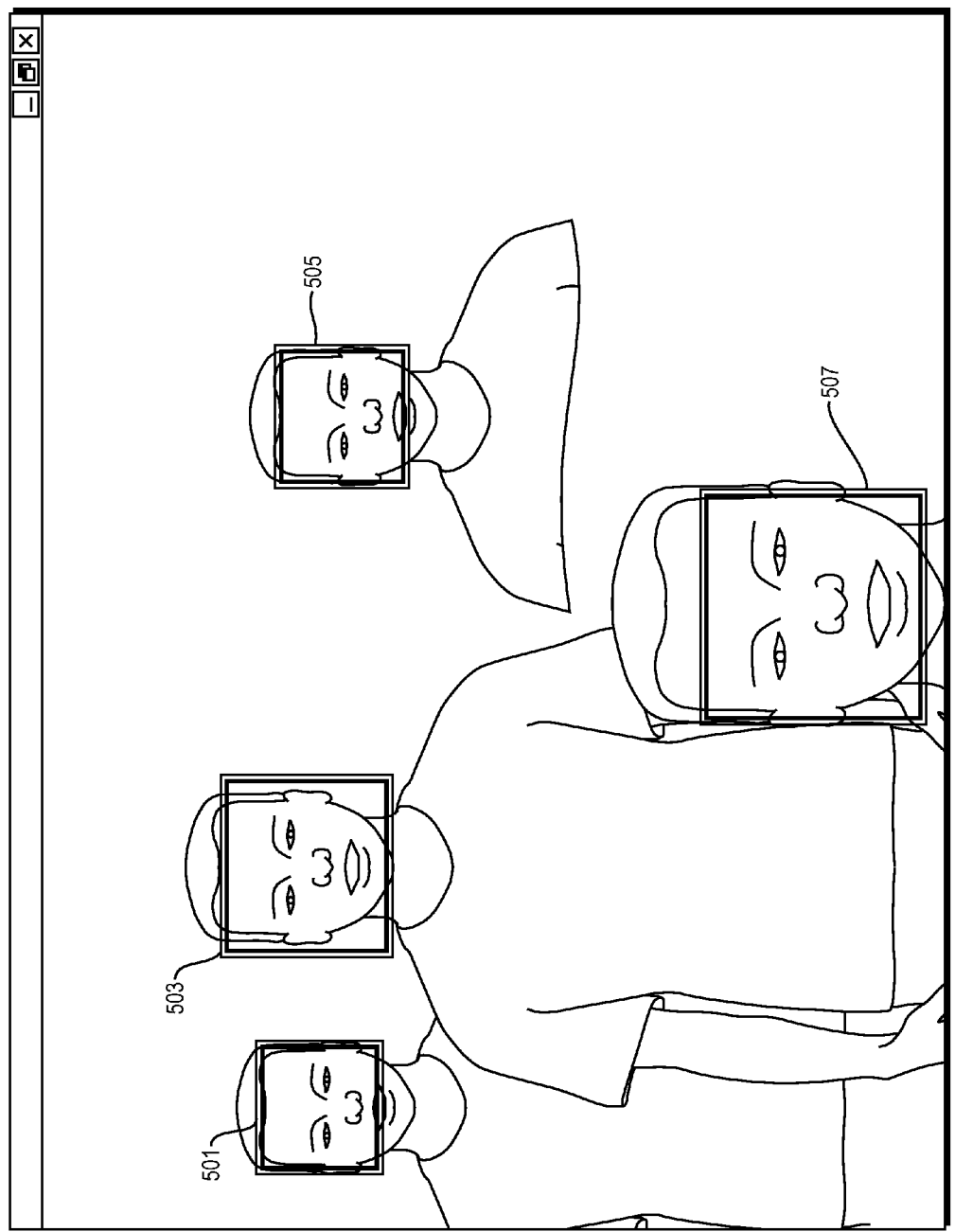
FIG. 5 is an illustration of face detection in an image from the black-and-white eye camera of the Huggable robot.

Vision is also employed in the Huggable. There are two broad classes of interaction that involve vision: autonomous visual behaviors, such as the Huggable autonomously turning its gaze towards people's faces, and tele-operation, to permit a remote puppeteer who is operating the Huggable to see the Huggable's current environment. The Huggable robot features two cameras, one in each eye, for these uses. A color camera (Supercircuits PC229XP) is used in one eye while a black-and-white camera (Supercircuits PC224XP) is used in the other eye. Each camera has 470 lines of NTSC resolution with the black and white camera performing well in low light situations. The analog output of each camera is digitized by a USB frame capture device and sent to the Embedded PC inside the Huggable. Known art for face detection is employed in the presently-preferred embodiment, such as the OpenCV library for face detection of multiple faces, documented at opencvlibrary.sourceforge.net. FIG. 5 shows the result of this face detector on an image from the black and white camera. Rectangles 501, 503, 505, and 507 are displayed by software showing the faces that have been detected in the image data.

The type of camera is a matter of design choice. In the presently-preferred embodiment, the black and white camera is used for low-light conditions, and the color camera for well-lighted conditions. A higher resolution or variable-resolution camera may be chosen if, for example, it would enable an entity more easily to read printed text in a book placed in front of the robot's eyes. More than one camera can be used to give stereoscopic vision, similar to the use of multiple microphones in the robot's head so that sound directions can be localized.

Other Sensory and Output Systems

The Huggable has two types of interaction zones—physical contact, such as holding the Huggable in ones arms and petting it, and non-physical contact, such as when a user is walking towards the robot or playing a game in front of the robot. Physical contact interactions are dominated by responses to input from the sensitive skin and the Inertial Measurement Unit (IMU). Vision and Auditory sensing are used primarily for the nonphysical contact interactions. The IMU, vision, and auditory systems are set forth as follows.

The Huggable robot has the ability for the Huggable to demonstrate affective or relational or social touch, i.e. when it is held in someone's arms and petted it turns towards the user holding it and nuzzles into them, in a similar way that an animal does. The Huggable not only determines where the user is in relation to itself, which information can be obtained from the sensitive skin and other sensors, but also its own orientation in space. Additionally, there exist a large catalogue of potential gestural interactions that a user can have while holding the Huggable in her/his arms—for example, from rocking the Huggable back and forth, to bouncing it up and down, or even simply picking it up for the first time, or putting it down, and additional gestures.

Inertial Measurement Unit (IMU)

In the presently-preferred embodiment, a slightly modified a six-axis inertial measurement unit (IMU) is mounted in the body section of the Huggable. The IMU employed is a straightforward modification of a design developed at the MIT Media Lab by Morris as part of a package for wireless gait analysis, as documented in "A Shoe-Integrated Sensor System for Wireless Gait Analysis and Real-Time Therapeutic Feedback," in *Health Sciences and Technology Sc.D. Thesis* Cambridge: MIT, 2004. The small size package features three axes of acceleration, three axes of gyro information, and a tilt switch. This original design has been augmented to include additional tilt switches to sense static position such as if the Huggable is upright, on its back, etc. By use of the IMU, user gestures that involve moving and/or reorienting the Huggable are recognized by appropriate software, such as software employing neural net technology.

The IMU thus incorporates a sense of balance into the robot, similar in concept to the sense of balance and orientation from the semicircular canals in the human ear.

Sound and Auditory Sensors

Another important aspect of the interaction between humans and companion animals is through sound. People affectionately speak to an animal as they are petting it or call its name to get its attention. The presently-preferred embodiment of the Huggable includes a set of four microphones, so arrayed as to permit not only their use for sensing for orientation relative to a user or other sound source, but also to detect the affective content of the user's voice through vocal prosody. This detection is performed in software using known methods, such as methods similar to those described by Thomaz et al in "An Embodied Computational Model of Social Referencing," in *IEEE International Workshop on Robots and Human Interactive Communication (Ro-*

Man2005), Nashville, Tenn. USA, 2005, pp. 591-598. These microphones are arranged one in the center of the back of the head, one between the eyes in the front of the head, and the last two microphones below each ear in the front of the head.

In addition, a speaker mounted in the mouth of the Huggable is used for audio output.

General Temperature Sensors

The skin/touch sensors previously disclosed include localized detection of temperature in via the sensitive skin.

In addition to these, a further sensory system in the presently-preferred embodiment is a set of 8 IC temperature sensors which are placed at various places inside the Huggable to monitor the internal temperature. This is used in part to prevent damage due to excessive heat. The remediation for excessive heat is also implemented in a fashion to preserve the "illusion of life" with appropriate behavior by the Huggable. When the Huggable gets too hot it starts to shut down and uses a sleep animation to convey this action: software controlling the Huggable animates the Huggable to appear to go to sleep, prior to shutting off the Huggable.

Local Processing of Sensor Inputs

The Huggable system may include the Huggable robot as well as a separate computer for remote communication, puppeteering, and data collection. Communication between the Huggable and the separate computer is by wireless or wired communication. The separate computer is a PC workstation with appropriate software (which includes a standard web browser and network communications software) for communications with the Huggable. As set forth, the Huggable contains an Embedded PC for low-level sensor processing, communication, and control of the motor and auditory output of the robot.

The Embedded PC is programmed with low-level software for each sensory system as well as for the motor and audio outputs.

This low-level software includes software for the functionality of the Virtual Somatosensory Cortex software system for analyzing the somatic input, the vision frame grabber, low level motor control, low level audio output sound player, and the IMU classification module.

An Advanced Digital Logic PC-104+ embedded PC (ADL855PC) was selected in the presently-preferred embodiment as appropriate for the Embedded PC for its small size and computational power. The processor is a 1.8 GHz Pentium M with 1 GB of DDR RAM. A 4 GB or 8 GB USB thumb drive is used for local data storage. An 802.11 USB transmitter/receiver is used for wireless communication between the Huggable robot and the workstation computer. As can be readily appreciated, the workstation computer may physically be a workstation computer used for other purposes, such as a nurse's workstation computer in a hospital setting, with the remote control or puppeteer software of the Huggable running on the workstation computer as an additional application or applications. Alternatively to this implementation, communications may be done on a wired network connection or tether.

In order to process such a large number of sensors cleanly and efficiently, the software and computation follow a model based on the somatotropic organization of the human and animal somatosensory system as put forth by Kandel et al in *Principles of Neuroscience,* 4th Edition, 4th ed. New York: McGraw-Hill Health Professions Division, 2000.

Figure 6:
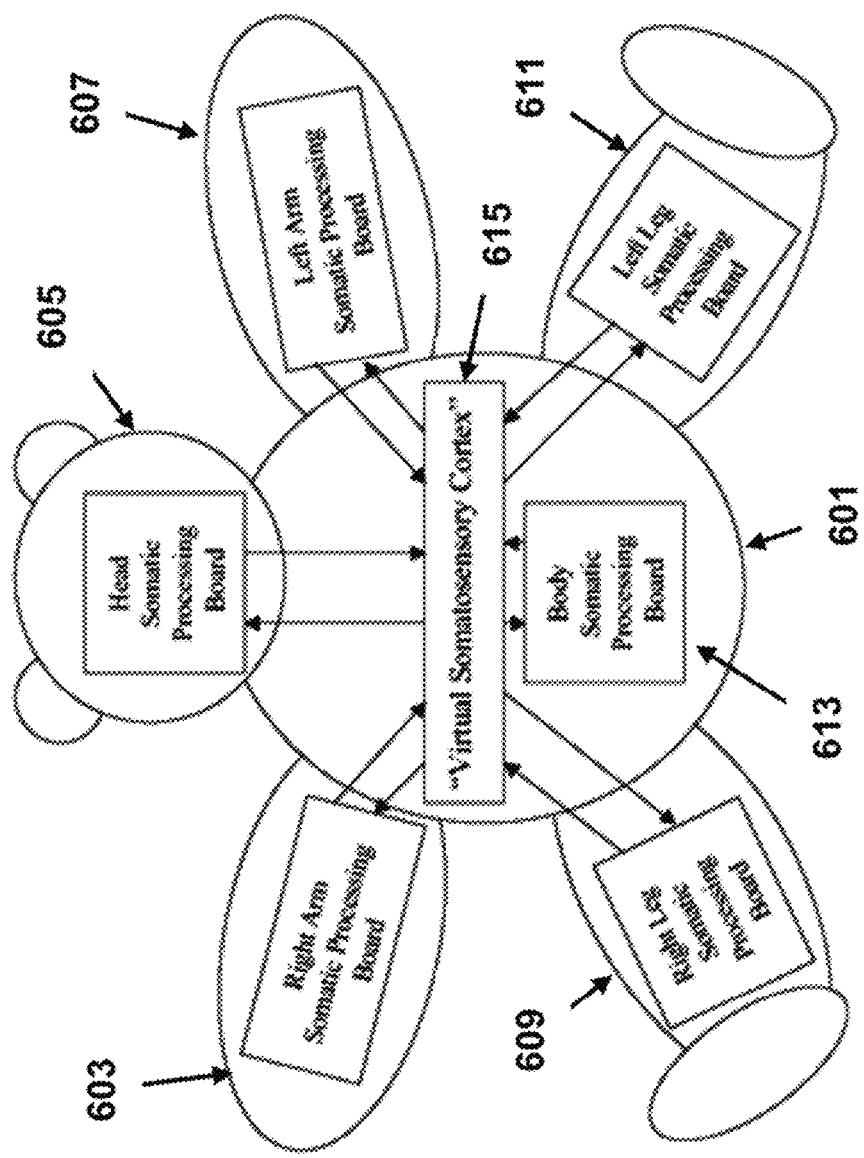
FIG. 6 is an illustration of the different body regions of the Huggable robot for somatic processing of sensor data.

The arrangement is shown in FIG. 6. The sensitive skin is divided into six different regions—the body region 601, the head region 605, the right arm region 603, the left arm region 607, the right leg region 609, and the left leg region 611. A Somatic Processing Circuit Board such as 613 in each body region with a PIC18F8722 microcontroller running at 40 MHz is used to select each sensor, condition the sensor signal, convert this conditioned analog value into a 10-bit digital value, and then finally send this value to the Embedded PC executing the Virtual Somatosensory Cortex software 615 for higher level processing.

In order to reduce the number of wires, multiplexers are used on each sensor circuit board. Between the sensor circuit boards and the somatic processing board in each region is a middle level circuit board which features additional multiplexing as well as isolation circuitry in order to process electric field sensors in one section of the region while processing force and temperature information in other sections of that region.

As is readily apparent, the specific division of processing for sensing control that is shown in the presently-preferred embodiment, including remote control, can be implemented in manners different from the ones used in the presently-preferred embodiment. For example, such well-known principles as virtualization, distributed computation, co-operative networks, and/or of consolidation of processing can be applied such that processing performed by the embedded PC can be performed by one or more remote computers, part of all of the functionality of the microcontroller may be relocated to be performed by the embedded PC, different processors or control systems of differing functionality may be employed, control or sensing functions implemented partially in hardware may instead be implemented in part by software and vice versa, or the processing of any of the processors set forth here may be performed by a number of processors, or a combination of these or other readily apparent design choices. These considerations are matters of design choice, such as to or to make use of alternative components, or to tailor the implementation towards an application as an input/output device, or with different degrees of autonomous behavior, or operation with limited or no tele-operation.

Overview of the Remote Control System
Overview of the Operator User Interfaces (UI)

The Huggable can be controlled remotely by an operator/puppeteer via an Operator User Interface (UI) that may be a graphical user interface (GUI). In keeping with frequent technical usage, the user interface may at times be referred to as a "GUI", even if it is not graphical.

Touch

The use of the multiple different sensor types in the "sensitive skin" and in general, provides the ability to distinguish a wide repertoire of social and affective touch. For example, the electric field sensor is used to distinguish between contacts with a user versus contacts with an object: as is well known, human bodies present a path to ground and thus give a readily-distinguishable electric field sensor signal from other objects. This information can be used to tell the difference between when the Huggable is sitting on a tabletop versus when it is sitting in someone's lap. Also, detecting that touch is coming from a user is also important since one would expect that the Huggable would only be petted or tickled by a user touch and not by contact with an object.

The data from the QTC sensors are combined via software into receptive fields to infer the direction of motion or the size of contact among other aspects. The temperature sensors do not convey much information during short contact times. However, the electric field sensors detect changes that mirror the response of the QTC sensors indicating that the contact was due to a user and not an object. In such contact, the electric field sensors are activated both before and after contact with the QTC sensors as the hand approaches and retreats from the surface of the arm.

For example, when the user performs a petting gesture across the top surface of the lower arm section, a centroid of force location for the user action is calculated in software. The algorithms for such calculation are well known or can be derived in a straightforward fashion. This information is used by software controlling the Huggable to calculate the direction of motion of the tactile interaction, as one feature that can be used by appropriate software for the classification and recognition of gestures, and further can be combined with other features for affective processing.

The control software contains classification algorithms operating in real time, using neural networks or other classification means, which then distinguish various types of affective touch such as those common with companion animals from one another, and from non-affective touch.

Overview of Applications for the Huggable System

Robot as a Remote Communications Device

The Huggable can be used as a remote communications device. For example, the Huggable has numerous advantages as an avatar in remote communications applications such as remote participation on conferences and discussion. Currently in the art, remote participation is limited to telephone conference call participation, video calls, or participation via a virtual reality system such as Second Life, documented at www.secondlife.com and Linden Lab, 945 Battery Street, San Francisco Calif. 94111. Both telephone conference calls and video calls are limited in the expressiveness available to the remote participants, and present an additional cognitive load on the remote participants to control the remote video feed, or because of the lack of visual communication in a telephone conference.

Virtual reality systems are also limited in ways that limit their usability for remote participation in a conference, as all participants must participate via a graphical avatar in the virtual reality environment, even if only one actual participant is remote from the physical location for the discussion. As an example of this application of the techniques disclosed herein, one or more remote participants can be remotely present through a Huggable robot, benefiting from all the advantages of semi-autonomous operation and reduced cognitive load noted for the techniques of the Huggable system. In such applications, it is readily appreciated that the robot may be designed with a different physical appearance than the exemplary Teddy Bear form, as a matter of design choice.

Robot as a Device which Permits Interaction of a User with Other Devices

The Huggable robot acts as a node in a network. The presently-preferred embodiment includes a WiFi, Bluetooth or other wireless connection on the robot. As such, the Huggable can use this network to read from other devices or to communicate with and collect data from or share data with these devices. These devices can include medical sensors for healthcare, home appliances, or other systems.

Figure 12:
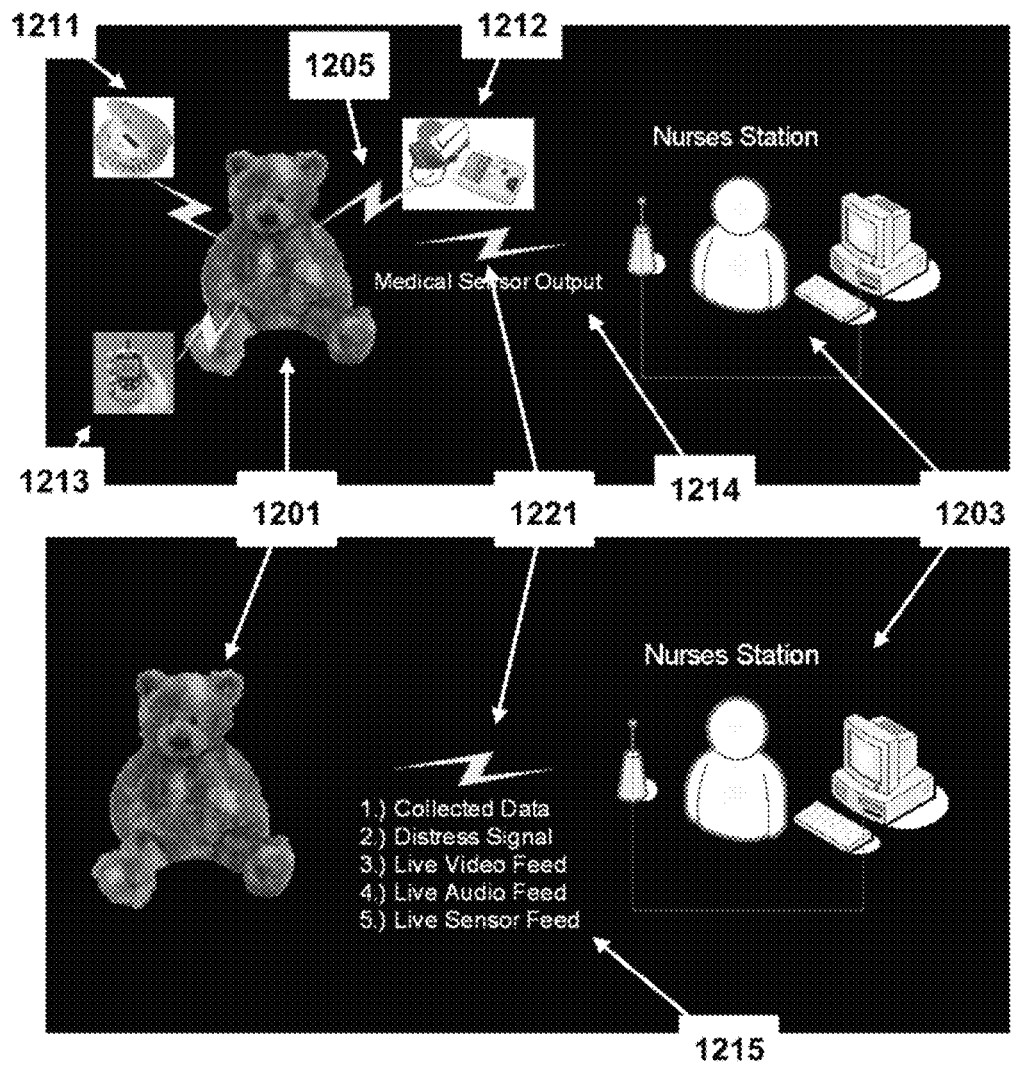
FIG. 12 is an illustration showing the use of a Huggable system in a healthcare, medical care, or similar application.

This is illustrated in FIG. 12, which illustrates two aspects of using a Huggable system in a healthcare or similar application.

The upper part of FIG. 12 shows the Huggable robot 1201 collecting data wirelessly from a number of Bluetooth-enabled medical sensors, such as an electronic pill box 1211 that monitors which pills have been taken, a blood pressure monitor 1212, and an electronic body temperature thermometer 1213. The data 1214 from these medical sensors are all collected by the Huggable robot and transmitted via a local wireless network 1221 to the workstation computer at a nurse's station 1203.

The lower part of FIG. 12 shows the Huggable robot 1201 transmitting a number of types of data 1215 via the local wireless network 1221 to the computer at the nurse's station 1215. Element 1215 shows the types of data transmitted, such as collected medical sensor data, an immediate distress signal such as if the patient had squeezed the Huggable robot tightly in a manner indicating distress. The types of data illustrated at 1215 also include the live video, live audio, and live sensor data that will be displayed in the website operator interface running on the computer at the nurse's station 1203.

Further, the medical sensors themselves can be implemented as Huggable devices or robots, with character personas for these other devices the devices situated as "friends" of the first Huggable robot. For example, a dragonfly character with simple sound and illumination is added to a wristband medical sensor that gathers data on skin conductivity or other medical information, and the dragonfly robot and the Huggable robot controlled by software to interact with each other, and to interact mutually with the patient. In this example application, a playful interaction between the Huggable and the dragonfly character makes the use of the medical wristband friendly and less stressful for the child. In this approach the Huggable system expands to include other devices and robots and thus becomes a much more powerful experience. The two robot devices can each interact autonomously and independently with each other, or their interaction can be autonomous or semi-autonomous behaviors controlled by a single set of software.

Similar applications are readily apparent.

Overview of the Robot

Figure 20:
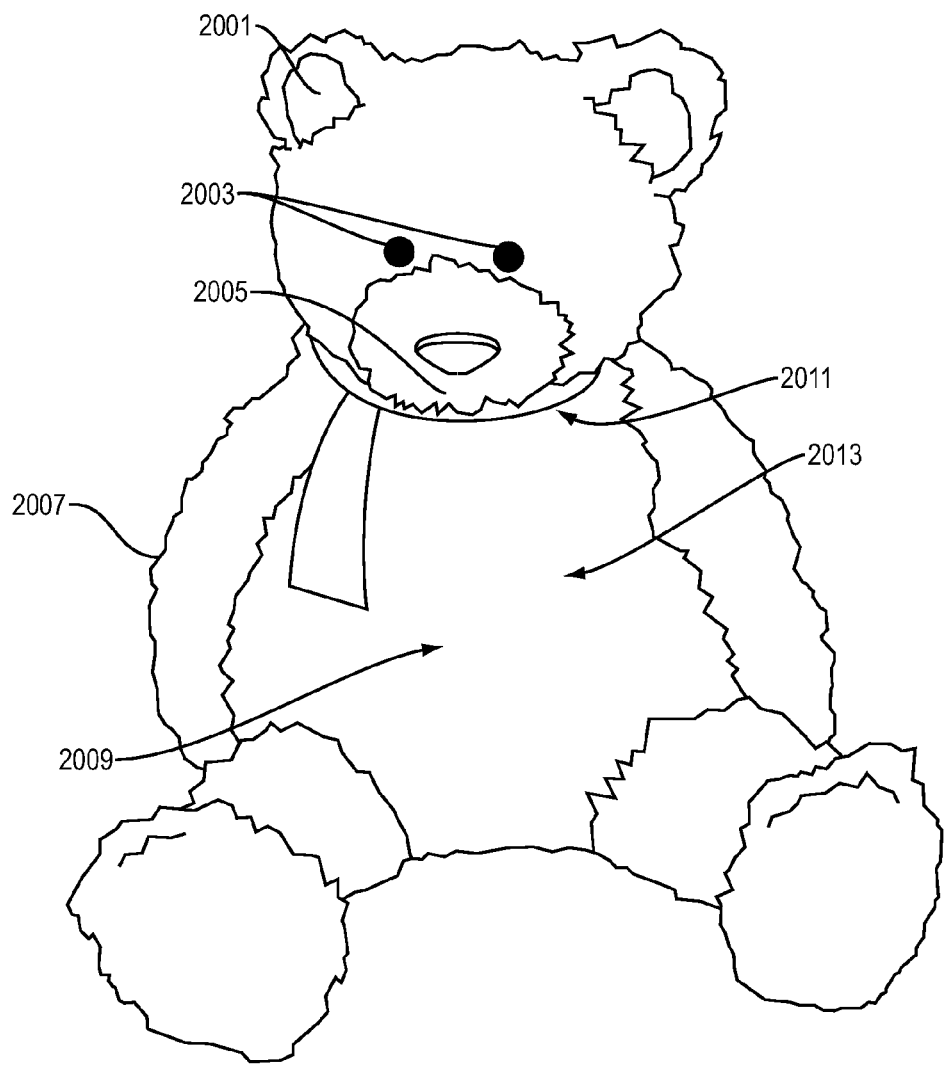
FIG. 20 is an illustration showing an overview of the components of the Huggable robot.

FIG. 20 shows an overview of the components of the Huggable robot.

Video cameras are mounted at both of the robot's eyes 2003. A number of microphones are mounted as an array at specific positions in the robot's head, such as in each ear 2001. A small speaker 2005 is mounted at the robot's mouth. Quiet, back-driven actuators are used at each motion-controlled joint in the robot, such as at the robot's neck nod-motion joint at 2011.

The robot is covered with a pleasant furry cover and latex skin, underneath which is the "sensitive skin" 2007 containing touch sensors of a number of types. Internal to the Huggable robot are an embedded PC 2009 and an inertial measurement unit 2013 used to determine the robot's orientation. Internal sensors not illustrated include temperature sensors for the internal operating temperature of the robot and potentiometers for kinesthetic sensing of the positions of each of the robot's movable joints.

Other details of the internal construction of a presently-preferred embodiment of the robot are laid out further at the appropriate points in this disclosure.

Architecture Diagram

Figure 21:
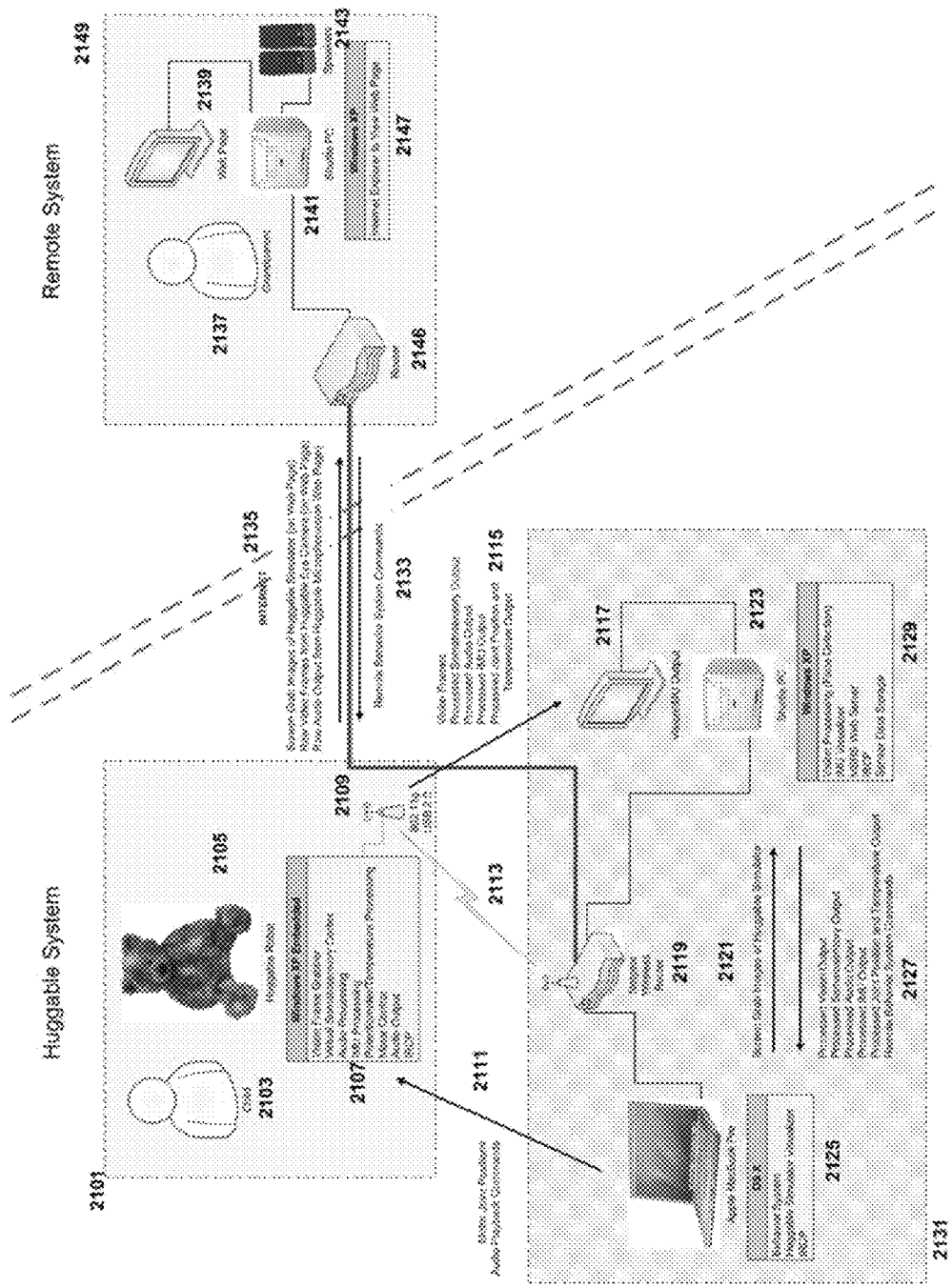
FIG. 21 is an illustration is an exemplary architectural overview of the Huggable system.

The architecture of the presently-preferred embodiment of the Huggable system is illustrated in one exemplary variation in FIG. 21. For clarity, this illustration uses the example of a Huggable system being used in social interaction between a grandparent and a child.

Element 2101 shows the child as the user 2103 and the Huggable robot 2105. The embedded PC in the body of the Huggable robot is illustrated as element 2107. A number of the subsystems operated by the software of the embedded PC are shown as in the diagram, such as Vision Frame Grabber for handling video input from the cameras, the Virtual Somatosensory Cortex, Audio Processing for input from the microphones mounted in the Huggable robot, the IMU Processing for data from the inertial measurement unit, the processing for the potentiometers used for kinesthetic sense and the temperature sensors for temperature sense, Motor Control for operation of the motion actuators to move the robot in a lifelike fashion, processing for Audio Output through the speak mounted in the robot, and IRCP processing software for network communications. The IRCP software implements a straightforward communications protocol for inter-robot communications, and is used as a matter of design choice. Also shown is element 2109, the 802.11 interface for wireless communications. The bidirectional communications between the wireless interface 2109 and the wireless router 2119 are illustrated at element 2113.

Element 2115 illustrates the robot sensor data sent from the embedded PC 2107 to the workstation 2117. The data are physically transmitted via the wireless communications shown at 2113. As illustrated, the data include vision frames for data from the cameras in the robot, processed somatosensory output for touch data from the virtual somatosensory cortex, processed audio output data from the robot microphones, processed data from the output of the robot's inertial measurement unit (IMU), and processed data from the potentiometers used to sense joint position (kinesthetic sense) and from the temperature sensors in the robot.

Element 2131 shows the workstation implementation in a presently-preferred embodiment. In the presently-preferred embodiment, the processing is divided between two physical workstations as a matter of design decision, one of which is an Apple MacBook Pro 2125 running the OS X operating system. A number of the software components executed on this workstation 2125 are also illustrated, and include the software for the Behavior System, the Huggable Simulator Visualizer which generates the virtual image of the Huggable robot showing its actual position and orientation, and network communications software IRCP.

Element 2123 shows the second workstation used in this embodiment, a Shuttle PC running the Windows XP operating system. Element 2129 illustrates the software components executed on this processor, and include the Vision Processing for face detection in the video data from the Huggable robot, an IMU Visualizer for displaying the orientation of the Huggable, the MSRS Web Server which implements the web server portion of the UI for the remote puppeteer workstation 2149, IRCP software for network communications, and software components for Sensor Data Storage for later analysis.

Both the first workstation 2125 and the second workstation 2123 are connected to a wireless router 2119 for communications with the embedded PC 2107 in the Huggable robot 2105, and with the remote puppeteer system 2149. Communication between the workstations 2125 and 2123 is over a local network, not shown.

Also shown is a display 2117 connected to the second workstation 2123. The display is used to show the video data stream from the robot, and the IMU display of the robot's orientation: this display is useful for local diagnostic purposes, among other purposes.

Element 2121 shows the transfer of video data as "screen grab" snapshot images from the output of the Huggable Simulator Visualizer executing on workstation 2125 to workstation 2123. This visual data are transmitted as part of the MSRS web server implementation to the remote puppeteer system 2149. Element 2127 illustrates the data sent from the software executing on workstation 2123 to the software on workstation 2125 for use in the Behavior System and other software components executing on workstation 2125, and includes processed vision output (after face detection), processed somatosensory output, processed audio output to be sent to the robot for output via the robot's speaker, processed IMU output, processed information about the joint position (kinesthetic sense) and temperature data. Further shown are remote behavior system commands, which may have been input by the puppeteer/grandparent 2137 via the web page shown in display 2139.

Specific commands to the motion actuators on the robot, and commands to play back audio streams via the robot's speaker are shown at element 2111. The actual commands are transmitted via the wireless communications shown at 2113.

Element 2149 illustrates the remote puppeteer system. The operator/puppeteer is shown at 2137, in this example a grandparent using the Huggable robot 2105 to interact remotely with a child 2103. The grandparent operates and interacts with the robot 2105 and thus with the child 2103, using a web page or website user interface (UI) displayed on a monitor 2139. The monitor 2139 is connected to a local workstation 2141, which in this presently-preferred embodiment is a Shuttle PC running the Windows XP operating system 2147, which includes as a standard web browser 2147 Internet Explorer for displaying and operating the web page UI. Sound originating from the microphone of robot 2105 is played on local speakers 2143. The local workstation 2141 is connected to a router 2146, which in turn communicates over a local network, intranet, or World Wide Web network to the workstation implementation shown at 2131.

Element 2135 represents an internet or World Wide Web network connection between the remote operator system 2149 and the workstation implementation 2131. Element 2133 illustrates the behavior commands from the operator 2137 via the web page interface disclosed as part of element 2139, which are sent to the workstation 2123 via the internet connection. Further illustrated is the information sent from the webserver part of the website user interface implementation to the standard web browser disclosed as part of element 2147. This information includes the screen grab images from the Huggable Simulator Visualizer disclosed as part of element 2125, the raw or actual video frame stream from the cameras in the Huggable robot, and the raw or actual audio data output from the Huggable robot's microphones.

System Diagram

Figure 22:
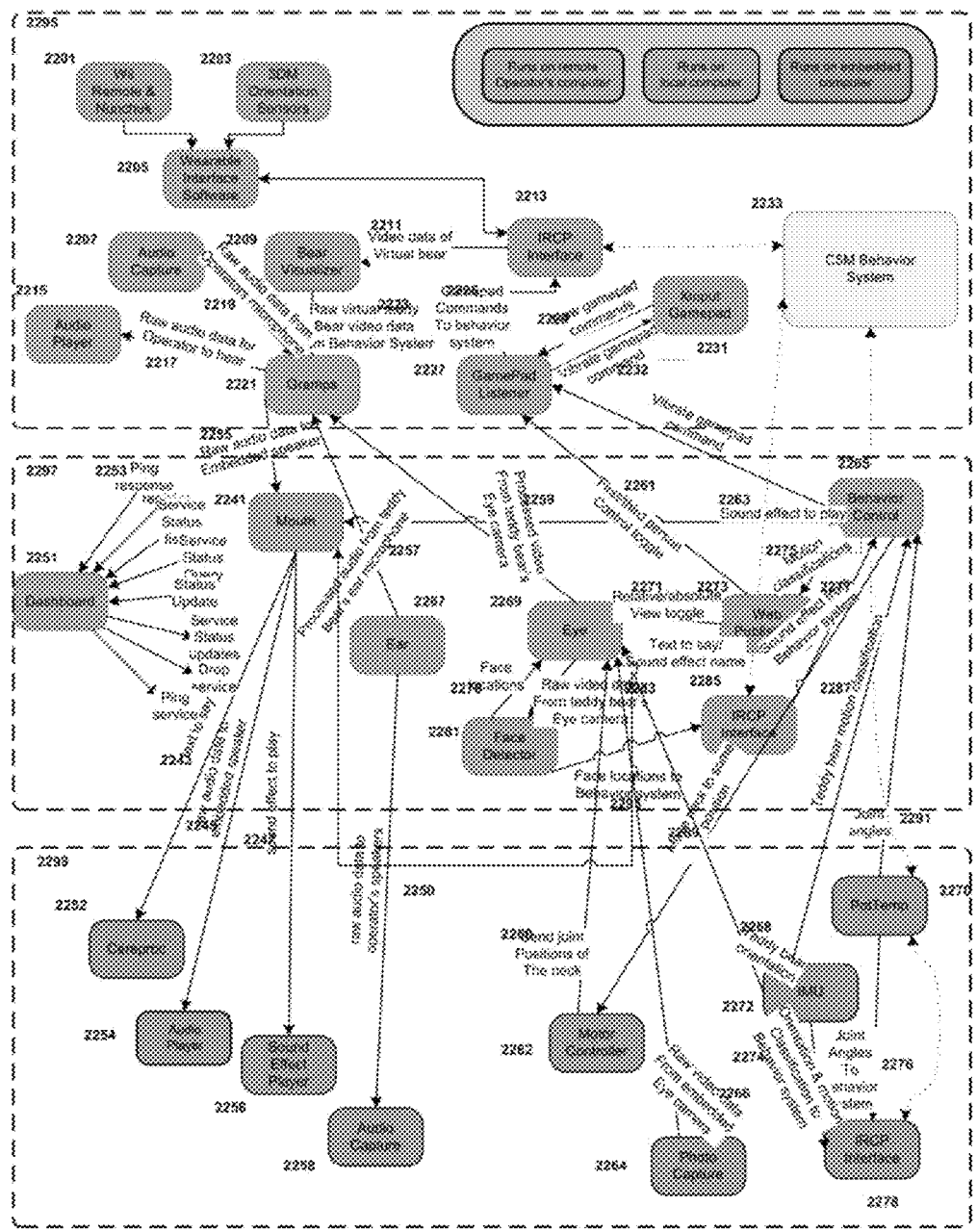
FIG. 22 is an illustration showing a system diagram of the Huggable software.
Figure 22A:
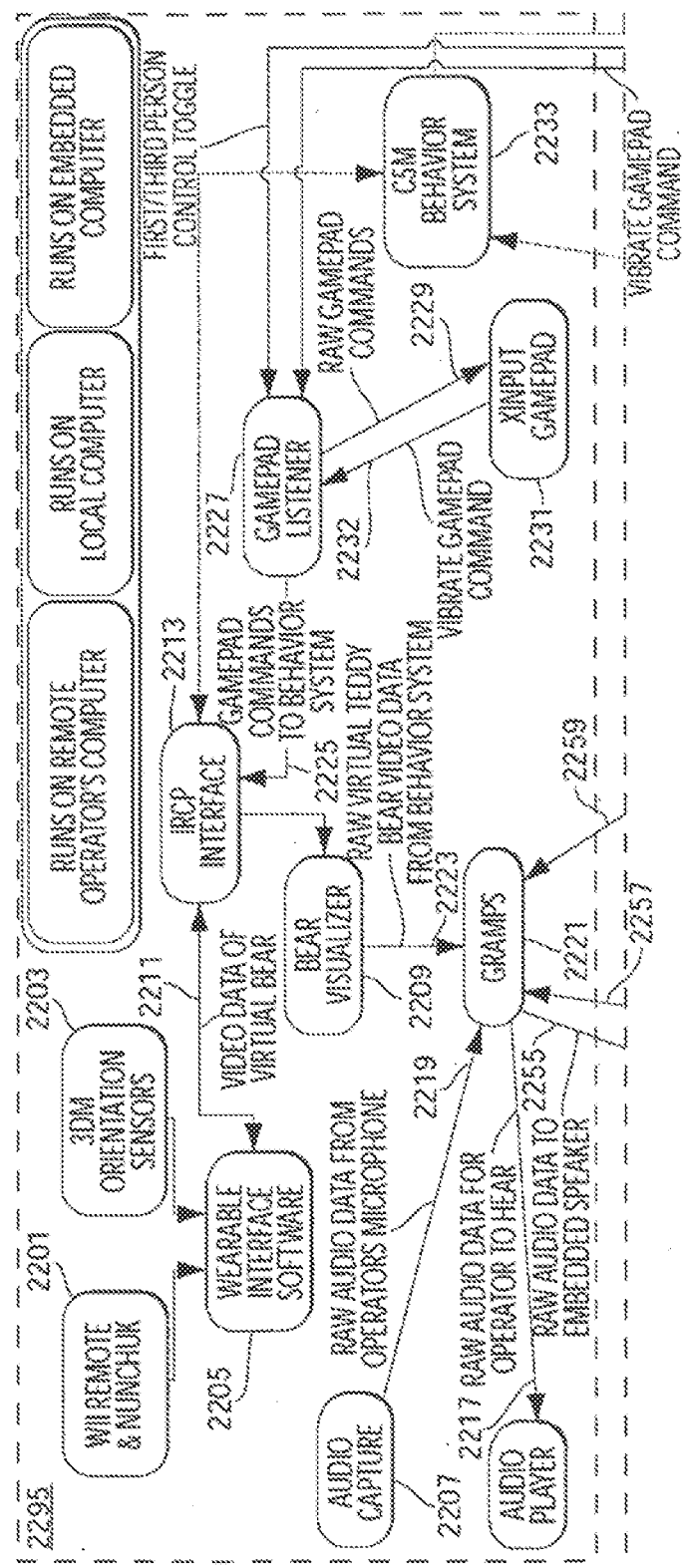
FIG. 22A is an illustration showing the portion of the system diagram of FIG. 22 for the remote operator's computer.
Figure 22B:
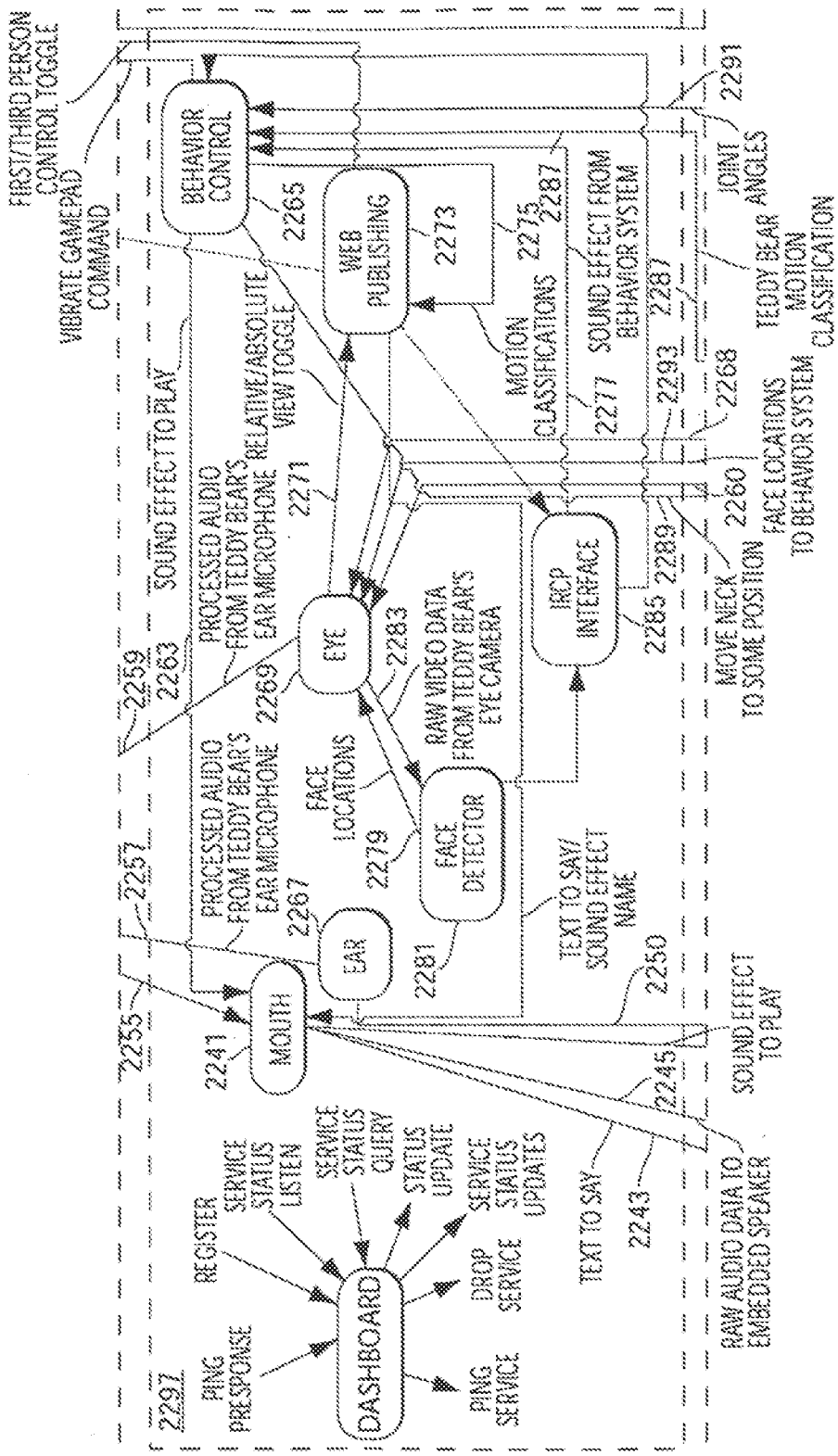
FIG. 22B is an illustration showing the portion of the system diagram of FIG. 22 for the local computer.
Figure 22C:
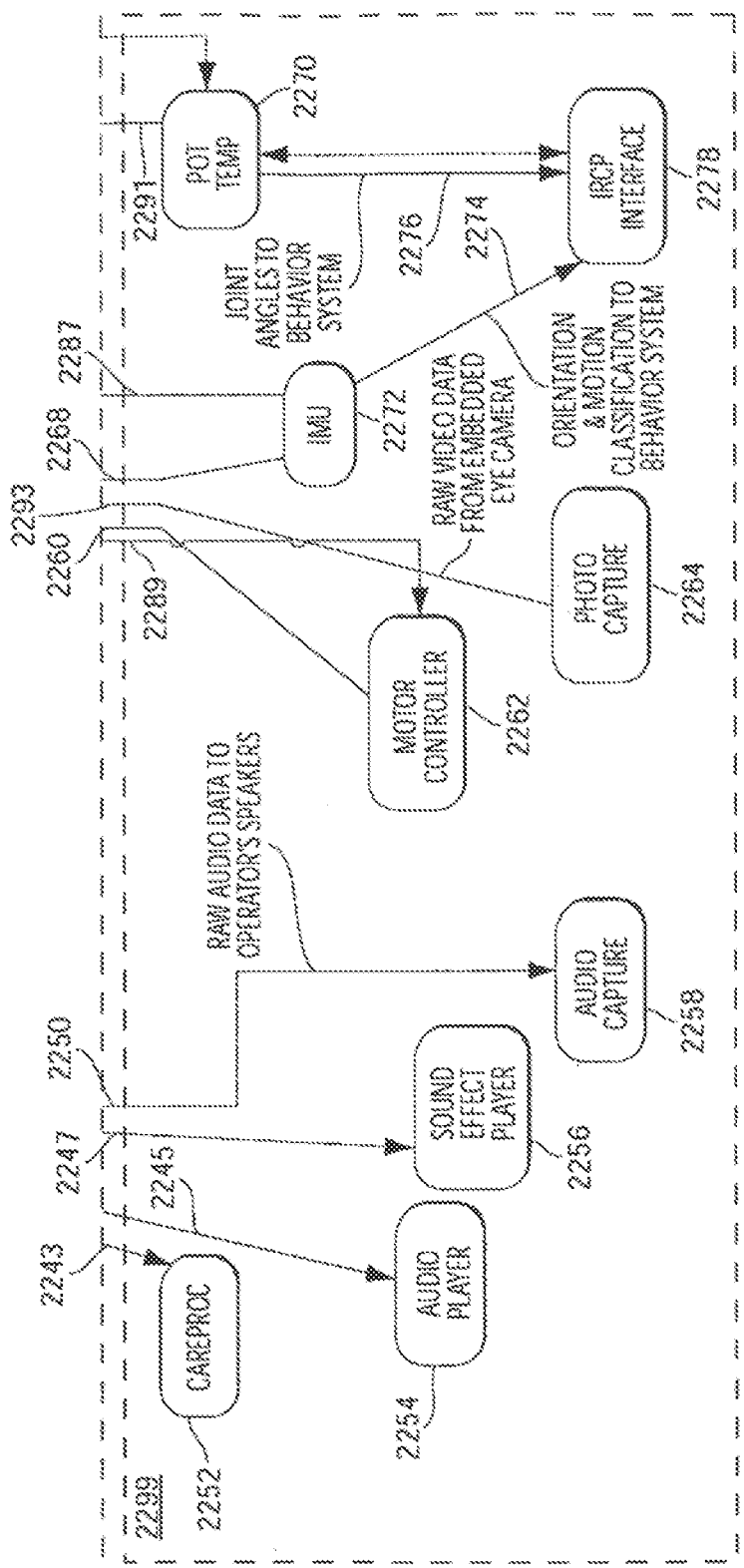
FIG. 22C is an illustration showing the portion of the system diagram of FIG. 22 for the embedded PC computer.

FIG. 22 shows an exemplary system diagram of the Huggable software in the presently-preferred embodiment. For clarity, the sections of the diagram corresponding to elements 2295 (software service components executed on the remote puppeteer workstation), 2297 (software service components executed on the local workstation), and 2299 (software service components executed on the embedded PC) are shown at greater scale in FIG. 22A, FIG. 22B, and FIG. 22B respectively. FIG. 22 is illustrative, and shows one design approach for implementing the functionality of the Huggable techniques.

In this system diagram, the software components of the presently-preferred embodiment are shown as separate services. The services are each presently executed on a specific processor in the Huggable system. Services/components executed on the remote operator/puppeteer workstation computer (element 2141 of FIG. 21) are shown grouped within element 2295. Those executed presently on the local workstation computers (elements 2123 and 2125 of FIG. 21) are shown grouped within element 2297. Those executed on the embedded PC (element 2107 of FIG. 21) are shown grouped within element 2299.

Details that are readily apparent to practitioners of the relevant technical arts are omitted for clarity in presentation.

Portions of the Huggable's software components are implemented in this presently-preferred embodiment using Microsoft's Robotics Studio (MSRS) software, Software Data Workflow:

An example illustration of a workflow in the software system that involves visual is as follows:

The operator can select "relative view" from the website interface 2273, which sends a command 2271 to the "Eye" software component shown at 2269. This eventually causes the video feed viewed by the remote operator to be counter-rotated to accommodate for any tilting of the robot. Using this toggle choice, the Eye service 2269 receives a video frame 2266 from the PhotoCapture service 2264. The Eye service 2269 then receives the robot's tilt orientation 2268 from the IMU service 2272 for the inertial measurement unit. Using the IMU's data, the Eye service rotates the frame in a direction opposite the tilt orientation. This frame data are then sent to the Face Detector service 2281. Once the face detection process is complete, the coordinates of the faces (if any) in the frame 2279 are sent back to the Eye service 2269. The Eye service then draws boxes around the faces in the frame and sends the new frame of processed video 2259 to the Gramps service 2221 to be displayed to the remote operator.

Remote Operator's Computer Software Components:

We now describe and disclose further services 2295 executing in or following from services executing in the remote operator's computer 2141, as follows:

The Audio Capture service 2207 is a producer service that streams raw audio data 2219 from the computer's microphone to the Gramps service 2221.

The Audio Player service 2215 is a low-level software service component that receives a stream of raw audio data 2217 from the Gramps service 2221 and plays it on the robot's speaker.

The Bear Visualizer service 2209 is a producer service that receives and makes available for other services the frames of the virtual Huggable data 2211 from the C5M behavior software 2233. These data 2211 are transferred via network connection to element 2209 via the IRCP network communications software 2213. The Bear Visualizer service 2209 also renders these data 2211 as a video data stream and sends it to the Gramps module 2221, which displays it for the operator.

The GamePad Listener service 2227 is a processor service that takes command data 2229 from the Xinput GamePad service 2231 and forwards the command data 2225 to the C5M Behavior System 2233, via the IRCP Interface service 2213 and a network connection, to control the robot's motors, as well as transforming these data based on the point of view of control specified by the website interface implemented in part by the Web Publishing service 2273. This service 2227 further receives vibration commands from the Behavior Control service 2265, and forwards for the tactile vibration functionality supported by the Xinput GamePad service 2231.

The Gramps service 2221 is an interface service. This service 2221 displays video data streams 2266 from the robot's eye cameras via the Photo Capture service 2264, and from the virtual Huggable image generated by the C5M behavior system 2233 via the Bear Visualize service 2209.

Software service components 2201, 2203, and 2205 are low-level input services for the wearable interface. The Wii Remote and Nunchuck service 2201 is for taking input from the Wii Remote and Nunchuck devices (elements 1909 and 1911 in FIG. 19A), the 3DM Orientation Sensors service 2203 takes input data from the 3DM orientation/position input sensors (elements 1905 and 1907 in FIG. 19A, and element 1913 in FIG. 19B). These data are processed by the Wearable Interface Software service 2205, which makes them available to other software components via the IRCP Interface service 2213.

Workstation PC Software Components:

Next we describe further software service components 2297 executing in or following from services executing in the workstation PCs 2123 and 2125, as follows:

The Ear service 2267 is a processor service that mediates raw audio input data 2250 from the Audio Capture service 2258. The Eye service 2269 is a processor service responsible for taking raw video input 2266 from the Photo Capture service 2264, face location data 2279 from the Face Detector service 2281, orientation data 2268 from the IMU service 2272, and toggle data 2271 for upright/relative view from the Web Publishing service 2273, and combining them into "richer" video feed data 2259 for the remote operator. The Ear service 2267 also transmits processed audio data 2257 from the robot's microphones to the Gramps service 2221 for playback to the operator.

The Face Detector service 2281 is a processor service that performs a face-detection algorithm from the OpenCV software library, on frames of raw video data 2283 from the robot's video cameras, and then sends the resulting locations and sizes of each face image (if any) to the requesting service.

The Mouth service 2241 is a processor service that multiplexes access to the robot's audio speaker, including requests for the playing of raw audio data 2255 from the Gramps service 2221, text-to-speech audio data returned from the Cereproc service 2252, and sound effects command data 2263 from the Behavior Control service 2265 and from the Web Publishing service 2273. The Mouth service 2241 sends text data 2243 for text-to-speech rendering to the Cereproc service 2252 for rendering to audio, sends the raw audio data 2245 to the Audio Player service 2254, and sends sound effect commands 2247 to the Sound Effect Player service 2256.

The Web Publisher service 2273 is an interface service which is a small web server serving the status of the Huggable and accepting input from the user in the form of AJAX style get requests. From this website service, the remote operator can cause the Huggable robot to play sound effects, can send the Huggable robot text to be rendered to synthetic speech and spoken, view how the Huggable robot is being moved, toggle the camera view between upright and relative, flip the axis of a controller joystick, choose the level of puppeteering for the operator (semi-autonomous or fully autonomous), and label positions of the neck and camera view for later recall. The Web Publisher service 2273 also sends command information 2298 about remembered gaze directions to other software service modules.

A Dashboard service 2251 executes diagnostic functions for determining the status of and potential problems with the workstation. Examples given at 2253 include "ping" services for testing network connectivity, service status queries, and others.

Embedded PC Software Components:

Here we describe further software service components 2299 executing in or following from services executing the embedded PC 2107, as follows:

The Cereproc service is a low-level service that provides text-to-speech (TTS) functionality via a known SDK for rendering text data to speech. The text data to be rendered is provided by the Mouth service, 2241.

The IMU service 2272 is a producer service that provides data from the inertial measurement unit sensor, these data 2268 being in the form of robot motion classification (an enumeration including "bouncing", "rocking", etc.) and tilt orientation. The classification data 2274 is also sent via the IRCP Interface service 2278 to other software service components.

The IRCP Interface service shown at 2285, 2278 and 2213 is used to receive IRCP communications packets. As a matter of design choice for performance, a separate instance of this service is executed on each computer.

The Photo Capture service 2264 is a producer service that grabs video frames from the video camera in the robot's eyes, and makes them available as video data 2266 to the Eye service 2269.

The Pot Temp service 2270 is a producer service that takes the robot's sensor data from the potentiometers for kinesthetic sense, and the robot's temperature sensor data, and provides a diagnostic web interface for calibrating them. Further, it provides this sensor data 2276 via the IRCP interface service 2278 to the Behavior Control service 2265.

The Sound Effect player service 2256 is a low-level service that receives the name 2247 of a sound effect from the Mouth service 2241 and plays a corresponding .wav file.

Motor Controller Services 2262 receives motion commands 2289, here illustrated with commands to move the neck nod joint to a particular position, from the Behavior Software service 2265, and further sends joint position (kinesthetic sense) data 2260 to other software service components.

Hardware Architecture Overview

Figure 23:
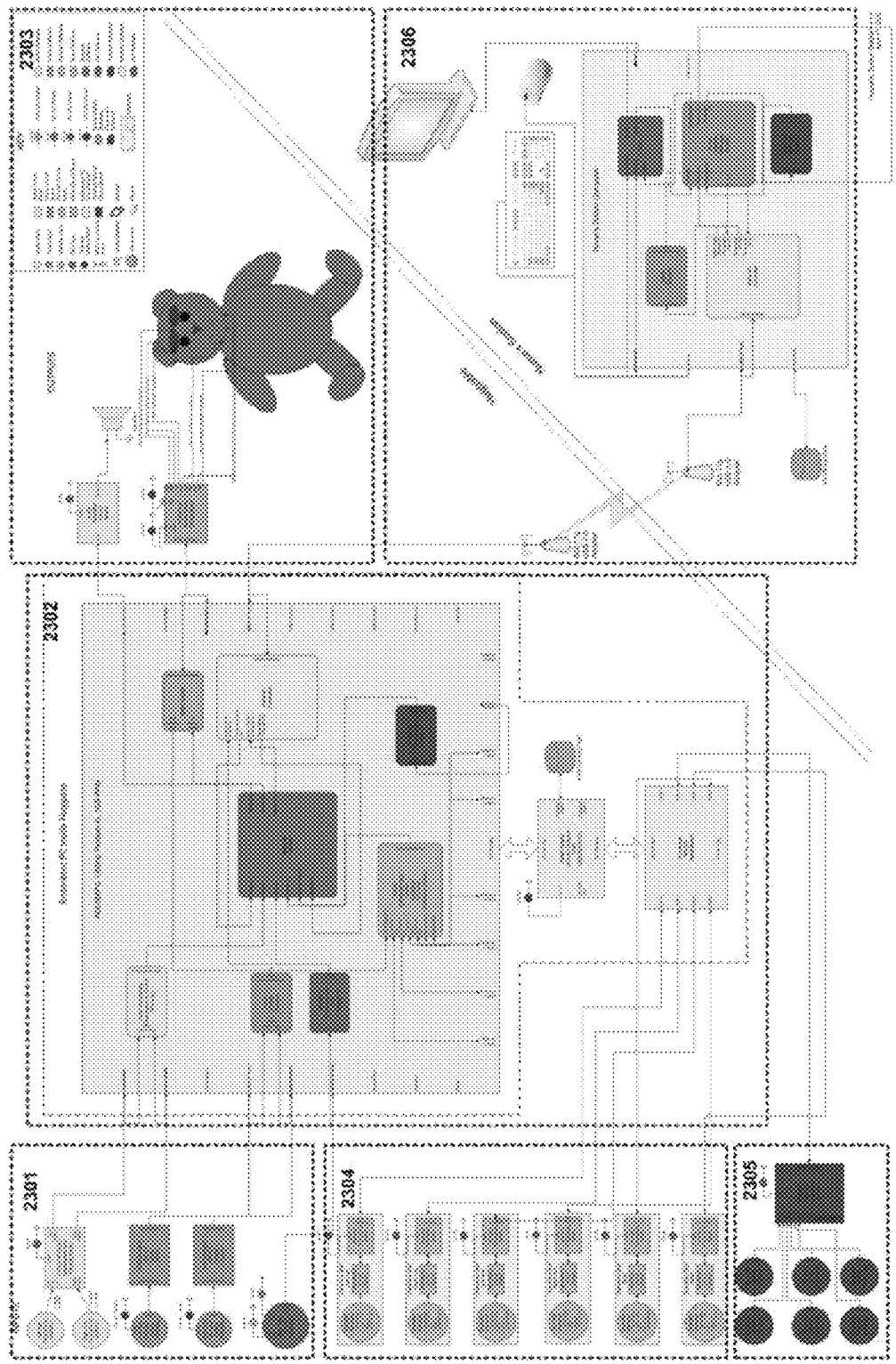
FIG. 23 is an illustration showing an exemplary hardware diagram of electronic and related components for the Huggable system.

FIG. 23 shows an exemplary hardware diagram of electronic and related components of the presently-preferred embodiment for the Huggable. For clarity, sub-sections of the diagram are shown in greater detail in FIG. 24A, FIG. 24B, FIG. 24C, FIG. 24D, FIG. 24E, and FIG. 24F.

Figure 24A:
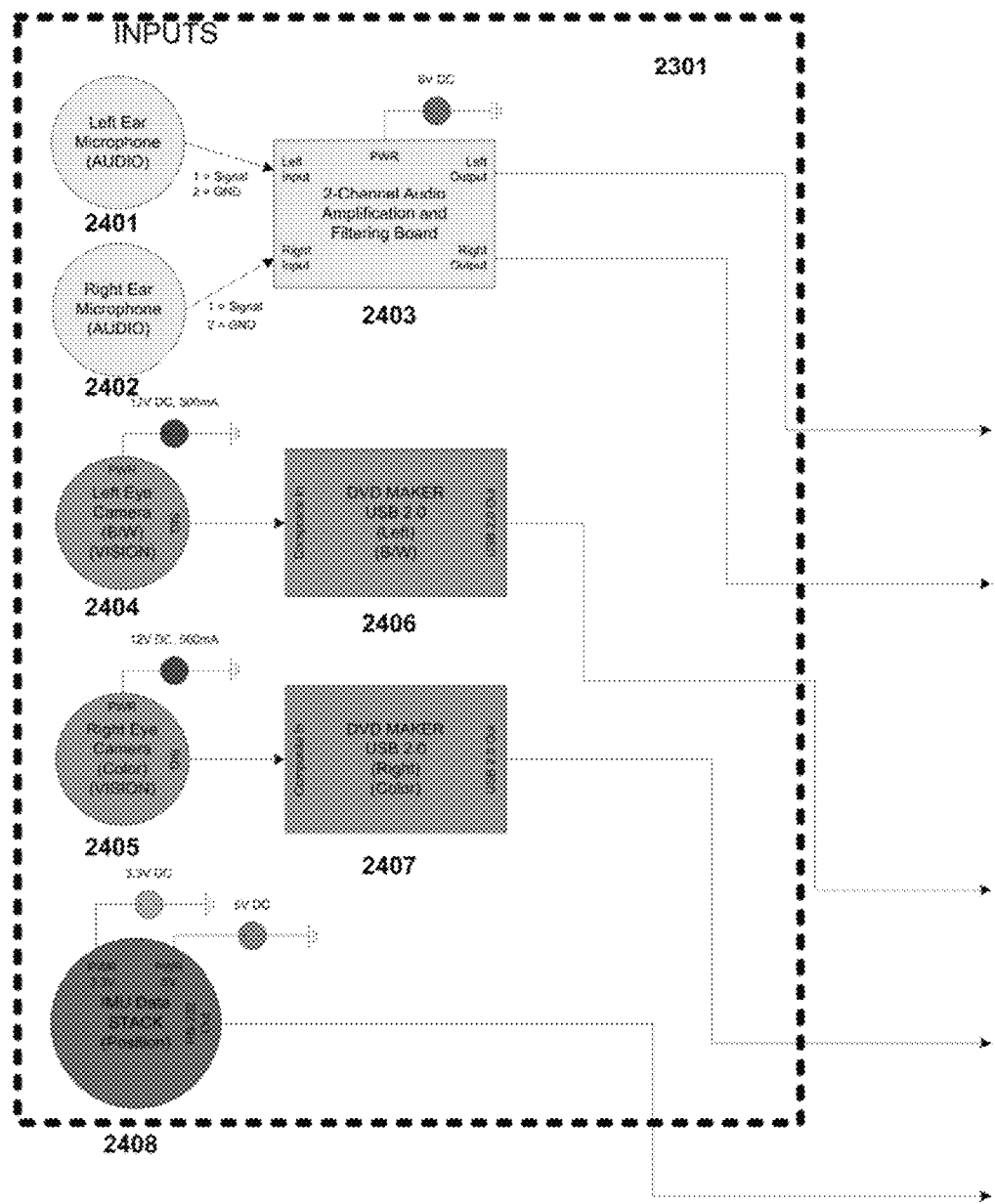
FIG. 24A is an illustration showing details of the diagram of FIG. 23 for a first part of the input portion of the Huggable system.

In FIG. 23, elements 2031, 2034, and 2035 show input elements of the architecture. 2301 discloses the architecture of the sensor input hardware for the microphones, eye cameras, and inertial measurement unit (IMU): 2301 is described in FIG. 24A in more detail. Element 2304 discloses the input architecture for the sensitive skin for each of the main body parts for the robot: these are described in more detail in FIG. 24D. Element 2305 discloses the hardware input architecture for the internal thermal sensors in the robot's body: these are described in more detail in FIG. 24E.

Figure 24B:
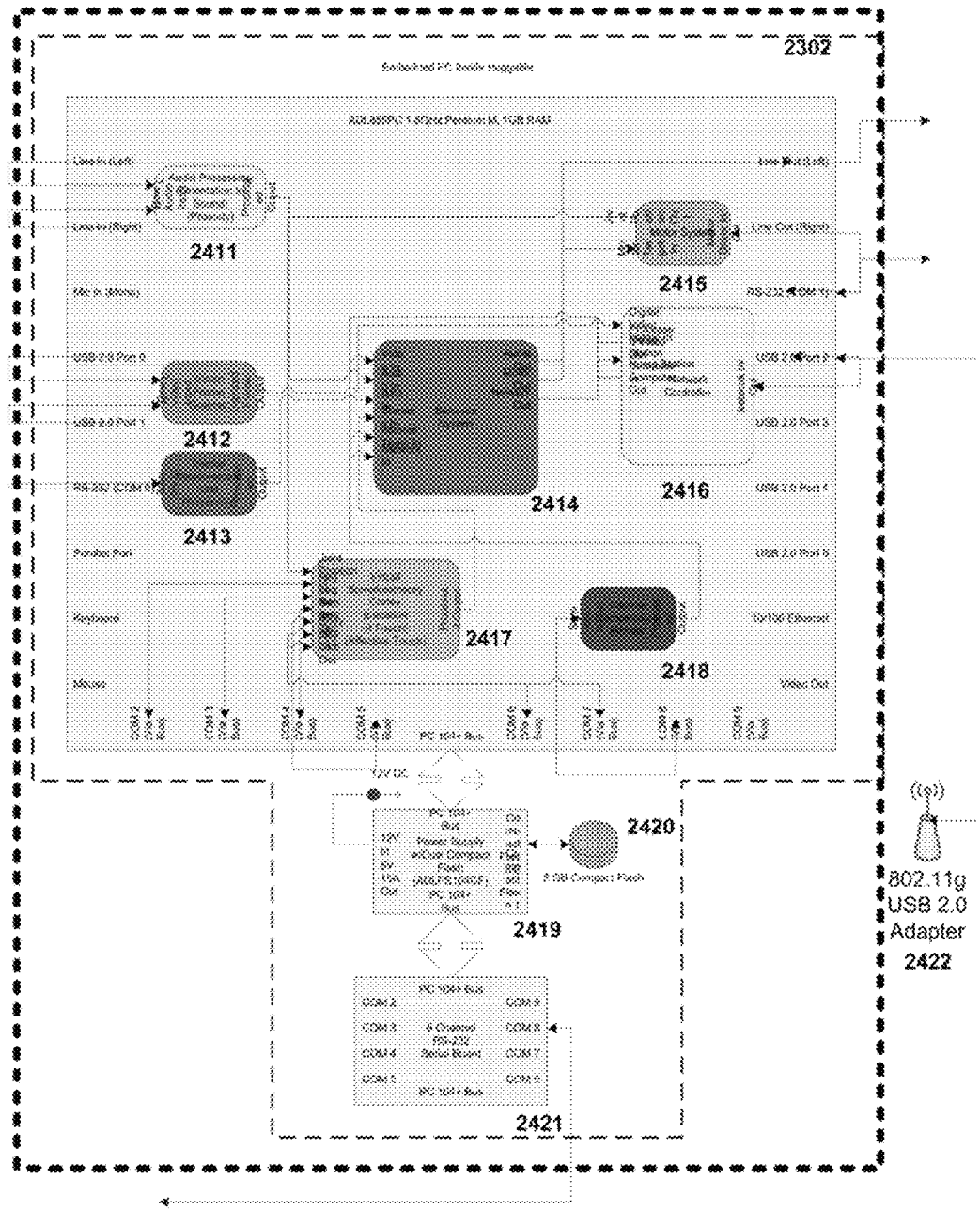
FIG. 24B is an illustration showing details of the diagram of FIG. 23 for the embedded PC in the Huggable system.

Continuing in FIG. 23, element 2302 shows the architecture for the embedded PC in the robot's body: 2302 is disclosed in more detail in FIG. 24B.

Figure 24C:
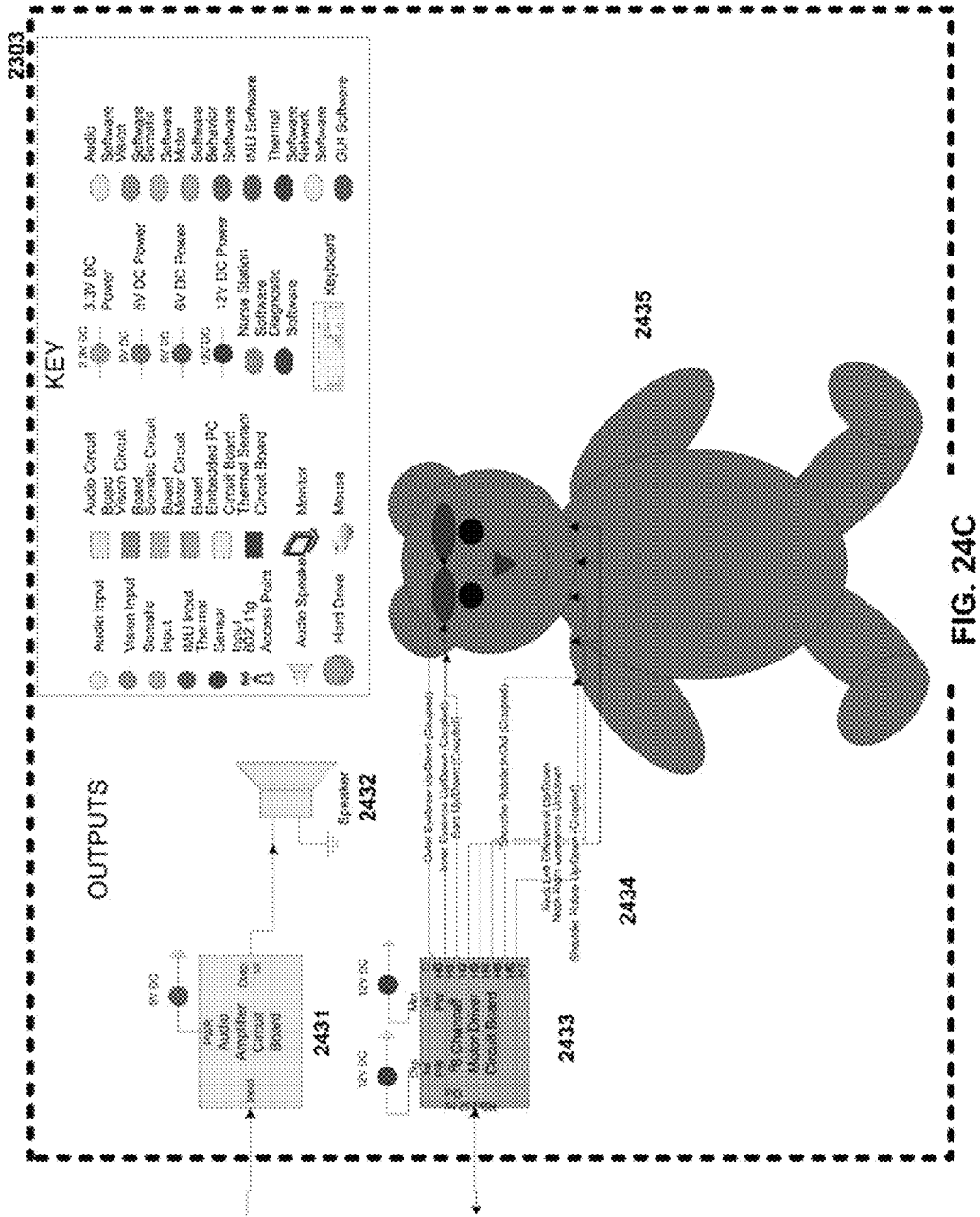
FIG. 24C is an illustration showing details of the diagram of FIG. 23 for the output portion of the Huggable system in the Huggable robot.

Element 2303 shows the output components in the Huggable robot: these are disclosed in greater detail in FIG. 24C.

Finally in FIG. 23, element 2306 shows the workstation architecture. In this example, the workstation PC and remote operator workstation of FIG. 21 and FIG. 22 are shown in an equivalent implementation using a single workstation, referred to in FIG. 23 as a Nurse's Station Computer. Element 2036 is described in more detail in FIG. 24F.

Hardware Architecture: Inputs

Figure 24D:
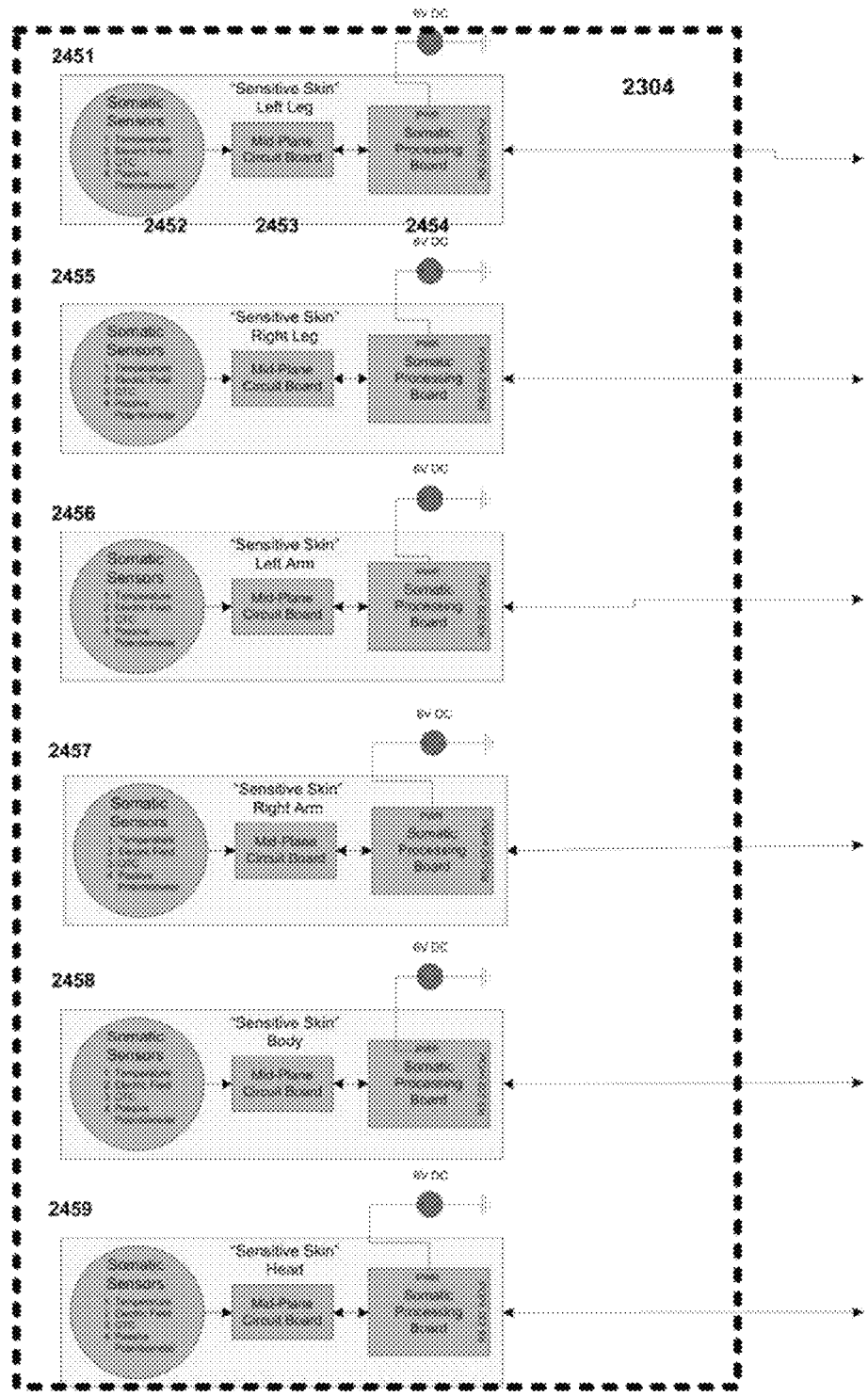
FIG. 24D is an illustration showing details of the diagram of FIG. 23 for a second part of the input portion of the Huggable system.

FIG. 24A, FIG. 24D, and FIG. 24E disclose an exemplary hardware architecture for input sensors.

FIG. 24A shows two input microphones 2401 and 2042 for audio sensing input: these are mounted in the left and right ear of the Huggable robot respectively. The output signals from the two microphones are input to a 2-channel audio amplification and filtering board 2403. The outputs for each microphone channel from 2403 are input to the raw audio input on the embedded PC, shown in FIG. 24B.

FIG. 24A further shows the two input eye cameras for vision input: 2404 is a black-and-white camera (used for low light conditions) in the robot's left eye, 2405 is a color camera in the robot's right eye. The video signals from each camera are input into a DVD Maker USB electronics component 2406 and 2407 respectively. Video data output from 2406 and 2407 are subsequently input to the raw video input ports on the embedded PC for a vision frame grabber, shown in FIG. 24B.

Finally in FIG. 24A, 2408 shows the inertial measurement unit (IMU) sensor, whose output is sent to the sensor input for the IMU processing on the embedded PC, shown also in FIG. 24B.

FIG. 24D shows the input architecture for input from the sensors in the sensitive skin for each of the main body parts. Element 2451 refers to the components for the left leg of the robot's body. The primary architectural components at this level are the somatic sensors 2452, which includes the sensors for skin temperature, electric field/proximity sensing, QTC/pressure sensing, and the digital potentiometers connected to the motion actuators (kinesthetic sense). The data from each of these types of sensors is input to the mid-plane circuit board 2453 for the left leg. The output from 2453 is sent to the somatic processing board 2454 for the left leg: control signals such as those for sensor calibration are also sent from the somatic processing board 2454 to the mid-plane circuit board 2453. Sensor data output from the somatic processing board 2454 is sent via an RS-232 interface to an RS-232 serial board used with the embedded PC, as shown in FIG. 24B. The same RS-232 connection is used for control signals from the embedded PC to the somatic processing board 2454.

FIG. 24D also shows the similar architecture for the sensor input hardware for the sensitive skin of the right leg 2455, left arm 2456, right arm 2467, robot body 2458, and robot head 2459.

FIG. 24E shows the input architecture for the internal temperature sensors in the robot's body. Six thermal sensors are shown for the body 2441, head 2442, left arm 2443, right arm 2434, left leg 2445, and right leg 2446. The output of each of these sensors is sent to a separate channel on a thermal sensor processing board 2447. The sensor data are subsequently sent from this board via an RS-232 I/O port to the RS-232 serial board for the embedded PC, shown in FIG. 24B.

Hardware Architecture: Embedded PC

FIG. 24B shows the exemplary hardware architecture of the embedded PC 2410, including certain relevant software components. The audio processing component 2411 is shown, which includes algorithms to determine the orientation or directional source of sounds based on input from the two microphones: the output from this component is sent to the visual somatosensory cortex component 2417. Also shown are the vision frame grabber component 2412 which receives video data, and outputs digitizer video frame data that is streamed to the network controller 2416 for output to the workstation of FIG. 24F. The inertial measurement unit 2413 receives data via RS-232 interface from the IMU component of FIG. 24A, and also sends its processed output to the network controller 2416.

The behavior system 2414 processes input data received from the virtual somatosensory cortex 2417. From 2414, audio data signals are sent to the audio amplifier circuit board 2431 in FIG. 24E for output to the user, and motor control output is sent to the motor system 2416 for subsequent output of control data to the motor driver circuit board 2433.

Also shown is the internal temperature monitor component 2418 which receives sensor data for the internal temperature of the robot via RS-232 interface, and in turn sends these data to the behavior system 2414.

The hardware with the embedded PC 2410 includes component ADLPS104CF 2419, which contains the power supply for the embedded PC and an 8 GB Compact Flash memory 2420 used for general data storage. Also shown is the 8 Channel RS-232 Serial Board 2421, which is the interface for RS-232 communications to and from the input components shown in FIG. 24A, FIG. 24D, and FIG. 24E.

Hardware Architecture: Outputs

FIG. 24C shows the architecture of the system outputs in the Huggable robot.

Audio output from the embedded PC, described in FIG. 24B, is input to an audio amplifier circuit board 2431 inside the robot's body. The output from 2431 is delivered to the speaker 2432 that is mounted in the robot's mouth.

Motion control data from the embedded PC, as shown in FIG. 24B, is input to an 8 channel motor driver circuit board 2433. The eight output channels from this board are used separately to send control signals shown at 2434 to each of the motion actuators in the robot 2435. The eight motion actuators and corresponding control signals are listed in the diagram: outer eyebrow up/down, inner eyebrow up/down, ears up/down, neck left differential up/down, shoulder rotate up/down, and neck/shoulder rotate in/out. Motion control of the two shoulders is coupled, as is motion control of the two eyebrows.

Hardware Architecture: Workstation

Figure 24F:
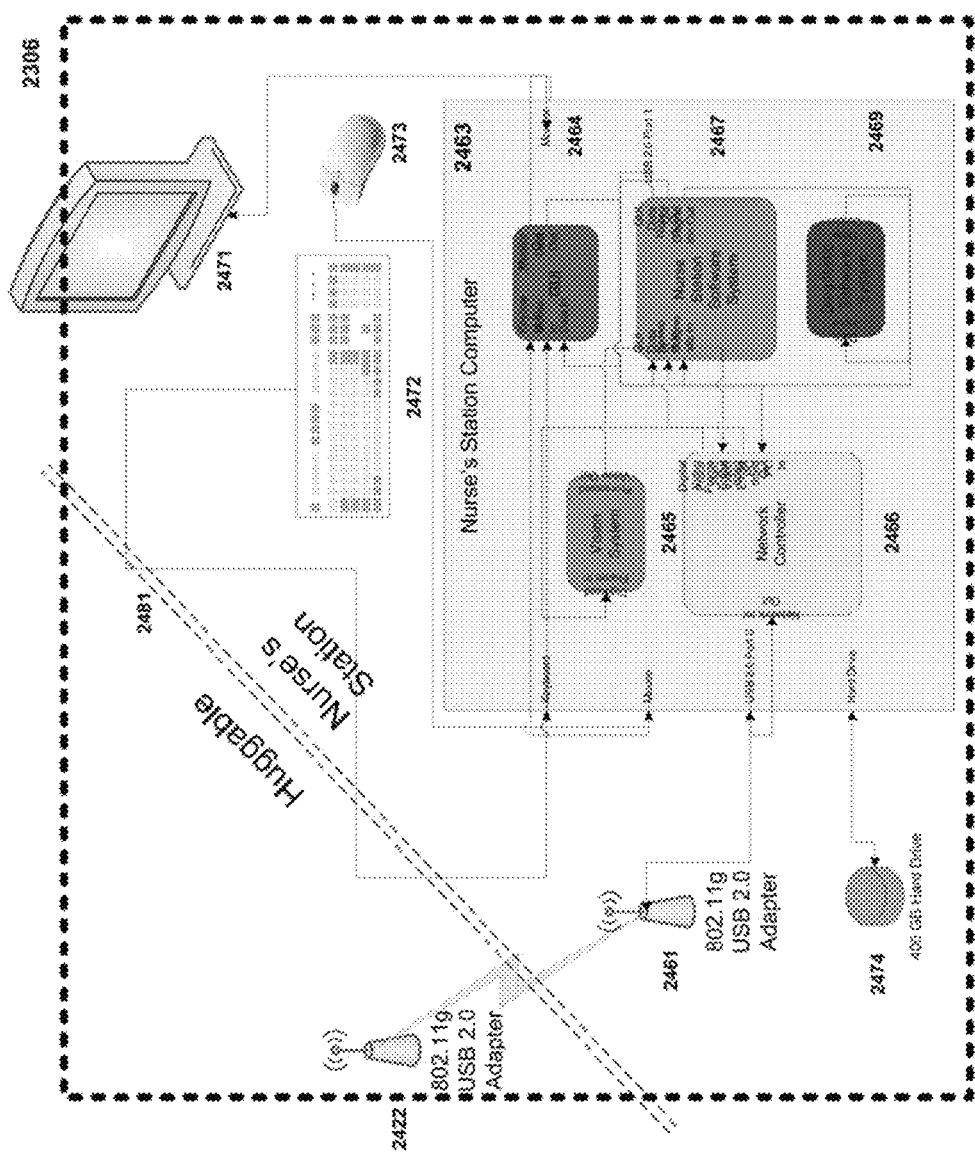
FIG. 24F is an illustration showing details of the diagram of FIG. 23 for the workstation of the Huggable system.

FIG. 24F shows the workstation architecture: in this exemplary architecture design, the workstation is referred to as a Nurse's Station: workstation and remote operator functionality is implemented on a single workstation PC 2463, referred to as the Nurse's Station Computer. Data are received via wireless connection 2481 from the embedded PC's wireless adapter 2422 on a wireless adapter 2461 and network controller 2466 for the workstation computer 2463.

FIG. 24F shows major components of the Nurse's Station computer 2463. The vision subsystem 2465, implemented in software and hardware, receives digitized video frames as input, the processed video output being shown on the monitor 2471 attached to the workstation along with user interface and other display output. The Nurse Station Software 2467 receives the data for workstation processing that is specific to the operation of the nurse's station. A diagnostic software system component 2468 for diagnostic analysis and recall of patient/user data is also shown. A hard drive 2474 is attached to the station computer 2463 for general data storage. The user interface/GUI software is shown at 2464, and handles operator input from the mouse 2473 and from the keyboard 2472, as well as displaying output to the display 2471.

Details of the Presently-preferred Embodiment of the Robot

In the following, details of the implementation of the presently-preferred embodiment of the Huggable robot and Huggable system are presented.

Implementing Touch in the Robot

The sense of touch in the presently-preferred embodiment of the Huggable is achieved with the integration of a number of types of sensors.

Devices for Sensing Touch

The sensitive skin, in which reside the sensors for detecting touch, is modeled after biological systems. The skin receptors in humans and animals encode four modalities of perception—temperature, touch, pain, and kinesthetic information. Within each of these modalities are sets of receptors, or "letters," which encode a specific property of the stimulus in a "somatic alphabet", as already set forth. Thus there is not one single somatic receptor.

These receptors are grouped together into receptive fields. Higher-level cortical cells in the somatosensory cortex respond to specific properties, such as orientation or direction of motion, within each receptive field. In the "somatic alphabet," these higher-level cortical cells are the "words" of the alphabet formed from the individual "letters." Finally these "words" are combined with other senses, such as vision and auditory processing, to form the "sentences" of perception—such as, "The smooth red ball is rolling down my arm."

In the "sensitive skin" of the presently-preferred embodiment, 3 different sensor types in 3 of the four modalities of tactile perception are used. Force information is sensed using Peratech Quantum Tunneling Composite sensors (QTC). These sensors were chosen as commercially available components for their wide resistance range (10 M-ohm to less than 1 ohm) and low cost, from Peratech Ltd, peratech.co.uk, Old Repeater Station, 851 Gatherley Road, Brompton on Swale, RICHMOND, DL10 7JH, UK. Additionally these sensors allowed for flexibility in design as custom sized sensors can be cut from the large A4 sheets. QTC sensors are well known, as they have also been used in other tactile sensing systems, such as the NASA/DARPA Robonaut Hand as noted in the publication by Martin et al in "Tactile Gloves for Autonomous Grasping with the NASA/DARPA Robonaut," presented at International Conference on Robotics and Automation (ICRA'04), New Orleans, La., 2004. Other types of force sensors with appropriate performance may also be used.

Temperature is sensed through the use of Thermometrics NTC thermistors. These sensors are nominally 100 K-ohm at 25° C., and as such represent an appropriate design choice of many possible alternative design choices.

For electric field sensing, the presently-preferred embodiment uses Motorola/Freescale Semiconductor 33794 Electric Field Sensing ICs, which allow for 9 input electrodes with a driven shield. The use of a single package allows for the measurement process to run in parallel while other processes are running on the microcontroller. Electric field sensing measures the proximity of a human hand to the surface on an object and this is ideal for human-robot applications. These types of sensors are known in the art, as can be seen from the discussion by Smith in "Electric Field Imaging," in *MIT Media Lab Ph. D Thesis*. Cambridge: MIT Media Lab, 1999.

Unlike the model of biological systems, in the presently-preferred embodiment, there are not separate sensors for "pain": instead the modality of pain is detected by an extreme sensor value in any of the sensor types already set forth. This is in keeping with a definition of pain as a signal that indicates conditions that potentially could damage the robot, or indirectly, cause damage to the user. Additionally, though not sensed in the skin, the modality of kinesthetic information is encoded by passive potentiometers or other joint angle sensors used throughout the robot.

Integration of Inputs from Devices for Sensing Touch

As is already known, the sense of touch in the human and animal systems is arranged in a somatotropic map with different areas of cortex devoted to different parts of the body, as described by Kandel et al in *Principles of Neuroscience, 4th Edition*, 4th ed. New York: McGraw-Hill Health Professions Division, 2000. Likewise, the "sensitive skin" design for the Huggable is arranged in a similar fashion. For simplicity, the robotic companion is divided into different body regions as shown in FIG. 6. Each body region, e.g. the left arm, consists of hundreds of tactile sensors. To reduce wiring as well as perform local processing for each body region, each body region has a somatic processing circuit board responsible for signal conditioning, low level processing, and analog-to-digital conversion. The outputs of these circuit boards are then sent via RS-232 to the embedded PC running the "Virtual Somatosensory Cortex" software.

Figure 7:
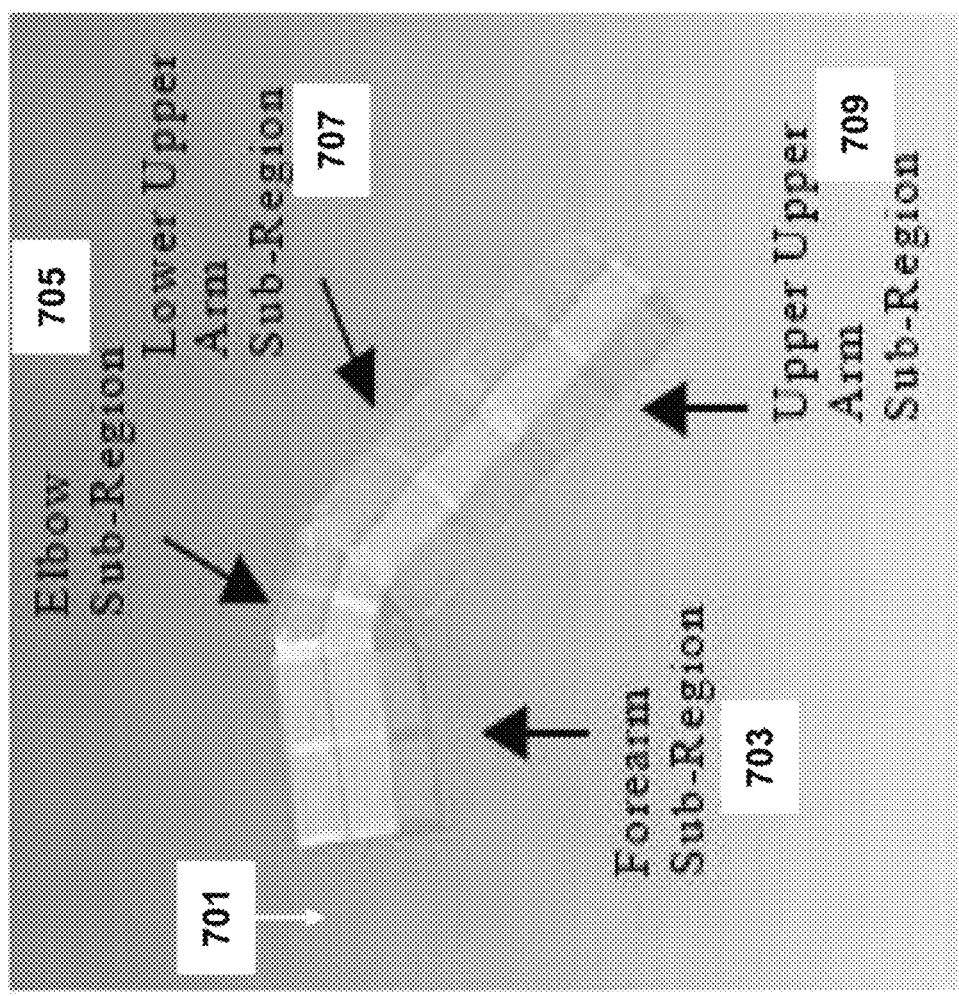
FIG. 7 is an illustration of the sub-regions for the left arm of the Huggable robot.

For simplicity of exposition, the left arm body region is now set forth: the implementation of this one region is similar to the implementation of the other regions except for changes in geometry, the number of sensors in the region, and the grouping of sensors within that region. Each body region is further divided into sub-regions, as illustrated in FIG. 7 for the arm. For the arm, there are 5 subregions—the end cap (paw) region (not shown, but its location indicated by element 701), the forearm region 703, the elbow region 705, the lower upper arm region 707, and the upper arm region 709. Within each division are sets of sensor circuit boards. The flow of information begins with these sensor circuit boards.

Figure 9:
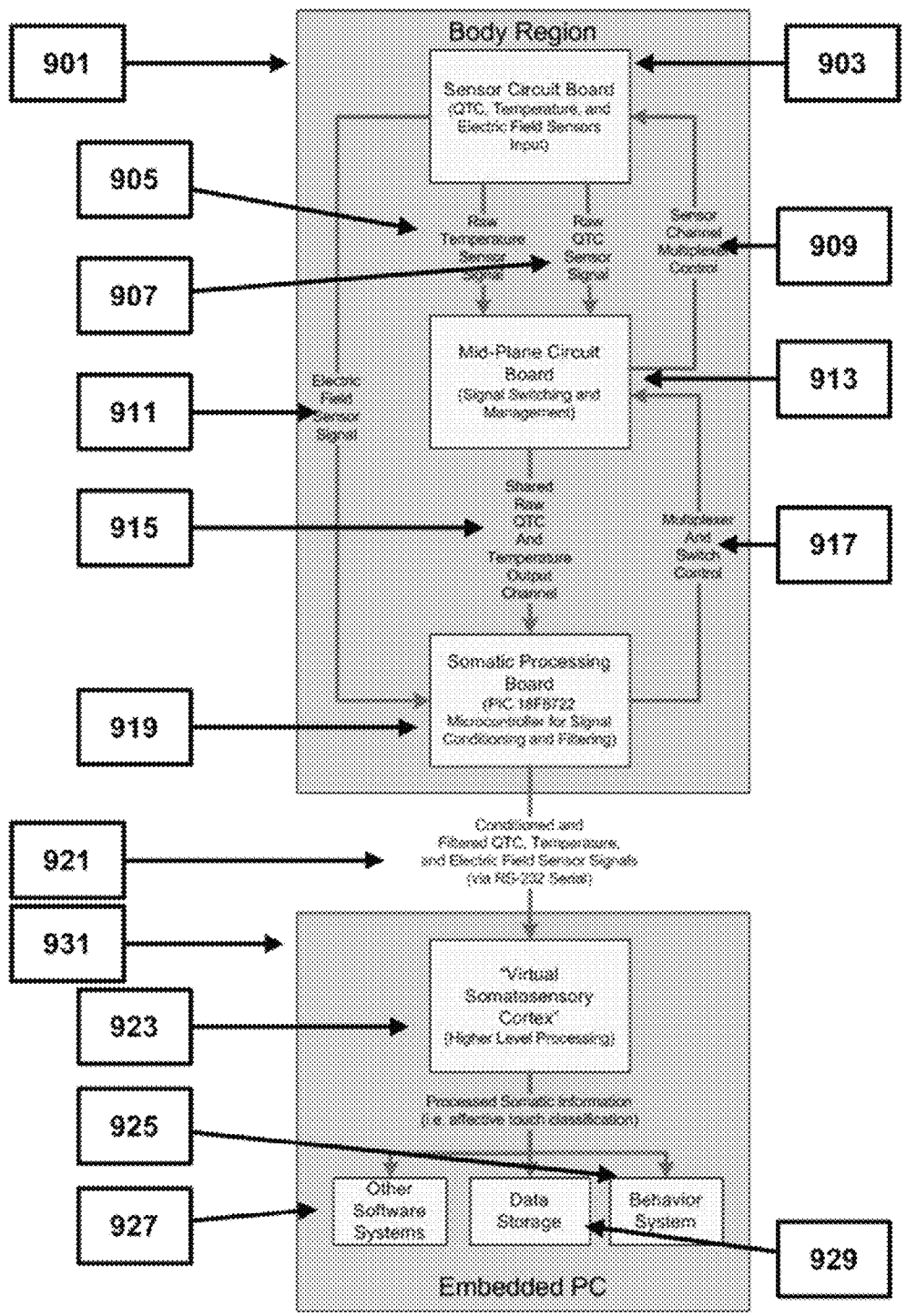
FIG. 9 is an illustration of the information flow and processing for sensor input from the sensitive skin.

For clarity, the entire flow of information from raw sensor input to higher level processing is shown in FIG. 9.

At the highest level of FIG. 9, QTC (touch), temperature, and electric field sensor signals 921 are sent from each robot region 901, after conditioning and filtering, via an RS-232 serial interface to the embedded PC 931.

More specifically, sensor circuit board 903 reads data from the sensors in a region of the robot such as the body region 901. The reading of the sensors is controlled for each sensor channel by multiplexer control information 909 from the mid-plane circuit board 913. The raw sensor signals from the thermistors for temperature 905 and from the touch sensors 907 is carried to the mid-plane circuit board 913, from which it is sent further 915 to the somatic processing board 919. The somatic processing board further receives the electric field sensor signal 911 directly from the appropriate sensor circuit board 903.

The somatic processing board 919 for each region 901 performs conditioning and filtering of the sensor signal data, and then sends the conditions signals 921 via an RS-232 serial interface to the embedded PC 931. Software implementing the virtual somatosensory cortex 923 processes the signal data and performs classification by means of neural network software to determine the type of affective touch (petting, etc.) that has been sensed by the robot. This classification data 925 is then stored in local data storage 929, sent to other software systems 927, and sent to the software for the behavior system 925.

Sensor Circuit Boards

The design within each sub-region is similar. In the forearm sub-region there are 8 sensor circuit boards. Each sensor circuit board of the forearm has 8 QTC sensors (shown as white rectangles) and 3 thermistors (extending from the surface of the board). A copper layer on the bottom layer of the circuit board is used as an electrode for electric field sensing. A pair of analog multiplexers is placed on the underside of each sensor circuit board to reduce the number of wires. A SN74LV4051 8:1 multiplexer is used for the QTC and a MAX4634 4:1 multiplexer is used for the temperature sensors. These multiplexers share the same control channels as well as power and ground. The QTC and temperature sensors share a common ground.

The electric field sensing is rather slow (~5 ms) compared to the other two sensors (~0.5 ms). Additionally, there is not the need for fine spatial resolution with this sensor. Lastly the 33794 IC features 9 electrode inputs. These reasons were considerations for a design choice to divide each body region into a maximum of 9 different electrode sections. The elbow and end cap sections only have one electrode, and the remaining 3 sub-regions each have two electrodes.

The forearm sub-region of FIG. 4 is further divided into two groups of four sensor circuit boards (top/left and bottom/right). The common control signals (A, B, C) for the multiplexers of these circuit boards as well as Vcc and GND electrodes of each sensor circuit board are connected together forming one larger electrode. One of the benefits of using the 33794 electric field sensing IC is that it provides a driven shield. A copper shield 1001 is placed behind each sensor circuit board 1003 as shown in FIG. 10. The driven shield signal is shared among the four copper shields of each sensor circuit board group. The electrode and shield are connected directly to a flexible coaxial cable (Cooner Wire CW2040-3050SR) that travels the length of the arm to the somatic processing board for the arm.

Mid-Plane Circuit Board

The use of electric field sensing involves certain design considerations. First, the mechanical structure to which the circuit boards are attached must be made of a non-conducting material. In the presently-preferred embodiment, delrin and fiberglass rod are used. Second, the wires that leave the sensor circuit board also carry the electric field sensor signal. Thus it becomes important to isolate these wires from the rest of the signal pathway. For this purpose, the mid-plane circuit board is used. This circuit board sits inside the arm sub-section as shown in FIG. 11.

Figure 11:
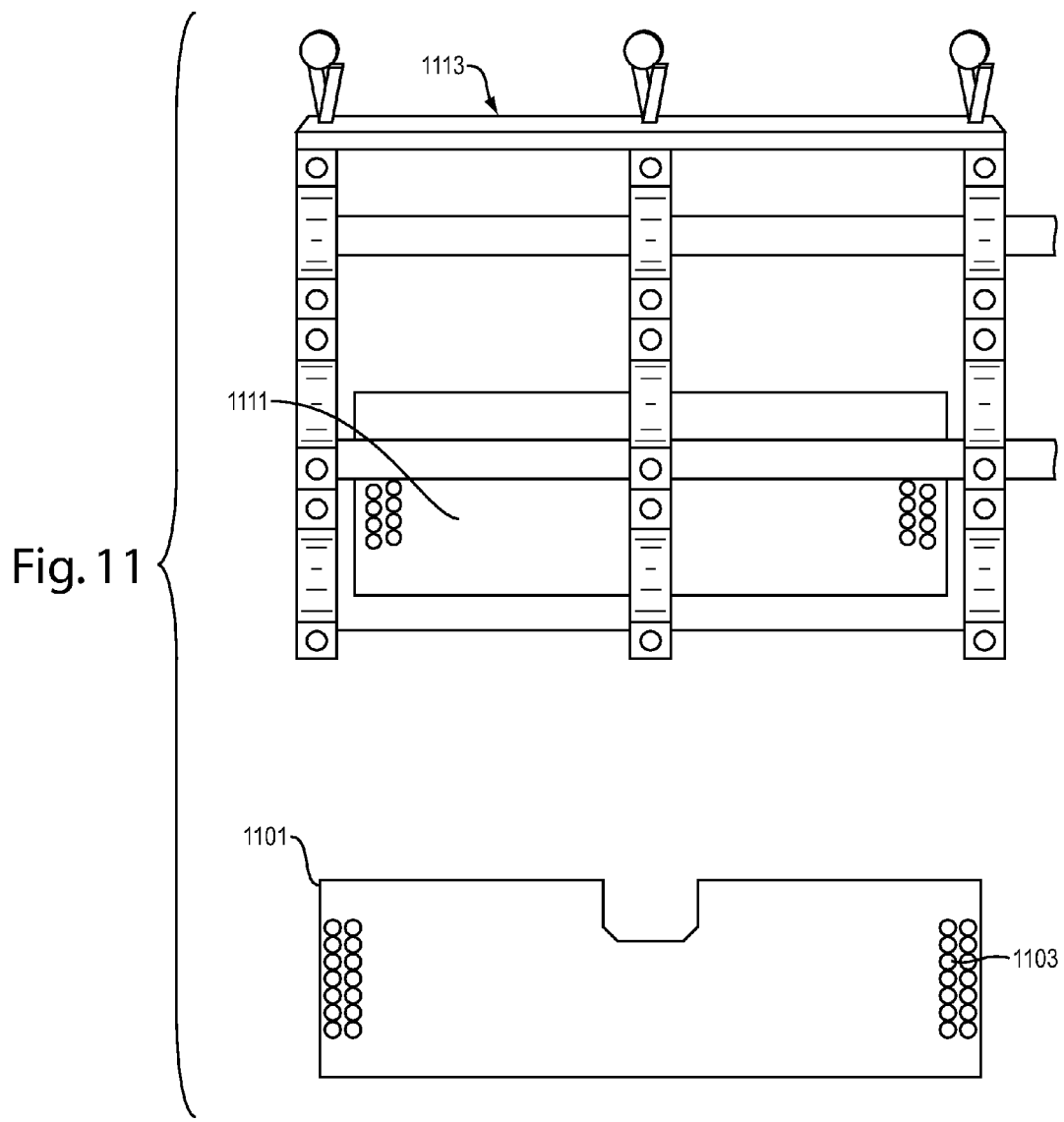
FIG. 11 is an illustration of two views of the mid-plane circuit board.

As shown in FIG. 11, the mid-plane circuit board is divided into two sections. On the top surface of the circuit board are two pairs of connectors. The 5-pin connector transmits the multiplexer control channels as well as Vcc and GND to each set of four sensor circuit boards corresponding to the two electrodes (top/left and bottom/right). The 8-pin connector is used to receive the QTC and temperature multiplexer outputs from each sensor circuit board corresponding to the electrode grouping. Thus the inputs and outputs of each set of four sensor circuit boards, corresponding to the two electrodes, are separated.

The four QTC and four temperature multiplexer signal outputs from the four sensor circuit boards corresponding to the top/left electrode are connected to a SN74LV4051 8:1 multiplexer. A separate SN74LV4051 is used for the signals from the sensor circuit boards in the bottom/right electrode grouping. The output of these two multiplexers then passes through a Fairchild Semiconductor NC7SBU3157 SPDT analog switch. Thus, for the forearm sub-region consisting of 64 QTC force sensors and 24 temperature sensors, a single cable is used to carry the sensor signal information to the arm somatic processing board.

The three multiplexer control channels and common power and ground are connected directly to a pair of bilateral switches (SN74LV4066A and SN74LVC2G66). When in force/temperature sensing mode these switches are closed providing power and control logic to the sensor circuit board multiplexers. When that electrode grouping is in electric field sensing mode, these switches are opened and the SN74LV4051 multiplexer is inhibited. Thus that cluster of four sensor circuit boards is isolated from the rest of the arm. Because of this isolation, it is still possible to read the force/temperature values from the remaining sub-sections of the arm while the electric field sensor value is being calculated.

FIG. 11 shows two views of the mid-plane circuit board, 1101 and 1111. In this example, the upper view shows the boards installed inside the forearm sub-section 1113 of the robot. The lower view shows the back side of the circuit board 1101. The thirteen plated-through holes 1103 on opposite ends of the mid-plane circuit board are used to transmit common information such as multiplexer and switch control information as well as power to the whole arm. The mid-plane circuit boards are connected to one another and to the somatic processing board for the arm via a Cooner Wire CW6264rev1 13-conductor flexible cable.

Somatic Processing Board

Figure 13:
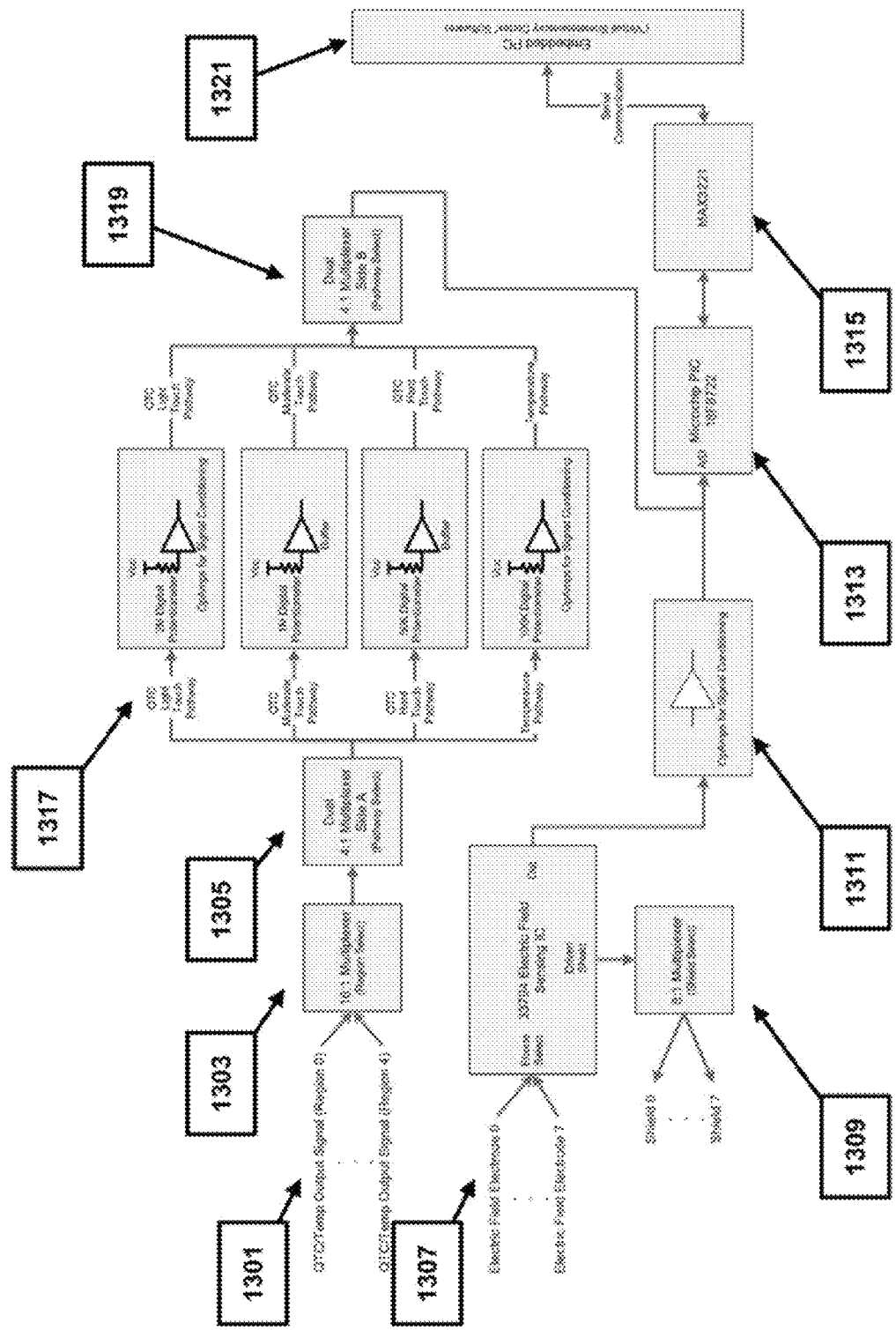
FIG. 13 is an illustration of information flow for the somatic processing board

Each mid-plane circuit board has one output (shared QTC/temperature output) and 13 inputs. Additionally, each of the 8 electrode groups has a single output wire. Thus for an entire arm consisting of approximately 200 sensors there are only 12 output wires and one common input wire. The last stage of this multi-level approach prior to the embedded PC running the "Virtual Somatosensory Cortex" software system is the somatic processing board. FIG. 13 shows a schematic diagram of the flow of information in the Somatic Processing Board.

The somatic processing board uses a Microchip PIC18F8772 microcontroller 1313 This package was chosen for its large program and data memory, large number of I/O pins, and speed. In the current design a 40 MHz oscillator is used, but because the PIC18F8772 requires 4 clock cycles per instruction the actual speed is approximately 10 MHz.

The main functions of the somatic processing board are to select the sensor, condition the sensor signal, convert this conditioned analog value into a 10-bit digital value, and finally send this value to the embedded PC. A MAX3221 RS-232 serial driver/receiver 1315 is used at a baud rate of 57600 for communication between PIC 1313 and embedded PC 1321.

As discussed, there are three types of sensors used in the design of the robot's "sensitive skin"—QTC force sensors, thermistors, and electric field sensors. The 33794 electric field sensing IC 1307 provides 9 electrode inputs and a single driven shield output. The driven shield output is multiplexed using an Analog Devices ADG408 high performance single 8-channel analog multiplexer 1309. The shield signal is greater than the 5V range of the SN74LV4051, thus requiring the selection of a different multiplexer with a higher maximum voltage. Each coaxial cable connecting the sensor circuit boards to the somatic processing board carries the electrode signal surrounded by a driven shield. This electrode signal is passed directly to the electrode input of the 33794.

The output of the 33794 is a 0-5V analog signal. The raw output prior to signal conditioning of the top/left electrode of the forearm sub-region of FIG. 4 is approximately 1.75V with a 30 mV change between the no contact (min) and contact with a human hand case (max): this may vary according to choice of components and materials. This raw signal is then passed through a series of differential amplifiers and non-inverting amplifiers based on the Burr-Brown OPA2340 dual channel single supply operational amplifier 1311 to boost the signal to the full 0-5V range. Finally this signal is low-pass filtered and passed into the 10-bit A/D of the PIC for conversion.

The QTC sensors used in the presently-preferred embodiment have a wide resistance range. To improve sensor performance these signals are processed in three different ways—light touch, moderate touch, and hard touch. These ranges are chosen in part to make the sensing by these sensor components within each range better approximate a linear response and to apply different signal conditioning methods to achieve greater sensory range overall and greater resolution.

The QTC and temperature outputs 1301 from each mid-plane circuit board are carried via a single wire and pass through two multiplexing stages. In the first multiplexing stage a CD74HC4067 16:1 analog multiplexer 1303 is used to choose the mid-plane circuit board output. The choice of a 16:1, as opposed to an 8:1 multiplexer, allows for maximum flexibility in design. Once the mid-plane circuit board output is selected a Texas Instruments SN74LV4052 dual 4:1 multiplexer 1305 is used to select how this signal is to be processed—temperature, QTC light touch, QTC moderate touch, and QTC hard touch. The output of the first multiplexer stage is sent off along one of the four pathways for signal conditioning through the first 4:1 multiplexer in the SN74LV4052 package. The conditioned signals then pass through the second 4:1 multiplexer 1319 and into one of the A/D inputs of PIC 1313.

The QTC light touch pathway is processed using a voltage divider with a 2M-ohm potentiometer as the upper resistor in the divider and the QTC sensor as the lower resistor. The output of the voltage divider passes through a voltage follower as well as a series of differential and non-inverting amplifiers 1317 all based on the Burr-Brown OPA2340 package to boost the analog signal to the full 0-5V range.

Finally, this signal is low-pass filtered. The QTC moderate and QTC hard pathways also use a voltage divider for signal conditioning with a 1 M-ohm potentiometer for the moderate pathway and a 50 K-ohm potentiometer for the hard pathway. The outputs of each divider pass through a voltage follower and a low-pass filter.

As discussed previously, the thermistors selected have a nominal value of 100 K-ohm at 25 degrees C. Much like the QTC pathways, a voltage divider with a fixed 100 K-ohm resistor is used for the temperature pathway. The output of this divider is then passed through a voltage follower and a series of differential and non-inverting amplifiers 1317 to boost the signal. The output is then low-pass filtered.

The Huggable system also allows for real time display and monitoring of a number of internal aspects of the robot, such as specific voltage levels and current draw on specific circuit boards, internal temperature, and readings from other sensors. This has numerous advantages for the maintenance and repair of the robot, as many problems can be diagnosed before the operation of the robot becomes problematical, or isolated or diagnosed at least in part without disassembling the robot.

Auto-calibration

The somatic processing board also features the ability to auto-calibrate. This ability to auto-calibrate in hardware is very important for a variety of reasons. First, the complex geometry of the surface of a robotic companion results in different sensors being of different sizes. Further, the large number of sensors (upwards of a thousand sensors in some platforms) makes calibration of each individual sensor a time intensive process.

Auto-calibration brings about a number of benefits. Auto-calibration of sensors, including kinesthetic, temperature, vision, and proximity sensors prior to an interaction session allows for changes in environmental condition to be compensated or corrected for, which otherwise could have adverse effects such as affect the functioning of the sensors or the classification of sensor data.

The presently-preferred embodiment implements auto-calibration for the sensors in the sensitive skin. Auto-calibration is accomplished by a combination of hardware and software.

The Huggable encompasses hundreds of sensors within its "sensitive skin." With such a high sensor count, calibration of each sensor is necessary. The QTC sensors are all hand cut and assembled, and thus, there could be slight differences between sensors. Also the silicone rubber synthetic skin is at different thicknesses in different parts of the bear. Thus, each QTC sensor must be calibrated for all three types of conditioning—light touch, moderate touch, and hard touch—so as to fill the entire 10-bit range.

The raw data from the temperature sensors change based upon the ambient temperature in the robot's environment. It is also beneficial to have the temperature sensors calibrate not only to the room environment but also to the person as well. If a person has lower body temperature than is usually the case, it can be necessary calibrate the Huggable to that person's natural temperature so that his or her interactions can be sensed as well as someone who has a more usual body temperature. Additionally, multiple stages of amplification in the sensor electronics cause small perturbations to result in large changes in the sensor data. Thus even small changes in temperature from day to day may necessitate regular recalibration.

Finally, the electric field proximity sensors also can change depending upon the environment. If there is a lot of metal near the robot, the signal may be attenuated. Due to the high degree of amplification, slight changes from day to day may show large differences in the conditioned signal. For all of these reasons the ability to auto-calibrate is a necessary design feature.

Jumpers are built into the Huggable somatic processing circuit electronics of to select which of two identical pathways are used for signal conditioning. The first of the pathways uses analog potentiometers, and is intended in part for diagnostic use. The other pathway uses digital potentiometers of the same value as the analog potentiometer. The settings of the digital potentiometers are controlled by software.

For all the amplification stages, an Analog Devices AD5235BRU dual 250 K-ohm 1024-tap digital potentiometer is used. This potentiometer was selected as a matter of design choice because it allows for 10-bit resolution in tuning both the gains as well as the thresholds for each amplification compared to the usual 8-bit resolution of most digital potentiometers currently commercially available.

A 1 M-ohm digital potentiometer used for the QTC light-touch measurement is created by connecting the two digital potentiometers together in series.

The Analog Devices AD5263 quadruple 200 K-ohm digital potentiometer and the Analog Devices AD5262 dual 200 K-ohm digital potentiometer were selected. Both of these devices have 8-bit resolution. Due to the fact that these potentiometers would be placed in series with each other as well as with a fixed 1 M-ohm resistor, an 8-bit resolution was deemed appropriate.

The 1 M-ohm potentiometer used for the QTC moderate-touch measurement is formed by placing the outputs of two AD5235BRU dual 250 K-ohm potentiometers in series with each other. This combination allows for 10-bit resolution.

Likewise, for the QTC hard-touch measurement, the outputs of a single AD5235BRU 25 K-ohm digital potentiometer are placed in series with each other to form one 50 K-ohm digital potentiometer.

Each digital potentiometer uses SPI communication to receive input from a Microchip PIC16F877 in the robot's electronics to set its value. The chip select (CS), SPI output (SDO), and SPI clock (SCK) signals are output by the PIC and passed through a series of three 4051 8:1 multiplexers, one multiplexer for each signal. These multiplexers are under PIC control. The data signals are multiplexed using the SPI output (SDO) pins of each digital potentiometer, rather than clocked through each potentiometer from one to another, to increase speed and decouple sensor-conditioning processes from each other. This allows sensors to be calibrated or auto-calibrated individually, as the setting for one digital potentiometer can be changed while another digital potentiometer is in use, such as adjusting the value of a QTC sensor while reading the electric field sensor.

During the calibration of the amplification stages it is important to be able to disconnect the output of one stage from the input to another and read that output value. A set of three switches is used to isolate potions of the circuit from one another. The switches used are a Maxim MAX4636 dual SPDT CMOS analog switch and a Fairchild Semiconductor NC7SBU3157 SPDT analog switch. These switches normally connect the output stages to input stages as the PIC sets each switch control to a default low value. If the PIC pulls the switch control high, then the output of that amplification stage is connected to a 4067 16:1 multiplexer and disconnected from the input stage of the next amplifier. The output of the 4067 is connected to the third analog input of the A/D. Due to the fact that there were not enough free pins on the PIC to control the 4067 calibration multiplexer, a Texas Instruments SN74LV393A dual 4-bit binary counter was used. The 393A was under PIC control. The PIC auto-calibration software routine connects and disconnects the various op-amp stages and threshold potentiometers and reads the value of each stage using the calibration multiplexer and its internal A/D as described above, thus calibrating sensors individually.

Auto-calibration techniques in the general case are well known. The auto-calibration software tunes each digital potentiometer of each amplification stage just as a person would tune the analog potentiometers. In the case of the temperature sensors, one possible algorithm is that the sensor value is read while the robot is at a reference temperature such as ambient temperature to the environment, or the temperature of the user's body while in contact with the user's body, and the appropriate potentiometer adjusted to condition the value to be in the middle of the sensor range, or other reference value chosen by design. Subsequent temperature sensor values are then relative to the reference temperature, and may be considered specific or qualitative as a matter of design choice. For touch sensors, similar algorithms may be employed.

Calibration can also be invoked by the operator as needed.

A series of switches (Maxim MAX4636 dual SPDT CMOS analog switch and a Fairchild Semiconductor NC7SBU3157 SPDT analog switch) are used at the various points in each pathway to isolate the output of one stage from the input of the next stage. These switches are normally closed, but during calibration they can be individually opened or closed by the PIC. When in the open state, the output of that stage is connected to another of the A/D input pins of the PIC through a multiplexer.

Finally electric field sensing and temperature sensing are subject to different environmental conditions that may change from day to day or location to location.

Integrating Vision and Touch

The Huggable system integrates vision and touch in several ways. When the Huggable is touched with certain gestures by the user, such as when the Huggable detects that the user is tickling it on the foot or another part of the Huggable, the Huggable autonomously directs its gaze direction towards the part of its body where it is being tickled. Such behaviors maintain the user's illusion of life that the Huggable is alive. Further, these autonomous behaviors facilitate remote control of the Huggable by an operator, as the operator is freed from the cognitive burden of commanding these life-like responses via remote control, which may also result in a delayed response by the Huggable, which would also detract from the user's illusion of life.

As can be readily appreciated, the Huggable techniques permit the integration of other combinations of senses and responses as well. For example, the Huggable can respond to sounds by turning its gaze toward the sound, or by pointing towards the source of the sound. Also, with appropriate motion actuators and control, the Huggable can, in response to a touch on the head or other parts of the body, move its arm and paw to touch the same spot where it is being touched by the user.

A Lower-resolution Bladder-based Touch System

For some applications, a lower-resolution touch sensory design with fewer modes of sensing is sufficient, and may be desirable for reasons such as a trade-off of capability versus cost. A presently-preferred embodiment for detecting touch in such applications employs air bladders paired with air pressure sensors. For convenience, this alternative form of a presently-preferred embodiment is referred to as a Huggable Squeeze Doll. The sizes of these sensors are much larger—for example one air bladder represents the entire upper arm, an area consisting of about 100 sensors in the presently-preferred embodiment for the Huggable robot. These sensors are placed two in each arm (upper and lower), two in each leg (upper and lower), between two and five sensors in the body, and two to three sensors in the head.

One application of the Huggable and of the Huggable Squeeze Doll is as a non-verbal communications device (in addition to other applications, such as being a robot companion) by which a patient can indicate location and severity of pain. A further application is as a communication device for patients when language, cultural restrictions, or other factors make it difficult for a patient to permit a direct physical examination of the patient's own person.

Figure 16A:
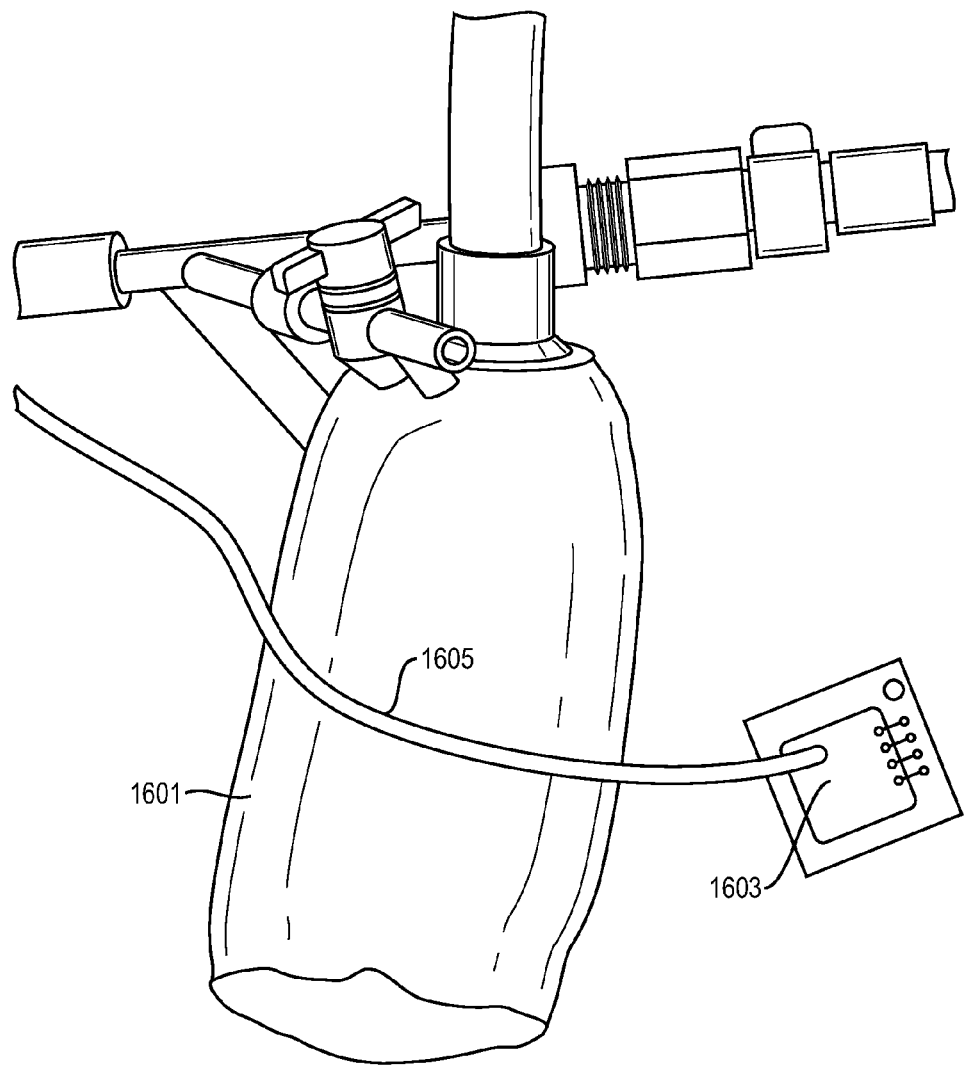
FIG. 16A is an illustration of the components in the squeeze bladder pressure sensors.
Figure 16B:
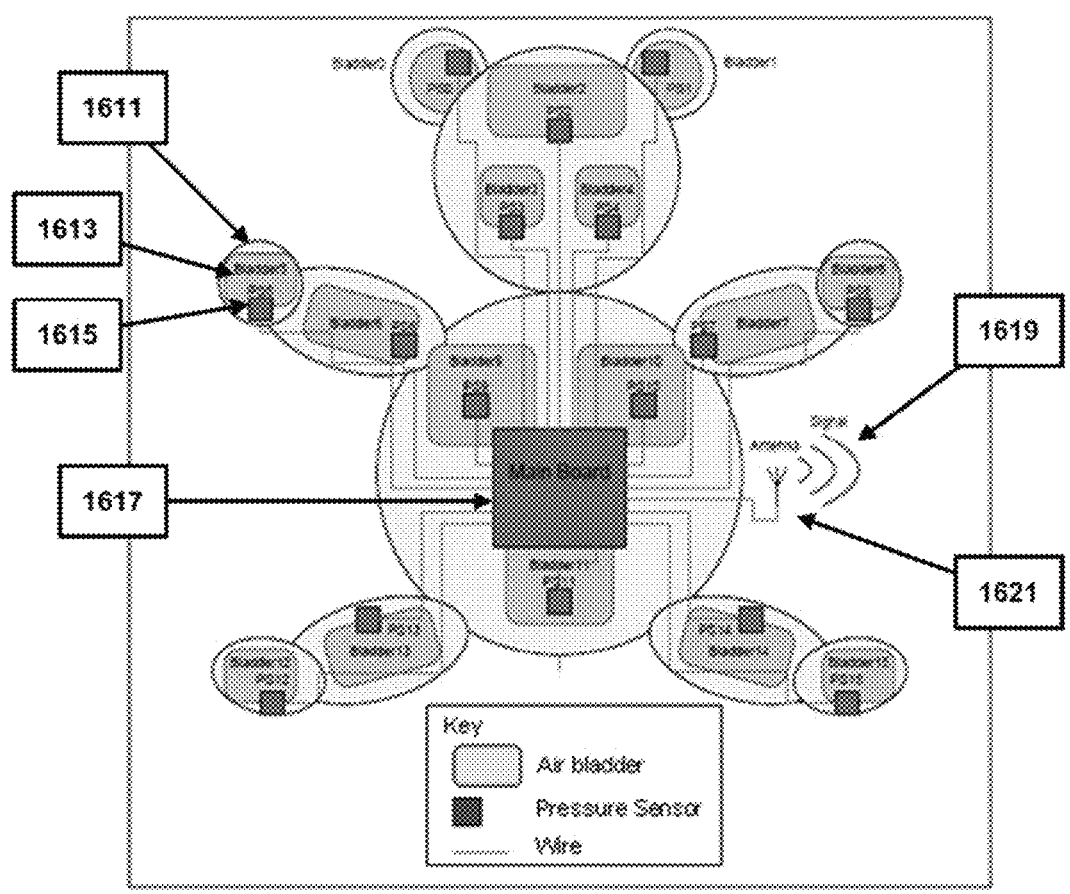
FIG. 16B is an illustration of the layout of squeeze bladder assemblies encased in a Huggable-type robot.

The principles of construction for this sensing system, and the placing of the sensors, are illustrated in FIG. 16A and in FIG. 16B. FIG. 16A shows the construction of the air bladder sensors: the air bladder 1601, the pressure sensor 1603, and the small plastic tubing 1605 from the bladder to the pressure sensor.

The output of the pressure sensor is filtered, conditioned, and sampled with a 10-bit A/D converter on the main processor board. The output from the squeeze doll is calibrated to known metrics of pain for a specific user thus allowing not only the location of pain, but also the severity to be indicated as well. Due to the reduced power needs of the Huggable Squeeze Doll sensors compared to those of the presently-preferred embodiment of the Huggable robot, the Squeeze Doll has longer battery life and less weight.

FIG. 16B shows the 16 separate bladder/sensor sub-assemblies, and the connection to the main processor board. For the right paw region 1611, the air bladder 1613 is connected via small plastic tubing (not shown) to the pressure sensor 1615. The pressure sensor is connected by a wire connection to the main processor board 1617. Data for each of the sensors are transmitted via an antenna 1621 as a wireless connection signal 1619, which is then received at a workstation PC, for example, the PC at a nurse's workstation.

In one application of this system, the Huggable Squeeze Doll is given to a patient or client in a hospital or nursing home and the patient is told: when you feel discomfort or pain, squeeze the location on the doll where you feel this pain. When the patient or client squeezes the doll a signal is sent to the nursing staff at the nursing station indicating the specific doll ID (mapped to an individual patient), sensor location, and value. This information could also be recorded to chart a patient's progress through a therapy or the patient's overall trend of level of pain. Once the nurse receives this information, he/she can take appropriate action. This is separate from the sensing of "pain" to the robot, which is an extreme sensor value that indicates potential damage to the robot itself.

Autonomous, Semi-autonomous, and Remotely-controlled Behaviors

In the presently-preferred embodiment, which is exemplary, the Huggable is controlled by inputs received from the Huggable's environment and by inputs received from an entity that is controlling the Huggable, for example, a nurse at a workstation. These inputs are turned into behavioral control of the Huggable by behavioral control software executing on the workstation PC. Behavior resulting solely from inputs received from the Huggable's environment is termed in the following autonomous behavior; behavior resulting solely from inputs received from the entity that is controlling the Huggable is termed remotely-controlled behavior. Behavior that results from a combination of the two kinds of inputs is termed semiautonomous behavior.

In the presently-preferred embodiment, this behavioral control software implements a number of autonomous behaviors. For example, detecting a tickling gesture by a user of the Huggable, in which the user tickles one foot of the Huggable, the software moves the head of the Huggable such that the gaze of the robot is towards that foot. As a result of the movement of the head, the imaging cameras in the eyes are directed towards the foot which was tickled.

The behavioral control software uses the known techniques of C5M/MAYA. The C5M behavioral software was developed by the Synthetic Characters Group at the MIT Media Lab, as disclosed by Blumberg et al in "Integrated learning for interactive synthetic characters.," in *ACM Transactions on Graphics* 21, *Proceedings of ACM SIGGRAPH* 2002, 2002. The behavior system software runs on a Macbook Pro PC in conjunction with the workstation PC: this is a matter of design choice, as the C5M software is most readily available for the Mac OS. The outputs of the behavior system are then sent via 802.11 to the Embedded PC as motor and audio commands.

In the Huggable, actions performed autonomously or semi-autonomously are not limited to animations, which are defined as a sequence or combination of actions, including the possible playback of sounds, which are always carried out in the same sequence in the same way. The actions can also be arbitrarily complex or varying behaviors, which are defined as sequences or combinations of actions that are changed as a result of intentional programming to vary the exact sequence in a more life-like fashion, or are changed by software in response to interactions with the user or the environment, including the internal state of the Huggable system. Actions and behaviors can also be parameterized to exhibit different elements of character or simulated emotional content under control of the operator. The complex and varying sequences of actions in the Huggable's behaviors can also include sounds and vocalizations including conversational speech.

One feature of the behavior software system is that it generates a virtual video image of the Huggable, showing the position and orientation of the Huggable. The virtual video image generated by the behavior software system is shown in a website GUI. An example of this virtual image can be seen at 803 in FIG. 8 and at 1403 in FIG. 14. Animations or behaviors created in MAYA are rendered back in real time through the system to the motion actuators in the robot, such that there is a one-to-one mapping of the virtual Huggable with the physical Huggable robot—the virtual video image always shows the actual position and orientation of the robot, even if the user moves the robot instead of the actuators moving the robot.

In addition, the Huggable robot can be remotely controlled: this remote control is a further part of the Huggable system. Further, the remote control interface and the autonomous behaviors are integrated in software to produce distinct capabilities as a semi-autonomous robot or avatar. For convenience, the user operating the remote control is referred to as the puppeteer or the operator, as distinct from the human who is interacting with the robot in a social fashion, who is termed the user of the Huggable. An additional term for puppeteering or remote operation with respect to the techniques disclosed here is teleoperation.

As set forth in this presently-preferred embodiment, the control software automatically makes smooth transitions between motions and makes smooth combinations of motions, including between separate autonomous behaviors, between remotely-controlled motions, and in combinations of autonomous motions and motions directed via remote control. This simplifies the operation of the Huggable robot via remote control, and further results in more life-like and compelling behaviors by the robot.

Thus the Huggable can function as a fully autonomous robot, a semiautonomous robot with some external control, a fully controlled tele-operated puppet, or in a spectrum of degrees of autonomous and tele-operated operation.

Details of the Puppeteer GUI

The Huggable platform can be used as a semi-autonomous robot avatar. To this end, the Huggable system includes a number of user interfaces that are appropriate for use by a very diverse user-base of puppeteers. This interface is intuitive enough so that non-expert users like parents, grandparents, or teachers can use it easily.

In addition to being intuitive, the interface also achieves other intended purposes, such as that of being able to direct a puppeteer's attention to some object or location in the robot's environment. It allows for the sharing of attention between the puppeteer and user: for example, the robot may either autonomously or semi-autonomously direct its gaze in a certain direction, and this in turn directs the users' attention towards whatever the robot appears to be looking at. Thus the puppeteer can direct the attention of the user via the robot. Further, the puppeteer can simultaneously see, via the robot camera video stream, that the user is pointing or gesturing to direct the robot's—and thus the puppeteer's—attention.

Further, the robot's user can interact with the robot, such as by moving the robot, speaking to it, or gesturing visually, and the interaction causes software to modify the robot's behavior in response to the gesture or interaction, either autonomously or semi-autonomously.

In addition, the remote puppeteer GUI software provides real-time sensor feedback to the puppeteer, so that the puppeteer can understand how the user is interacting with the huggable. The feedback consists both of the display of a virtual Huggable image, showing the current position and orientation of the Huggable, and animations in the GUI indicating that particular autonomous or semi-autonomous gestures are being performed by the Huggable robot, or the user is moving the Huggable in a particular gestural fashion, such as shaking the robot's hand or bouncing the robot up and down. Touch data are reflected in a visual display of colored dots indicating the type of touch on the corresponding locations in the virtual Huggable image.

Figure 8:
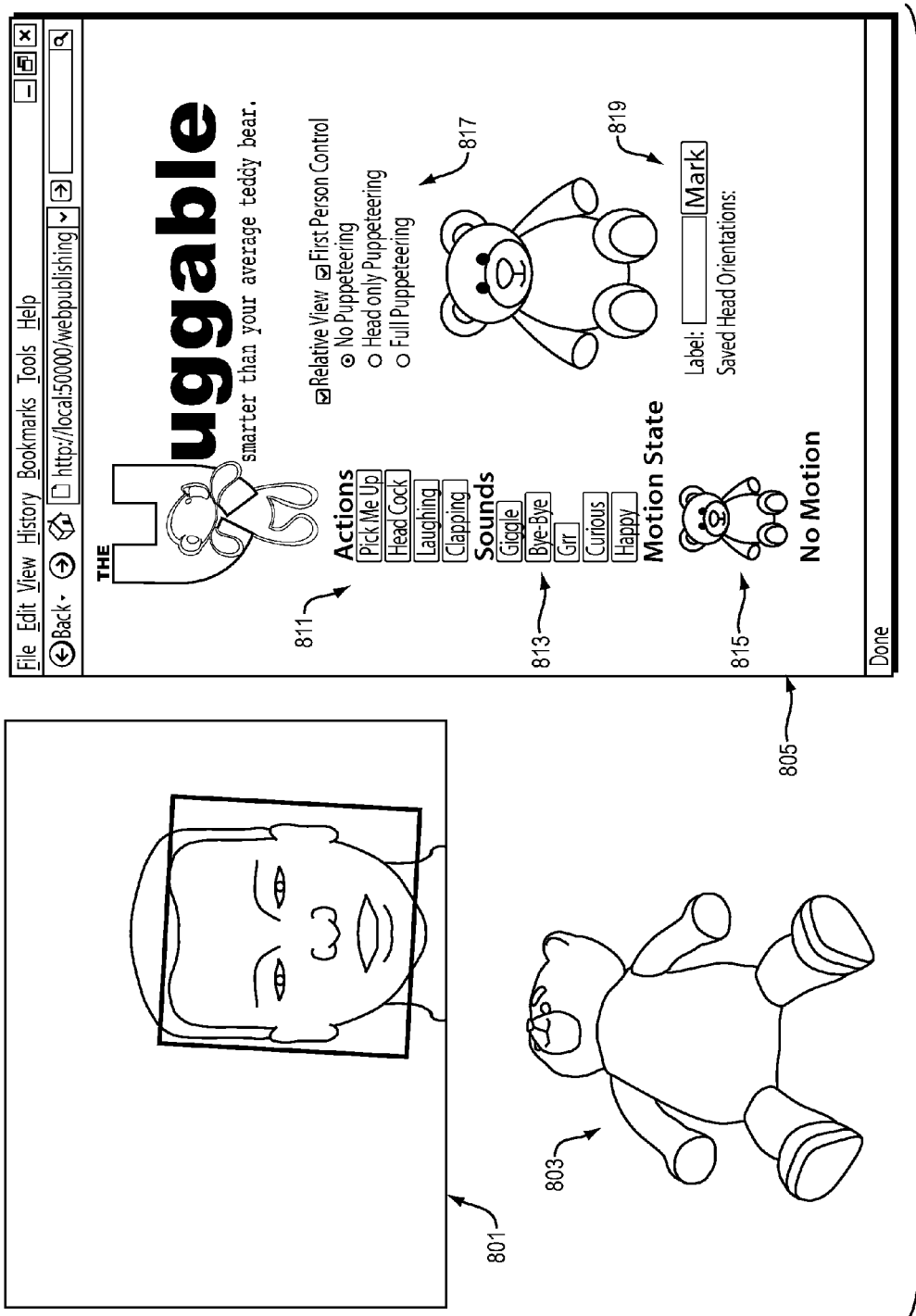
FIG. 8 is an illustration of the website type of operator interface.
Figure 14:
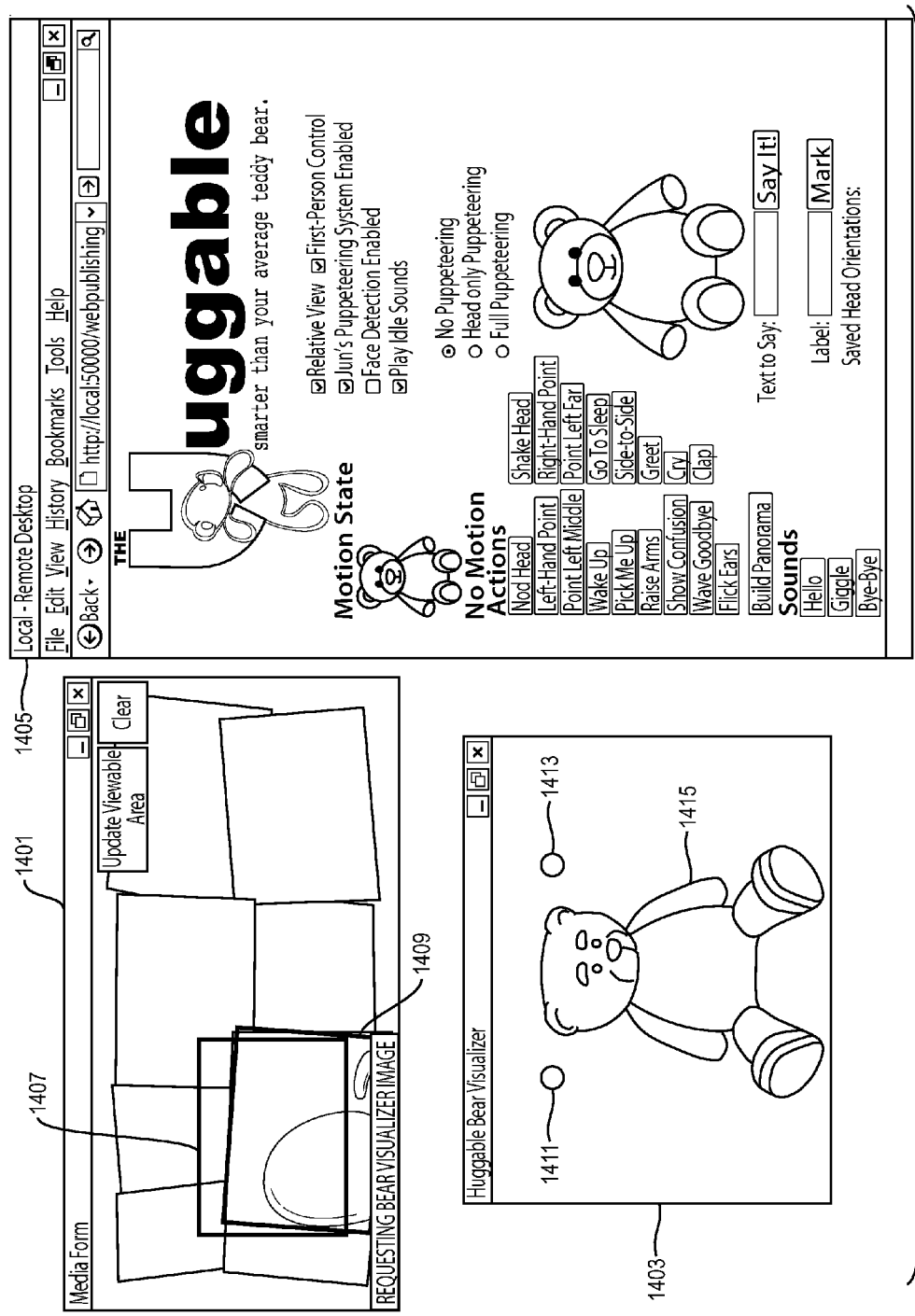
FIG. 14 is an illustration of the website type of operator interface, showing the current and moving-to views within the stale panorama.

This is illustrated in the descriptions for FIG. 8 and FIG. 14.

The interface alleviates the cognitive load of controlling the robot and allows the puppeteer to focus more on the interaction between the robot and the user, and on the content of the interaction. It allows for expression of elements of the character of the robot in a consistent fashion even when being puppeteered by different operators. Further, it is accessible to a very wide range of possible puppeteers because it is integrated with well-established web technologies, such as HTML, CSS, and JavaScript.

Local/Autonomous Technologies

The presently-preferred embodiment employs several software and hardware based technologies to achieve the objectives for the interface. They can be divided into technologies that run locally or autonomously, without the aid of the puppeteer; technologies that are run remotely, controlled by the puppeteer; and semi-autonomously, where the puppeteer initiates a behavior via a command interface, but the behavior is then carried out autonomously.

Face Detection

The face detection technology detects upright and frontal faces in a video feed and denotes them by drawing squares around each face. The software controlling the robot can use the location of a face in the image to move its head so that the face appears in the center of the video feed, effectively making the robot track faces. This is illustrated in FIG. 5. This autonomous or automatic tracking of a face, causes the robot's behavior to appear more life-like, and in addition reduces the cognitive load on a puppeteer or operator, who otherwise would have the burden of directing the gaze or direction of the robot's head and cameras.

IMU Stabilization of Video

Software in the embedded PC implements another puppeteer-less technology, namely to stabilize the incoming video feed when the robot is being moved and rotated by the user. This functionality benefits the face detection technology, as set forth here. Further, the stabilization improves remote operation, by eliminating a cause of motion sickness if the video image shown to the puppeteer were to rotate as the robot does.

This multi-modal technology makes use of both the camera feed and the inertial measurement unit (IMU) of the Huggable robot. Every video frame from the video camera of the robot is coupled with the roll position of the robot given by the on-board IMU. The video frame is then rotated by the negative of the roll value. So if, for example, the robot is rolled 20 degrees, the video frame captured at that moment would be counter rotated by −20 degrees. This counter rotation has the effect of keeping objects upright in the video frame instead of being rotated with the robot. This algorithm, which can be readily understood from this description, is modeled after the fact that while humans may tilt their heads at different angles, and hence tilt what they see, their brains allow them to realize that what they see is not actually tilted. This technology also helps other vision dependent technologies function, such as the face detector. One current limitation in a number of face detector algorithms is that they only detect faces that are in portrait view and in upright orientation with respect to the image. Faces that are tilted or are in profile are less likely to be detected by many of these known algorithms. Subsequently, if the robot has been placed on its side, no faces would be detected unless the faces were tilted in the same orientation of the robot. Thus, this stabilization of video overcomes known disadvantages in algorithms for the detection of faces in this kind of image, via this multi-modal use of the robot's camera and IMU sensors.

Additionally, the stabilization calculation further takes into account the tilt of the head and other DOFs with respect to the IMU data, based on the kinesthetic sensor data in the robot.

IMU Motion Classification

This is one example of gesture classification or recognition. Software executing on the embedded PC performs a classification of how the robot is being moved. Algorithms that process the data from the IMU identify whether the robot is being picked up, bounced, or rocked. With the remote puppeteer interface, software in the remote interface displays an animation or animated image to the puppeteer indicating that the user is performing the particular gesture with the robot. For example, when the software recognizes that the robot is being bounced up and down, two things may occur in the Huggable system: the Huggable performs an autonomous behavior such as "laughing" in response to the gesture; further, the remote interface GUI displays an animated icon image of a Huggable robot that bounces up and down.

Alternatively, the Huggable robot's behavior may be semi-autonomous: when the software recognizes that the user is bouncing the Huggable robot and the animated icon image so indicates, The puppeteer can then command the robot to "laugh", and the robot will from that point autonomously perform the laughing behavior. The degree to which behaviors of the Huggable are autonomous, semi-autonomous, or controlled by the operator is controlled in a preferred embodiment by the operator.

3D Model

The GUI for the puppeteer provides the puppeteer with a display of the three dimensional virtual model, generated by the C5M Behavioral Model software, of the robot. The puppeteer can thus perceive the position and location of the Huggable at all times. Potentiometers in each of the robot's DOFs record their current position and subsequently update the joints of the virtual model, and vice-versa. By virtue of this coupling, moving a joint on the real robot moves the joint of the virtual one, and vice-versa. This allows for the puppeteer to easily see how much range of motion is left as the puppeteer moves the robot around. It also provides a virtual mirror to what the Huggable's user sees as the user looks at the robot. The virtual model image is implemented using a derivative of the C5M software.

Remote Puppeteering Technologies

In this section we disclose systems employed by the remote operator (or puppeteer) to control the robot.

Web Interface

The Huggable embedded PC communicates via network connection with a PC workstation, as has been set forth. Software on this workstation PC employs well-known software components to implement combination of a website for controlling the robot, and an application for streaming audio and video to and from the robot. The website includes a diagram that shows which parts of the robot are currently being moved (as detected via the potentiometer sensors), several buttons to initiate different actions by the robot (movement and sound), an interface to enter text for the robot to speak, and various check-boxes to toggle on and off several of the aforementioned technologies or to select degrees of autonomous behavior. The two video streams provide information about the Huggable to the puppeteer: one is the video stream from the robot's video camera, and the other stream is the virtual three-dimensional image of the robot in the GUI.

In the puppeteer GUI there is also a simple animated icon or small picture which indicates which motion state the robot is in, such as whether it is being picked up, rocked, shaken, or bounced. The puppeteer GUI also permits the puppeteer to speak through the on-board speakers and listen through the on-board microphone.

The puppeteer GUI is illustrated in FIG. 8 and in FIG. 14. Elements 801 and 1401 show the panorama display of the Huggable's environment, with rectangles 1407 and 1409 showing the current live view from the Huggable's camera, and the desired position for the live view. Elements 803 and 1043 show the virtual display of the Huggable's position and orientation, generated by the control/modeling part of the behavioral software. Elements 805 and 1405 show the website page through which the puppeteer controls the Huggable.

The primary control GUI elements of the website interface are also shown in FIG. 8. GUI buttons for causing the Huggable to perform semi-autonomous are shown at 811: there are separate and specific GUI buttons for the robot to make certain gesture: for example, a "pick me up" gesture, a "head cock" gesture where the robot's head moves to one side, a "laughing" gesture where the robot moves as if laughing, and a "clap" gesture with the customary meaning. Element 813 is a set of separate and specific GUI buttons for the robot to make certain sounds through the built-in microphone, such as "giggle", "bye-bye", and a "happy" sound. Element 815 is an icon which is animated to indicate what gestures the control software has determined that the user is making with the robot, such as changing the icon to a bouncing up-and-down animated icon when the user is bouncing the robot. The radio-button GUI elements at 817 allow the puppeteer operator to select different modes of operation, such as "No puppeteering" (the robot interacts autonomously with the user, with no input from the operator), "Head only puppeteering" such that only the head part of the robot is under control by the puppeteer, and "Full puppeteering" so that the puppeteer may make use of all control features of the website interface for the whole robot. Element 819 allows the puppeteer to give a label to the current location in the panorama: this location or direction is remembered, and the puppeteer can direct the control software to turn the head and gaze of the Huggable to any of the remembered directions by use of the GUI button associated with that label.

Alternative Control Interfaces for the Huggable

Wearable Interfaces

There are two alternative wearable remote-control interfaces in the presently-preferred embodiment of the puppeteer GUI.

Figure 17A:
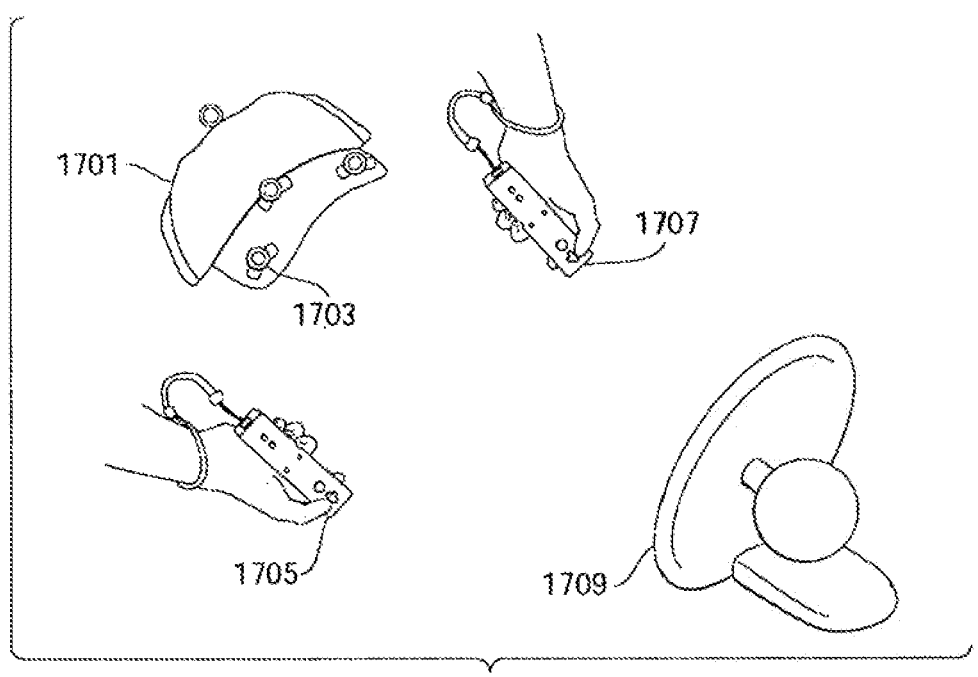
FIG. 17A is an illustration showing the primary components of the first wearable operator interface.
Figure 17B:
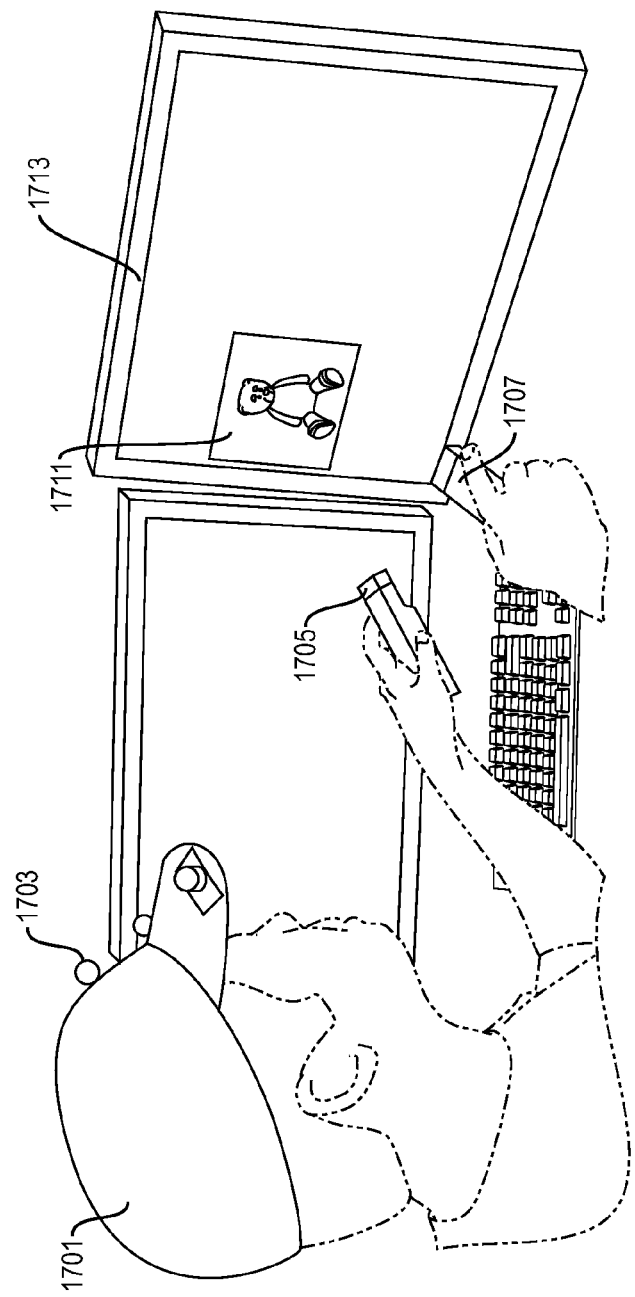
FIG. 17B is an illustration of the use of the first wearable operator interface in conjunction with the visual display.

The first wearable interface is shown in FIG. 17A and in FIG. 17B. This first wearable interface consists of a set of devices that aids in capturing the operator's movement such as his/her body posture and gestures. First, commercially available Wii Remote and Wii Nunchuk sensors 1705 and 1707 are used to capture the operator's movements with the hands and arms. Second, an infrared webcam 1709, and reflective markers 1703 mounted on an adjustable cap 1701 are used to estimate the operator's body posture (including three neck joints and four shoulder joints). While using this wearable interface, the operator observes the position and orientation of the Huggable in the virtual image 1711 displayed in the website interface 1713.

In this first wearable interface, the Wii Remote and Nunchuk are connected to the workstation PC computer via a Bluetooth wireless connection. These devices send a total of six acceleration values in three different orthogonal directions for two controllers. The data stream is recorded and used to train six different continuous hidden Markov Models (HMM) for specific gestures by the puppeteer. These gestures include arms up, arms forward, bye-bye (one arm up and waiving), crying (wiggling both hands in front of eyes), ear flickering (wiggling both hands above the head), and clapping (with both arms forward repeating moving both hands left to right in an opposite direction). Recognized gestures are sent to the C5M sub-system to evoke animations of the Huggable: software controlling the Huggable causes the Huggable to perform movements semi-autonomously in a lifelike fashion for the desired animation.

Most prior art marker-free body detection systems are not robust enough with regard to noise and changes in lighting conditions. People's homes are more subject to noise and change in lighting conditions than environments such as engineering facilities or research labs. To avoid the problems of marker-free systems, in the presently-preferred embodiment an infrared camera and infrared light reflective markers are used instead. Imaging systems for infrared light reflective markers are noiseless and stable in comparison to marker-free systems. To further improve the performance of the infrared camera, the lens was replaced with a 2 mm wide-angle lens, and a visible-light-blocking filter made from exposed color film was attached in front of the lens.

As can be readily appreciated, alternatively to the sensor devices mentioned above, other sensors may be employed, such as accelerometers, gyrometers, three-axis magnetometers, or multi-dimensional electromagnetic digitizers. These and other appropriate sensor technologies are well known in the art.

Figure 19A:
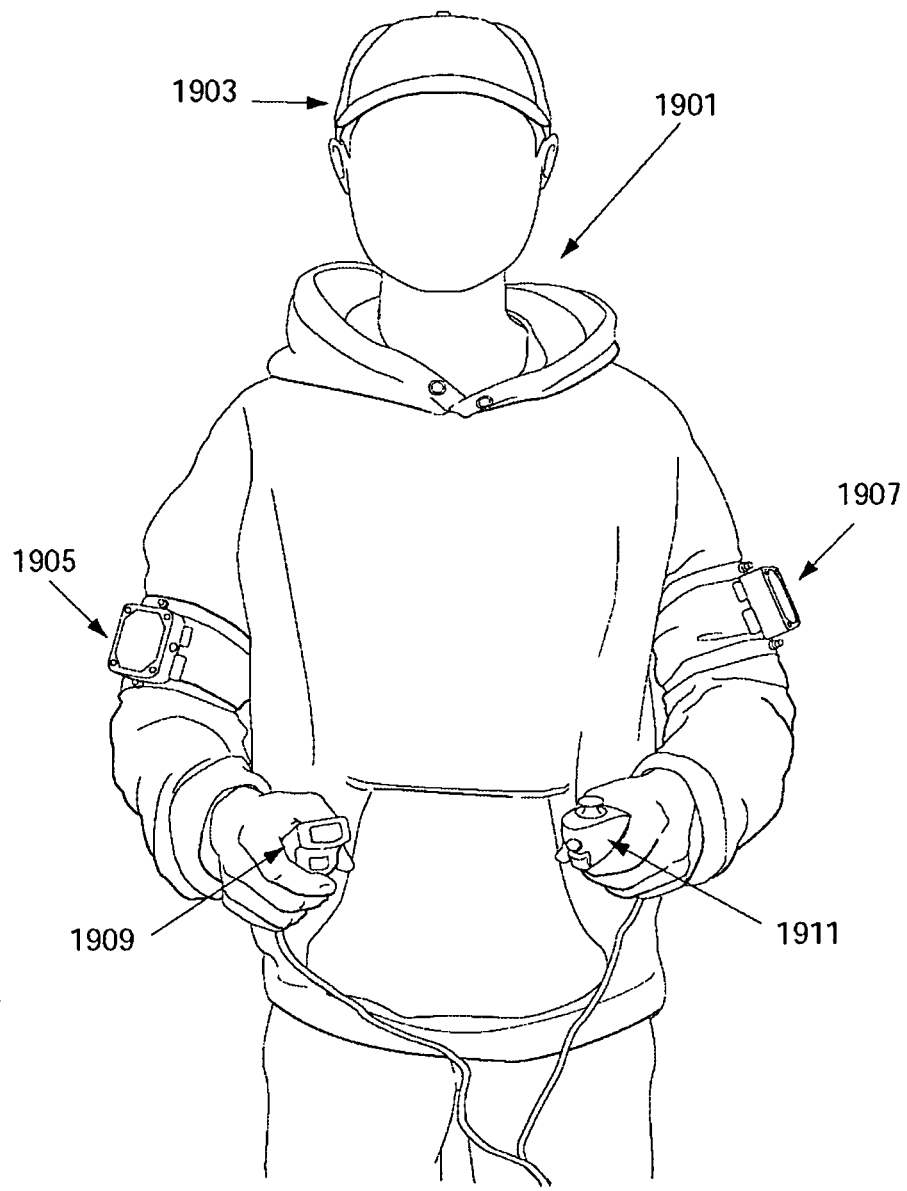
FIG. 19A is an illustration of the second wearable operator interface.
Figure 19B:
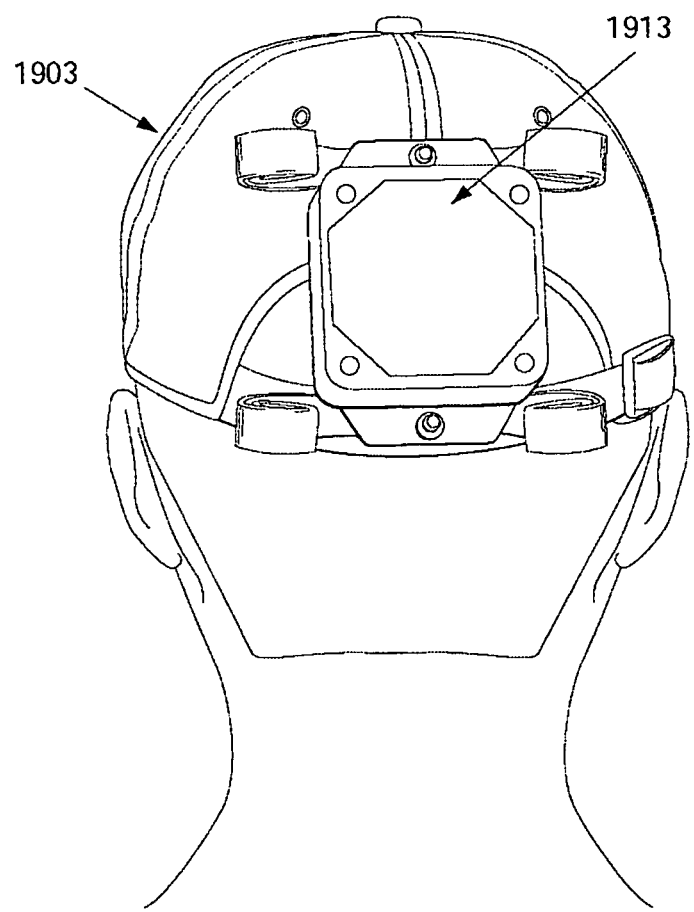
FIG. 19B is an illustration of the second wearable operator interface, showing components not visible in the view of FIG. 19A.

The second such wearable interface is shown in FIG. 19A and FIG. 19B. This wearable interface employs passive sensing technologies and direct manipulation. For the direct manipulation in this preferred, the operator controls both shoulders and the head (neck) of the virtual robot. In the presently-preferred embodiment, operator control of other degrees of freedom is not implemented, although such an extension is readily seen to be a matter of design choice and implementation. To track the operator's neck joint changes, a baseball cap with four reflective spherical markers in a shape of tetrahedron was used to extract three joint angles (yaw, roll, and pitch).

FIG. 19A shows an operator 1901 wearing a cap 1903 to which a position/orientation sensor (1913, not visible) is attached. This sensor is used to sense the orientation of the operators head. Two additional position/orientation sensors 1905 and 1907 are worn near each elbow, so that the orientation of the arms can be determined. The Wii Remote and Nunchuck 1909 and 1911 are held in the operator's hands.

FIG. 19B shows the mounting of the position/orientation sensor 1913 on the cap 1903. The associated electronics for the position/orientation sensors are not shown.

One benefit of this wearable system is that it gives the operator the feeling of actual physical interaction while controlling the robot and thus reduces the complexity of the control interface.

Sympathetic/Tangible Interface

The Huggable can also be controlled via a sympathetic or tangible input interface. A sympathetic interface or tangible interface is a physical "input puppet" or model similar in form to the Huggable robot. The sympathetic interface is instrumented to note the position of its joints and movable parts, which correspond to the motion-actuated parts of the Huggable robot. The interface is further instrumented to be sensitive to touch, using techniques disclosed for the Huggable robot. The puppeteer directly manipulates this sympathetic input device as a tangible interface, moving the joints of the sympathetic interface and touching the interface. These inputs are used to control the Huggable robot, which may be done using either or both of the techniques of direct manipulation or classification of gestures by the puppeteer.

As with any of the puppeteer interfaces disclosed for the Huggable, the sympathetic interface can be used to record animations for the Huggable robot. These animations can be added to the repertoire of actions or behaviors carried out by the Huggable in either autonomous or semi-autonomous fashions.

The sympathetic type of interface for the social robot of the Huggable system, like the wearable type of interface, can be particularly suitable for applications in which the Huggable robot is used as a physical avatar for the operator, similar to the application of the Huggable as an avatar in virtual reality systems such as those represented by Second Life, www.lindenlab.com, Linden Lab, 945 Battery Street, San Francisco Calif. 94111. The avatars of virtual reality systems such as Second Life are not physical objects, as is the Huggable.

The Huggable system can also be implemented with other types or combinations of types of operator interfaces, in addition to the types already disclosed. For example, the Huggable can be used with operator interfaces that use a fixed console incorporating joystick or mechanical slider controls, physical buttons, and other input control technology.

Display of Face Detection

In the presently-preferred embodiment, vision data are sent from the Embedded PC to the workstation PC running Windows XP and the OpenCV library, as well as the website interface. Software executing on the workstation PC processes the digitized for face detection as shown in FIG. 5 and displays where faces have been detected with rectangles, shown in the example as 501, 503, 505 and 507. The workstation PC also executes the behavior system software for invoking animations for the Huggable robot. The behavior system software also receives processed sensory output from the Embedded PC.

Stale Panorama

One phenomenon of teleoperation in the existing art is the fact that a robot's video feed generally presents the remote operator with tunnel vision. Humans not only depend on their high-resolution fovea for localizing themselves in an environment, but also on their peripheral vision. It is more difficult to localize oneself if the only data are from the fovea, or in our puppeteer's case, a 320×240 video feed. One method in the existing art to cope with this phenomenon is to use a camera with a wide viewing angle (or a "fish-eye") lens. However, this type of camera could then not be used as readily for face detection nor for some forms of motion detection because of the distorted nature of the video image and/or low absolute resolution of the image. Another obvious approach is to use two cameras (one in each eye of the robot)—one for sending video to the operator (the wide view angle camera) and the other for capturing video for other video dependent services (the regular camera). For current commercially-available components, this also presents limitations, for example: it increases power consumption due to the addition of the second camera, it increases the cost of the robot, and it complicates the mapping between locations in the regular camera feed and in the wide angle camera feed.

Another attempt in the existing art to overcome tunnel vision is to have the wide-angle video camera of the robot or an additional camera on a mounted at a fixed position behind the robot, to give an approximate wide-angle view of the scene in front of the robot. This type of design is not mobile—it does not move when the robot is picked up and carried away by the user—and further suffers from a difference in perspective from what would actually be in the gaze of the robot.

Figure 18:
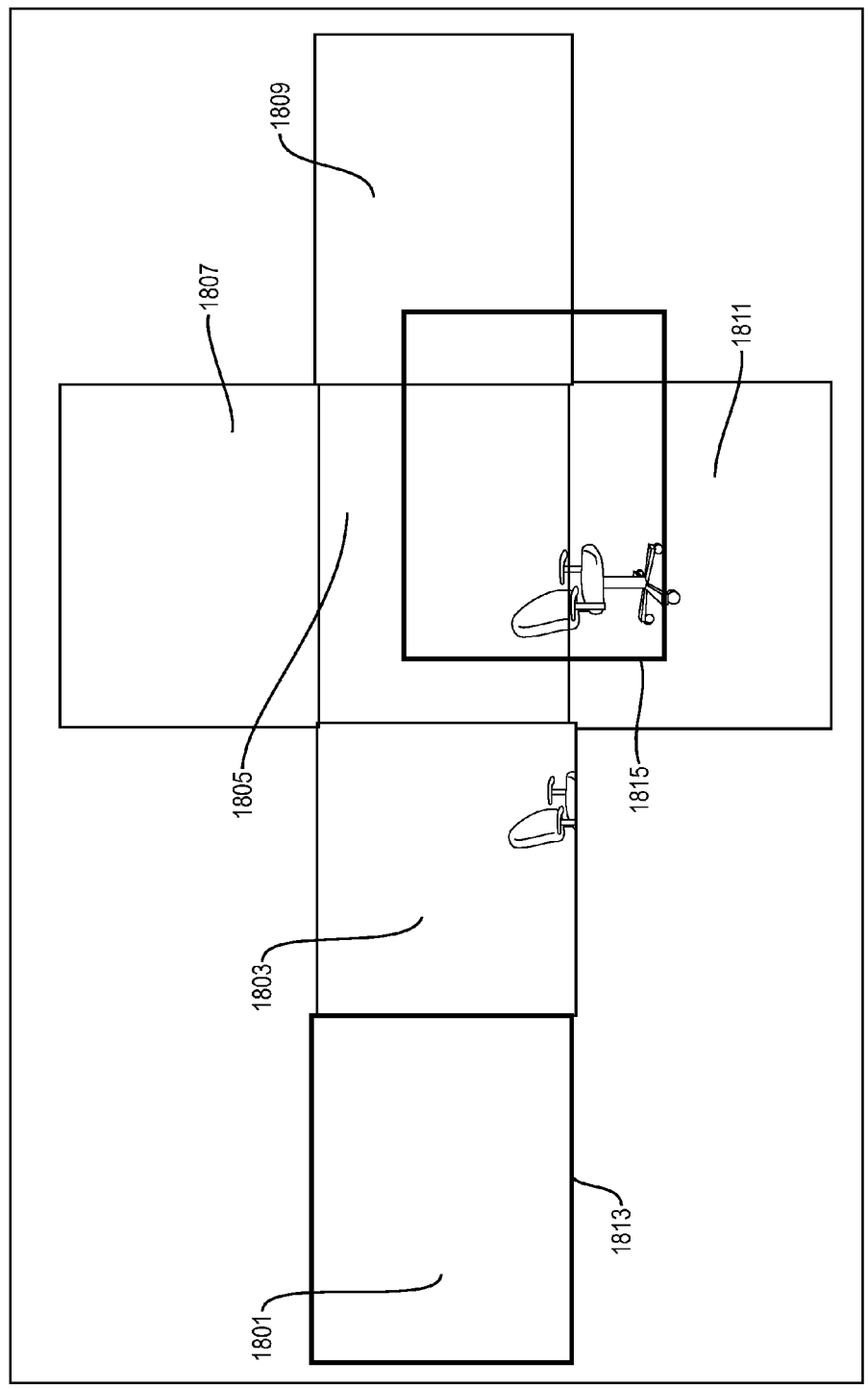
FIG. 18 is an illustration of the construction of the stale panorama image.

In the Huggable system the imaging and controlling software for remote operation implement a stale panorama, as shown in FIG. 18. To obtain the panorama, the Huggable autonomously looks around the environment, capturing video frames and storing them with the associated position of the robots head. Alternatively, the Huggable could also capture video frames while being operated remotely, or semi-autonomously. Elements 1801, 1803, 1805, 1807, 1809 and 1811 are frames compiled so far to construct the stale panorama. The control software positions the current live image in the stale panorama and marks the current live image with a rectangle 1813: in this example the live image is the frame of element 1801. A second rectangle 1815 of a different color indicates the desired or targeted view towards which the control software will move the gaze of the robot.

Note that FIG. 18 shows the panorama being constructed in a regular sequence of images, for clarity in description. In the presently-preferred embodiment, in order to create a more life-like behavior for the Huggable, the Huggable is programmed to capture frames by gazing in different directions and engage in other behaviors also while collecting the images to compose the stale panorama.

As these frames are collected, the stale panorama is constructed by superimposing them on a much larger canvas at a location corresponding to the position of the robot's head at the time the frame was captured. When the robot constructs the stale panorama autonomously, software running on the robot's embedded computer chooses how the robot looks at parts of the environment that it has not seen yet and eventually fills in the entire canvas. The result is a collage of still images that are positioned so and so combined that they build the stale panorama of the environment. The only non-stale part of the canvas is the current position of the robot's head, which is instead a streaming video feed. This information is displayed alongside the feedback from the website interface.

The stale panorama allows the puppeteer to quickly change the gaze of the robot-accurately pointing to something in the environment. This is in contrast to the known art of using a joystick to initiate the turning a remote camera, or in this case the turning of the robot's head, which often results overshooting due to latency in the video feed.

The algorithms for implementing this stale panorama and positioning live images in it are well understood by practitioners of the art of video editing and image processing.

Implementation of the Elements Needed for Remote Operation

A robot companion should support certain elements for puppeteering. These elements are not generally found in prior art systems, or are not found collectively. The elements include sharing attention between the puppeteer and the user of the robot, directing the user's attention by means of gestures by the robot, real-time sensor feedback to the puppeteer, alleviating cognitive load on the puppeteer, displaying elements of character by the robot to the user, and operation of the puppeteer GUI over the an intranet or the world wide web.

Sharing Attention Between the Puppeteer and the User:

The first element is to allow the puppeteer to effectively share attention with the user: the user and the puppeteer can, for example, both look at the same objects at the same time, and each can direct the attention of the other, such as by pointing. Sharing attention is crucial to engaging the user of the robot and to synchronizing communication. This is addressed in part by the control associated with the stale panorama technology.

The remote interface allows the puppeteer to play actions and sounds via the website interface, thus allowing the robot to express forms of acknowledgement and confirmation which also help express sharing of attention. In the preferred implementation, the actual play actions and sounds can be performed as autonomous animations initiated by the puppeteer via the remote interface. For example, a button for "nodding" on the remote interface, is programmed to invoke functionality in the software controlling the Huggable to cause the Huggable move its head in a "nod" in a lifelike fashion, and the controlling software further combines this action with semi-autonomous motions and other motions by the Huggable in a smooth fashion, further contributing to the lifelike fashion of the motion.

Directing Attention of the User of the Robot:

The ability for the robot to direct the attention of the user of the robot is especially important in educational applications. Many game scenarios for children include pointing and gazing. For example, in the number matching game, a teacher points and counts two different sets of objects and thus makes children learn the concept of sameness in number.

The wearable interfaces and sympathetic of the Huggable are especially useful in this context. Just like a teacher instructing in front of a child, the remote operator can teach children through these interfaces by the remote operator moving his/her own body or the "doll" or copy of the Huggable.

Real-time Sensor Feedback to the Puppeteer

Real-time feedback of sensor data to the puppeteer is quite limited in prior art systems: typically it consists only of a view from a remote camera mounted in the robot, and is thus quite limited in utility.

The virtual three-dimensional model of the state of the robot gives the effect of the puppeteer looking in a mirror to aid in the control of the robot. The motion recognition system that identifies how the robot is being moved about in discrete classifications of gestures also serves to give the puppeteer feedback about its sensors. The animated image of this classification that is shown on the website interface enables the puppeteer to obtain an idea of how the Huggable is being moved that would otherwise not be conveyed through the three dimensional virtual Huggable image or the incoming video feed from the on-board camera of the robot.

The kinesthetic sense, realized by the use of potentiometers in each of the robot's joints, and displayed in the virtual image part of the web interface, reflects not the intended position of the robot, but instead its actual position. Using this information, the puppeteer is aware of which parts of the robot the user is moving, and how they are being moved.

In the presently-preferred embodiment, touch data from the sensitive skin is displayed graphically and in real-time. The graphical display is a lower-cost alternative to providing these data via a haptic interface. The Huggable has approximately 1500 sensors all over the surface of its body in specific locations. These locations are mapped directly to a layer of the virtual Huggable image displayed on the website. As each sensor is activated, the corresponding rectangle graphic's color on the virtual Huggable is changed. Type of sensation (touch, temperature, pain) is indicated by color. Intensity of the sensation is shown by intensity of the color. As the virtual huggable skin sensor layer is based on the actual solid model of the robot, there is a direct one-to-one mapping of sensor locations to the locations of the rectangles in the virtual image.

Alleviating Cognitive Load on the Puppeteer:

The presently-preferred embodiment for the Huggable involves 8 or more degrees of freedom, which in itself can present a significant cognitive load to the puppeteer for controlling the robot. With simpler robots of the prior art, the problem of cognitive load is already known to increase with the number of degrees of freedom.

The stale panorama technology and associated website interface helps with this issue by providing the puppeteer with an easy to use interface for controlling gaze. This is superior to prior art means for controlling a robot's gaze involved using a device such as a joystick, thumb-stick or game controller. The puppeteer would move the thumb-stick to turn the robot's head, but due to latency and unfamiliarity with this type of input device, puppeteers have a difficult time controlling the robot's gaze. The stale panorama offers a more intuitive interface that controls the robot's gaze at the slide of a viewing window. Another aspect of the presently-preferred embodiment that helps reduce the cognitive load on the puppeteer, is the use of IMU data to stabilize the video feed by counter-rotation. This technology helps orient the user in their remote environment, thus helping them understand what they see in the video feed. Further, the stabilization greatly reduces the disadvantage of vertigo or motion sickness found in the prior art. This type of technology is generally absent in the prior art: any robot that can be picked up and carried suffers in usability without the advantages of this technique.

Further, puppeteering the robot becomes tedious if the user of the Huggable tends to move around frequently. Keeping the user in the sight of the on-board video camera, in the means provided by the prior art, requires some cognition by the operator that might interrupt or at least hinder the intended interaction through the robot. The face detection and auto-centering techniques disclosed herein address this by automatically centering on the face of someone in the image. If the user moves away from the center of the frame, his/her face would be detected and the gaze of the robot would rotate to center on the user once again. The only assumption made by this technology is that the user does not leave the video frame completely and that the robot is not already at the edge of its range of motion, or alternatively that these operational circumstances occur infrequently.

Software controlling the robot may also direct the gaze of the robot autonomously or semi-autonomously in the direction of spoken voices, or loud sounds.

In a scenario where the puppeteer is speaking via the robot to more than one user, it would be distracting for the puppeteer to have to move a robot's gaze back and forth from each user. This is a limitation in the existing art. The face labeling technology of the Huggable system addresses this limitation by enabling the puppeteer to quickly move from one face to the other at the click of a button, instead of via the movement of a thumb-stick or via sliding a video window.

Known or future software algorithms for the recognition of faces and/or voices can also be included in the software controlling the robot. In this fashion, in addition to the software algorithms for the generic detection of faces and/or sounds without identifying the individual face, the software controlling the robot can indicate to the puppeteer by animated icon, label in the video image, or otherwise, what users are present. The control software could further cause the robot to perform a greeting gesture or vocalization when the arrival of new users is detected.

Further, specific gestures of the robot, such as bye-bye, clapping, and crying, are evoked and controlled in the Huggable system by the wearable puppeteering UI as mentioned above. Gestures by the puppeteer are captured through the sensor devices of the wearable interface and used to evoke a set of semi-autonomous animations (actions) by the robot. While an operator still controls the robot by directly manipulating each joint, other parts such eyebrows and ears, which for reasons of cognitive load are not controlled directly by the operator in the presently-preferred embodiment, can be driven using gestures. In addition, the Huggable can also be driven solely by gestures.

Alternatively, these semi-autonomous animations may also be invoked by buttons in the website GUI, as set forth in the description of FIG. 8.

Thus, the employment of these semi-autonomous animations lightens the cognitive load of an operator and enriches the expressiveness of the robot.

Elements of Character During Puppeteering

Several features give the robot autonomy and help define the character of the robot, as perceived by the user. Software in the puppeteer's GUT permits the puppeteer to enter text, which the robot plays back through the loudspeaker in its mouth using known text-to-speech (TTS) voice outputs and sound effects. Software in the control computers of the Huggable also causes the Huggable to perform various kinds of animations conveying socially meaningful gestures, both autonomously, or semi-autonomously as invoked by the operator. Moreover, when the robot is idle, the Huggable's control software, executing on the embedded computer, causes the robot to look around the room occasionally (and optionally refresh the images for the stale panorama) and perform a breathing animation, which swings the robot's arms slightly and slowly raises and lowers its eyebrows.

The software rendering the TTS voice outputs does so with a consistent synthetically-generated voice: the particular artificial voice is chosen to match the intended "character" or personality for the Huggable robot. Further, by thus having the robot always speak with a consistent voice, and with much of the motion of the robot generated by autonomous or semi-autonomous operation of the robot, the user does not perceive the character of the robot as having changed when a new operator takes over. Perceived character can be determined to a large degree by the programming of the robot during tele-operation, thus reducing the burden on multiple operators to try to appear as a single operator and character, or on a single operator to try to appear as a consistent artificial character.

The puppeteer can select different synthetic voices for TTS output. Alternatively the puppeteer may speak 'directly' through the robot's speaker by speaking into a microphone that is part of the GUI. As can be readily appreciated, known voice-changing or voice-font techniques can be applied to change the quality of the puppeteer's voice before is it delivered to the robot's speaker, including the application of 'voice font' techniques to make different puppeteer's voices result in a consistent voice sound from the robot, or to add dramatic effects more easily than if the operator were required to create them via her/his natural voice.

Alternative, the puppeteer's GUI interface provides the puppeteer with the ability to change the idiosyncrasies of the robot by switching between different sets of animations or types of behavior and voices. Although the robot's physical appearance may not change, the change in idiosyncrasies may be used to alter the user's belief of the robot's identity or of the robot's internal or emotional state, if that is desired.

World Wide Web Operation:

The website interface increases the availability and accessibility of the puppeteering interface by leveraging current browser technologies. The issue of latency in feedback provide to the puppeteer is a limiting factor for many prior art system that provide some kind of internet-enabled interface. This limitation is addressed via the stale panorama technology as well as in the semi-autonomous behaviors such as face auto-centering and the face labeling technology. Latency and bandwidth limitations are known in any networking system, whether the network connection includes transmission over the World Wide Web, only over a local network or intranet, or any combination of network connections.

The benefits of the semi-autonomous and autonomous behaviors of the Huggable in addressing these problems of latency, as well as related problems of limited bandwidth, are readily apparent. For example, as is readily understood, latency in the delivery of a video stream from a robot's cameras to the operator, or latency in transmitting commands from the operator to the huggable, may make the robot's behaviors appear unrealistic, as the delay in the robot's apparent response would be un-lifelike. Autonomous behaviors by the Huggable, such as directing the gaze or exhibiting a gesture response to an interaction by the user, perhaps a generalized response such as flicking its ears or pointing, maintain the illusion of immediate, life-like behavior, permitting some additional time for the operator to respond remotely with a spoken or other response.

Application Areas for the Huggable

The Huggable system may be used in the care of a patient in a healthcare setting. The patient is the user of the Huggable. Software controlling the Huggable, executing either on the embedded PC or on the workstation PC with which it communicates, gathers data about the interaction pattern with the patient. The data may include the affective content of the patient's interaction with the Huggable or the level of activity the patient is having with the Huggable. The Huggable system's puppeteer GUI permits the nursing staff to analyze the data. The data may be recorded by the puppeteer workstation during autonomous operation of the Huggable, so that the data can be analyzed later.

Additionally, the patient can wear other sensors, such as medical diagnostic sensors in a hospital setting, and this information can be gathered by the Huggable. Of particular note is that medical sensors can be mounted in the Huggable robot itself and thus be more comfortable, physically or psychologically, for a patient such as a child. Alternatively, a medical sensor may be modified to employ Huggable techniques, such as giving a medical sensor wristband the appearance of a decorative bracelet with a small robotic or passive butterfly decoration.

One example of the utility of this information—which otherwise would have to be gathered by a human staff member who may not even be available to interact continually with the patient—is that a drop in activity or change in the way a user interacts with the Huggable may be a precursor to a more severe problem or change in mood. Further, the video from the cameras in the eyes of the Huggable and audio from the microphones can be transmitted to the nursing staff.

In addition, software operating on the Huggable can both recognize and relay critical information to the nursing staff in a timely fashion. An example of this application is a young child undergoing cancer treatment who has just moved into the facility. He or she may be scared during their first night and hug the Huggable tightly or rock it back and forth. This information is transmitted to the nursing staff to indicate that they should check on the child.

Communication Between a User and Another Person at a Remote Location

There are numerous applications for the Huggable system as a system for communicating, including social and affective communication, between a user and another person at a remote location. These include applications where the user is a child, and the person at the remote location is an adult operator or puppeteer.

Maintenance of Social Relationships

Many technologies exist to enable family members to talk to one another, see each other, or share photos with one another. There also exist technologies for conveying a "Hug" remotely via a haptic interface as described by Disalvo et al in "The Hug: An Exploration of Robotic Form for Intimate Communication," in *Ro-Man* 2003, 2003, and in United States Patent Application 20070063849 "Wearable haptic telecommunication device and system". However, there currently does not exist a method for family members to play with each other outside of the virtual environment of video games and online virtual communities. The Huggable system may be used for social communication and interaction remotely. In this type of application the Huggable may be referred to as a Social Communication Huggable (SCH), and constitutes a new type of technology to allow for family members to play together using the physical Huggable robot as an avatar.

For example, a remotely-located grandparent might use the Huggable to play with a young grandchild, or to read or tell stories to the grandchild, with the ability also to communicate socially through the robot by means of gesture and touch. The grandparent, can see the child's face through the camera eyes of the robot, and hear the child's voice through the microphones of the robot, and carry out conversations, share drawings, and more.

One common form of play is to use a stuffed animal or doll as a puppet, moving its arms, talking through the doll to tell stories, and based upon the child's reaction, change the nature of the interaction. Unfortunately, for such an interaction to occur, the child and the operator of the doll must be in the same room, in close proximity to one another. Further, for some elderly users who may be suffering from arthritis or other limitation, the manipulation of a manual puppet may be difficult. In cases such as when the grandparent is in a nursing home, a hospital, or simply lives far away from the child in the same country or across the world, the Huggable system makes it possible to share a similar type of interaction.

In such an application for the Huggable, there are two visible components—the workstation computer used by the grandparent and the SCH robot used by the child. Using the wireless network connection of the SCH, video from the cameras in the eyes of the SCH and audio from the microphones in the ears of the SCH is transmitted to the grandparent's computer via the internet allowing the grandparent to see his or her grandchild in a window on the computer screen and hear his or her grandchild through the speakers connected to the computer. Additionally, a virtual image of the SCH, shown in FIG. 14 as element 1403, is displayed. Through this virtual simulation, the grandparent can see how the SCH is being held, where the child is touching, and what animation is currently playing back on the SCH.

The grandparent can then control the child's SCH through the computer screen, pressing buttons to play different animations back on the SCH, enable autonomous behaviors such as looking at the child with its eyes, and even through a text to speech interface or microphone interface speak to the child through the SCH.

Education and Remote Teaching

As can be readily appreciated, the Huggable has numerous applications in remote teaching, especially with children. In many settings it is not possible or it is prohibitively awkward for a human teacher to be physically present: the child may be in an isolated situation such as a rural location or in a medical facility, or the teacher may be a limited resource, such as a teacher for a particular language, who must service a number of pupils at diverse locations. To date, the primary mechanism for remote teaching has been video telecommunication, often with stationary cameras and displays that can only function well if the child remains continually in one place, rather than being free to move.

The Huggable is superior in many aspects to video telecommunication for remote teaching and education. Because the Huggable is much more engaging to a child than a video image, the child's attention and thus the child's learning is more focused when the teacher interacts with the child through the Huggable, than when the teacher is present only by a video image or a computer-generated video avatar. The remote puppeteer interface of the Huggable system also reduces the cognitive load on the teacher, and thus the teacher can devote more attention to the pedagogical interaction with the child. Further, autonomous behaviors such as automatically maintaining a gaze at the child's face help keep the child's attention focused.

The Huggable, due to its small size, can also be used as a companion sitting next to the child. The learning experience can be more effective with this companion avatar for the teacher, rather than an adult teacher being directly present with the child. Further, the remote teacher can both operate the Huggable robot as an avatar, perhaps with the robot sitting next to the child, and simultaneously control a teaching lesson on a video display in front of the Huggable robot and the child.

The social and affective nature of the interactions between the child and the Huggable make it particularly advantageous for teaching-through-play, which is known to be effective with children. The Huggable companion in this type of application is employed as a child's playmate. A human teacher who is the operator for the Huggable can direct play activities remotely. Social touch and social communication of approval, encouragement, or directing the attention of the pupil are activities that the teacher would do directly if physically present, but now can be carried out remotely via the robot. Social communications through the Huggable robot, such as a congratulatory patting gesture on the shoulder, clapping of hands, pointing to a word or picture in a book direct the child's attention to it, all contribute to the social relationship between the teacher and the pupil and the pupil's success at learning.

There are other applications of the Huggable in education. For example, for imitation learning for autistic children, the child wears sensors of the wearable interface, and the child's movements are monitored or recorded while the child is interacting with the robot. The robot engages the child in an activity, and the child imitates the robot's behavior or activity. An occupational therapist further either reviews the child's movements during interaction with the robot, or monitors them in real time. Alternatively, a tangible or sympathetic interface may be given to the user instead of a wearable interface. Use of a sympathetic interface can be helpful in adding an aspect of detachment or role-playing to the interaction with the user.

The Huggable has other benefits in teaching social cues to autistic children. For example, the Huggable robot presents a simpler character entity to the autistic child, with a more specific range of social cues, and thus is less likely to overwhelm the child with the many various social cues of a human during a therapy session. The therapist, via remote interaction through the Huggable, can guide the child through various levels of social interaction to greater effectiveness. Further, the therapist can download a simple interaction game to the Huggable as a set of autonomous behaviors, so that the child can continue therapy lessons after the therapy session, such as at home.

The Huggable is particularly suited for language education, among other educational applications. Language teachers are often a limited resource: the ability to share a teacher among widely dispersed pupils and yet still engage in social communication and teaching remotely has already been mentioned. The abilities for the teacher to hear—via the robot—the child speaking at the child learns new words, and to speak to the child—via the robot—through the robot, and have the child perceive it as the robot character speaking, have obvious benefits. Further, the Huggable gives the teacher several abilities otherwise lacking in remote education, such as to point—via the robot—to an object to be named; to make gestures to illustrate words; to recognize when the child is pointing or touching part of the robot's body while speaking the body part's name, are distinctly advantageous. In addition, as the Huggable is small like the child and designed to appear comforting, the child feels especially comfortable interacting with the Huggable character.

Autonomous or semi-autonomous behaviors of the Huggable can also be used to encourage or teach social behaviors in children. In general, positive behaviors by the child can be rewarded by a positive social communication from the robot such as nodding approval, and may also include socially communicative touch, such stroking the child in approval. As a particular example, if a child repeatedly strikes the Huggable to evoke a whimper or cry response, the Huggable performs an animation or behavior of being substantially unhappy, and turns itself off. This behavior can be initiated autonomously, or the puppeteer can command the Huggable to perform the animation and turn itself off. This reaction by the Huggable discourages undesired social behaviors by the child and further encourages desired social behaviors.

Autonomous Teaching

One other area in which a version of the Huggable could be used is for autonomous education. One such educational purpose is to encourage younger pupils to read. In this instance, a special Smart Book Huggable may be appropriate. Its use is modeled after the Read to Rover Program in which a young child reads to an animal, as described at www.readingwithrover.org, Reading With Rover, PO Box 2569, Woodinville, Wash. 98072. The Reading With Rover Program has shown positive results in encouraging children to practice reading, as the child does not feel threatened by reading to a dog as opposed to an adult, but is limited by the requirement for an actual specially-trained dog to be present.

In this application of the Huggable, the child would use a smart book, one in which the specific page number and an ID corresponding to that specific book title are transmitted to the workstation PC controlling the Huggable. As the child reads through the story, the software controlling the Huggable prompts the child with audio cues, such as getting excited at a specific part of the story, based upon the information received from the book. The video cameras in the Huggable could also be used to provide detailed information about the page the child is currently reading to the smart book. As can be readily appreciated, a variation on the presently-preferred embodiment for this Smart Book/Huggable application could be constructed with certain functionality of the full exploratory embodiment not included: the electronic components required can be reduced to a set such as a speaker, wireless communication package, memory, and other components. Such a variation is more robust because of the simpler design, and is light weight, making it a suitable size for small children.

Additional Application Areas

Active prosthetic devices can benefit substantially both from the sensitive skin and other technologies and techniques of the Huggable system. An artificial limb, for example, can be equipped with a sensitive skin identical or equivalent to that of the Huggable, thus giving the user of the prosthesis an effective sense of touch, temperature, pain, or kinesthetics. This greatly enhances the utility of the prosthetic device, compared to the existing art for active prosthetics. Sensors according to or equivalent to the techniques disclosed for the Huggable would be incorporated in the prosthesis, and the data from the sensors presented to the user visually, via haptic transducers that are well known in the art, by or equivalent means, thus providing an effective sense of touch for the user of the prosthesis. An effective sense of touch would assist the user in manipulating objects by "feel", and in avoiding damage or injury to the user or to the prosthetic device itself. Further, the sense of affective touch and the more life-like "feel" and appearance as would be achieved by incorporating Huggable techniques in a prosthesis such as a prosthetic hand, each make even simple social acts such as a handshake less distracting and more communicative than with a non-sensing or artificial-feeling prosthesis.

A further area where the techniques of the Huggable system may be applied is in general teleoperation or telepresence, as can be readily appreciated by considering the operation of the remote interface in the presently-preferred embodiment, and the reduction of the operator's cognitive load that is made possible by the semi-autonomous behaviors and the control interfaces that take advantage of them.

Additionally, the use of a sensitive skin like that of the Huggable, when incorporated into the surfaces of furniture, could automatically sense the behavior or actions of the user using the furniture, or be used to as an input device. As one example, a chair or seat equipped with sensitive skin or other sensors of the Huggable system could automatically adjust to the user, or could detect when the user is moving in way that indicates that the user is trying to stand up and activate motion actuators in the chair to assist the user in standing up.

Animatronics and other areas of entertainment are additional areas where the techniques of the Huggable may be applied. Current art in animatronics is generally limited to animating a robot through one or more sequences of fixed motions or actions so as to give the animatronic robot a somewhat life-like appearance to a passive human observer, without the ability to interact autonomously or semi-autonomously with that human observer. The illusion-of-life in an animatronic device fails when the human observer is not passive, but attempts to touch, speak, or otherwise interact with the animatronic device, because the device does not exhibit the affective or social interactive behaviors of the Huggable. The techniques for autonomous behaviors disclosed herein substantially overcome these limitations in the current art for animatronics.

The techniques disclosed herein for the Huggable can also be applied to using the Huggable as a long-time companion to a child or other user. In this application, data collected about the child's interaction with the Huggable services as a record of the child's activities in daily life. Among the many sensors that can be incorporated into a Huggable implementation, is a geographic position sensing system (GPS), thus making it possible to include in the record of the child's activity information about where the child was during play, travel, or other activities. In combination with other recorded sensor data, including visual data or medical data, this information can be useful for many purposes, including collection of data for any form of scrapbook, recording memorable or important events (which may be determined after the event, from recorded information), and potentially more sophisticated or complete analysis of the child's behavior and condition.

The Huggable is small in size, and comforting in appearance. Because of this and because of its autonomous social communication and social touch, some patients may be psychologically more willing to communicate with the Huggable rather than directly with a human caregiver. The Huggable can be configured and programmed to behave as an affective listener, where both the audio content from a patient or user as well as affective touch or visual content can be recorded. This can be beneficial for a patient who is then better able to confide information needed for diagnosis or treatment, such as the cause for a depressive or negative mental state.

The application of the Huggable as a physical avatar as an alternative to a graphical avatar, has been disclosed in this description. In addition, the Huggable techniques can be combined with a virtual reality system. In this application, a user, such as a sick child who cannot readily leave a hospital setting, can not only interact and communicate with friends and other persons remotely through a Huggable as a physical avatar, but also through a graphical Huggable avatar in a virtual reality system. In this fashion, the child can continue to use the same Huggable character to in this second environment, the virtual reality system. Further, a Huggable avatar in the virtual reality system can be generated, operated and controlled by the same virtual image and control software as is used for the physical Huggable. The sympathetic control interface may be particularly useful in this application. Further, child's own Huggable robot could in fact be used as the control interface for the avatar in the virtual reality system.

Robotic companions employing techniques disclosed here for the Huggable may also be employed to advantage for users who are not human. For example, in certain circumstances like those when the offspring of endangered species—rare birds, mammals, and so forth—must be raised by human caretakers, it is desirable to raise the offspring with a "surrogate parent" which behaves and appears to the offspring like a real natural parent. It is important in this situation that the offspring not fixate on human caretakers, but instead learn to relate to and learn behaviors of its own species. In the existing art, this has been attempted with hand puppets that appear, say, like the head of a natural parent, and the human caretaker operating the hand puppet attempts to make the puppet behave like a natural parent. The burden on the actual human caregivers is reduced, and the behavior of the surrogate more lifelike, if instead of a hand puppet a robot employing Huggable techniques is used. The robotic companion in this instance can be continually present, is designed to appear more realistic than is possible with a hand puppet, and the autonomous behaviors by the robot when controlled by appropriate software are more consistent and realistic to the offspring than can be maintained by a human with a hand puppet. In addition, the recording abilities of the Huggable techniques are useful in observing and studying the behavior of the offspring.

Conclusion

The foregoing Detailed Description has disclosed to those familiar with the technologies involved how to make and use an improved companion robot and how to make and use systems for interacting with sentient beings that use the companion robot and has further disclosed the best mode presently known to the inventors of implementing the companion robot and the system for interacting with a sentient being. As will be immediately apparent to those familiar with the technologies involved, the principles of the techniques described herein may be employed in many different application areas and for many different kinds of interactions between the robot, its user, and the entity. The form of the robot, its response to the user of the robot, the kind of control provided for the robot, and the forms of the control interfaces employed by the user of the robot and an operator of the robot will all depend upon the application area and the kinds of interactions between the user and the robot, between the operator, the robot, and the user of the robot required for the application. To give an obvious example, the principles of the techniques may be used to construct a system used by caregivers for an orphaned California condor chick, but the system may well have little in common with the preferred embodiment of the techniques disclosed herein other than the principles.

It will similarly be immediately apparent to those familiar with the technologies involved that there are many ways of implementing systems and robots built according to the principles of the invention. For example, any communications technique presently known or developed in the future can be used to communicate between a remotely located operator of the robot and the robot. Similarly, any materials presently known or developed in the future can be used in the construction of the robot and any control interface that is presently available or becomes available in the future can be used by the operator or by the user to control the robot. In embodiments where the robot is required to sense touches, any techniques that are now known or become available in the future can be used to sense the touches. The same is the case with arrangements for moving components of the robot.

Because the foregoing is the case, the Detailed Description is to be understood as being in all respects illustrative and not restrictive and the breadth of the inventions disclosed herein is to be determined not from the Detailed Description, but rather from the attached claims as interpreted according to the full breadth permitted by the patent laws.

The invention claimed is:

1. An interactive system comprising, in combination:
   (a) a robot; and
   (b) an operator interface for accepting input from and displaying output to a remote human operator; in which system
      (i) the robot includes actuators and movable parts for performing at least one of an affective touch and a social touch;
      (ii) the robot includes a plurality of sensors for taking sensor measurements selected from the group consisting of a pressure sensor, a proximity sensor, a light sensor and a sound sensor;
      (iii) the robot is programmed to function in a plurality of modes, the plurality of modes comprising at least two of an autonomous robotic behavior mode, a non-autonomous behavior mode in which actions of the robot are controlled by the remote human operator, and a semi-autonomous behavior mode in which a sequence of actions by a robot are initiated by a command by the remote human operator; and
      (iv) the input from the remote human operator comprises a selection by the remote human operator of a mode out of the plurality of modes or a selection by the remote human operator of a behavior, out of a set of behaviors by the robot, which set of behaviors by the robot includes at least one of a group consisting of laughing, giggling, crying, and clapping.

2. The system of claim 1, wherein the at least one of one of the affective touch and the social touch comprises the robot nuzzling into a human user other than the remote human operator.

3. The system of claim 1, wherein the at least one of one of the affective touch and the social touch comprises the robot touching a human user other than the remote human operator.

4. The system of claim 1, wherein the at least one of one of the affective touch and the social touch comprises the robot, in response to a touch by a human user other than the remote human operator, nuzzling into the human user.

5. The system of claim 4, wherein the system includes one or more processors programmed to cause the robot to make a secondary expressive motion while the robot performs the action.

6. The system of claim 1, wherein the system includes one or more processors programmed to cause the robot to perform at least one of an affective interaction and a social interaction with a human user wherein the user is not the remote human operator.

7. The system of claim 6, wherein the at least one of the affective interaction and the social interaction comprises the robot directing a user's attention toward an object by gesturing toward the object.

8. The system of claim 6, wherein the at least one of the affective interaction and social interaction comprises the robot engaging in at least one of looking at an object and pointing at an object, in each case while the user looks at the object.

9. The system of claim 6, wherein the at least one of the affective interaction and the social interaction comprises the robot responding to a cue selected from the group consisting of a sound, a touch, a motion and a visual stimulus by engaging in an action selected from the group consisting of turning the robot's gaze toward the source of the cue and pointing toward the source of the cue.

10. The system of claim 6, wherein the at least one of the affective interaction and social interaction comprises the robot moving the robot's head to direct the robot's gaze toward the user's face.

11. The system of claim 6, wherein the at least one of the affective interaction and social interaction comprises the robot moving the robot's head to direct the robot's gaze toward a point on the robot where the robot is being touched by the user.

12. The system of claim 6, wherein the at least one of the affective interaction and social interaction comprises the robot moving a part of the robot to touch a point on the robot where the robot is being touched by the user.

13. The system of claim 6, wherein the at least one of the affective interaction and social interaction comprises the robot clapping.

14. The system of claim 6, wherein the at least one of the affective interaction and social interaction comprises the robot making a giggle sound.

15. The system of claim 6, wherein the one or more processors are further programmed to analyze the sensor measurements to recognize a movement of the robot, which movement is actuated by a human, and to cause the robot to laugh in response to the movement.

16. The system of claim 1, wherein one or processors are programmed to analyze the sensor measurements:
   (a) to distinguish between physical contact with a human and physical contact with another object;
   (b) to categorize the physical contact with a human as being one of a plurality of types of contact; and
   (c) to determine affect of the physical contact with a human.

17. The system of claim 16, wherein the plurality of types of contacts comprise at least one of tickling and hugging.

18. The system of claim 16, wherein the one or more processors are further programmed to cause the robot to perform behavior in response to the physical contact with a human, and selection of the behavior is based at least in part on the affect of the physical contact with a human.

19. A method comprising, in combination:
   (a) using an operator interface to accept input from and display output to a remote human operator; and
   (b) using actuators onboard a robot to move moveable parts of the robot to perform at least one of an affective touch and a social touch; in which method
      (i) robot includes a plurality of sensors for taking sensor measurements selected from the group consisting of a pressure sensor, a proximity sensor, a light sensor and a sound sensor;
      (ii) the robot is programmed to function in a plurality of modes, the plurality of modes comprising at least two of an autonomous robotic behavior mode, a non-autonomous behavior mode in which actions of the robot are controlled by the remote human operator, and a semi-autonomous behavior mode in which a sequence of actions by a robot are initiated by a command by the remote human operator; and
      (iii) the input from the remote human operator comprises a selection by the remote human operator of a mode out of the plurality of modes or a selection by the remote human operator of a behavior, out of a set of behaviors by the robot, which set of behaviors by the robot includes at least one of a group consisting of laughing, giggling, crying, and clapping.

20. The method of claim 19, further comprising using a processor to analyze the sensor measurements:
- (a) to distinguish between physical contact with a human and physical contact with another object;
- (b) to categorize the physical contact with a human as being one of a plurality of types of contact; and
- (c) to determine affect of the physical contact with a human.

* * * * *